United States Patent
Clarke et al.

(10) Patent No.: US 11,697,417 B2
(45) Date of Patent: Jul. 11, 2023

(54) SYSTEMS AND METHODS FOR NAVIGATING A VEHICLE AMONG ENCROACHING VEHICLES

(71) Applicant: MOBILEYE VISION TECHNOLOGIES LTD., Jerusalem (IL)

(72) Inventors: Anna Clarke, Har Adar (IL); Eyal Bagon, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 144 days.

(21) Appl. No.: 17/102,574

(22) Filed: Nov. 24, 2020

(65) Prior Publication Data

US 2021/0146927 A1    May 20, 2021

Related U.S. Application Data

(63) Continuation of application No. 16/393,846, filed on Apr. 24, 2019, now Pat. No. 10,953,884, which is a (Continued)

(51) Int. Cl.
*B60W 30/18* (2012.01)
*B60W 30/14* (2006.01)
(Continued)

(52) U.S. Cl.
CPC ... *B60W 30/18163* (2013.01); *B60K 31/0066* (2013.01); *B60R 1/00* (2013.01);
(Continued)

(58) Field of Classification Search
None
See application file for complete search history.

(56) References Cited

U.S. PATENT DOCUMENTS

| 5,230,400 A | 7/1993 | Kakinami et al. |
| 5,309,137 A | 5/1994 | Kajiwara |

(Continued)

FOREIGN PATENT DOCUMENTS

| AU | 658325 | 4/1995 |
| CN | 203047139 U | 7/2013 |

(Continued)

OTHER PUBLICATIONS

Extended European Search Report issued by the European Patent Office dated Oct. 26, 2020, in European Application No. 20182739.1-1207.

(Continued)

*Primary Examiner* — Todd Melton
(74) *Attorney, Agent, or Firm* — Finnegan, Henderson, Farabow, Garrett & Dunner, LLP

(57) ABSTRACT

Systems and methods use cameras to provide autonomous navigation features. In one implementation, a method for navigating a user vehicle may include acquiring, using at least one image capture device, a plurality of images of an area in a vicinity of the user vehicle; determining from the plurality of images a first lane constraint on a first side of the user vehicle and a second lane constraint on a second side of the user vehicle opposite to the first side of the user vehicle; enabling the user vehicle to pass a target vehicle if the target vehicle is determined to be in a lane different from the lane in which the user vehicle is traveling; and causing the user vehicle to abort the pass before completion of the pass, if the target vehicle is determined to be entering the lane in which the user vehicle is traveling.

20 Claims, 58 Drawing Sheets

Related U.S. Application Data continuation of application No. 14/560,420, filed on Dec. 4, 2014, now Pat. No. 10,293,826.

(60) Provisional application No. 62/040,269, filed on Aug. 21, 2014, provisional application No. 62/040,224, filed on Aug. 21, 2014, provisional application No. 62/022,221, filed on Jul. 9, 2014, provisional application No. 62/015,524, filed on Jun. 23, 2014, provisional application No. 61/993,111, filed on May 14, 2014, provisional application No. 61/993,084, filed on May 14, 2014, provisional application No. 61/911,490, filed on Dec. 4, 2013.

(51) Int. Cl.
| | |
|---|---|
| *G06V 20/56* | (2022.01) |
| *B60W 30/00* | (2006.01) |
| *B60W 30/09* | (2012.01) |
| *B60W 40/06* | (2012.01) |
| *B60W 40/072* | (2012.01) |
| *B60W 40/076* | (2012.01) |
| *G01C 21/10* | (2006.01) |
| *B60W 30/12* | (2020.01) |
| *B60W 30/08* | (2012.01) |
| *B60T 7/12* | (2006.01) |
| *G01C 21/26* | (2006.01) |
| *G08G 1/0962* | (2006.01) |
| *G08G 1/16* | (2006.01) |
| *B60K 31/00* | (2006.01) |
| *H04N 23/90* | (2023.01) |
| *G01C 11/04* | (2006.01) |
| *G05D 1/02* | (2020.01) |
| *B60T 8/32* | (2006.01) |
| *B60T 7/22* | (2006.01) |
| *B60W 30/165* | (2020.01) |
| *B60R 1/00* | (2022.01) |
| *B60W 10/18* | (2012.01) |
| *B60W 10/20* | (2006.01) |
| *B60W 30/095* | (2012.01) |
| *G05D 1/00* | (2006.01) |
| *B62D 15/02* | (2006.01) |
| *B60W 50/14* | (2020.01) |
| *G01C 21/30* | (2006.01) |
| *G06T 7/00* | (2017.01) |
| *G06T 7/70* | (2017.01) |
| *G06T 7/285* | (2017.01) |
| *G06T 7/292* | (2017.01) |
| *H04N 7/18* | (2006.01) |
| *B62D 6/00* | (2006.01) |
| *G08G 1/00* | (2006.01) |
| *B60W 50/00* | (2006.01) |
| *G01S 5/00* | (2006.01) |
| *G08G 1/09* | (2006.01) |

(52) U.S. Cl.
CPC .......... *B60T 7/12* (2013.01); *B60T 7/22* (2013.01); *B60T 8/32* (2013.01); *B60W 10/18* (2013.01); *B60W 10/20* (2013.01); *B60W 30/00* (2013.01); *B60W 30/08* (2013.01); *B60W 30/09* (2013.01); *B60W 30/0953* (2013.01); *B60W 30/12* (2013.01); *B60W 30/14* (2013.01); *B60W 30/143* (2013.01); *B60W 30/165* (2013.01); *B60W 30/18154* (2013.01); *B60W 40/06* (2013.01); *B60W 40/072* (2013.01); *B60W 40/076* (2013.01); *B60W 50/14* (2013.01); *B62D 15/0265* (2013.01); *G01C 11/04* (2013.01); *G01C 21/10* (2013.01); *G01C 21/26* (2013.01); *G01C 21/30* (2013.01); *G05D 1/0088* (2013.01); *G05D 1/0246* (2013.01); *G06T 7/285* (2017.01); *G06T 7/292* (2017.01); *G06T 7/70* (2017.01); *G06T 7/97* (2017.01); *G06V 20/588* (2022.01); *G08G 1/09623* (2013.01); *G08G 1/166* (2013.01); *G08G 1/167* (2013.01); *H04N 23/90* (2023.01); *B60K 2031/0025* (2013.01); *B60T 2201/022* (2013.01); *B60T 2201/08* (2013.01); *B60T 2210/34* (2013.01); *B60W 2050/0075* (2013.01); *B60W 2420/403* (2013.01); *B60W 2420/42* (2013.01); *B60W 2510/0604* (2013.01); *B60W 2510/18* (2013.01); *B60W 2510/20* (2013.01); *B60W 2520/14* (2013.01); *B60W 2554/4041* (2020.02); *B60W 2554/80* (2020.02); *B60W 2556/10* (2020.02); *B60W 2556/50* (2020.02); *B60W 2710/18* (2013.01); *B60W 2710/20* (2013.01); *B62D 6/00* (2013.01); *B62D 15/0255* (2013.01); *G01S 5/0027* (2013.01); *G05D 1/0214* (2013.01); *G05D 1/0253* (2013.01); *G05D 1/0278* (2013.01); *G06T 2207/10028* (2013.01); *G06T 2207/30256* (2013.01); *G06T 2207/30261* (2013.01); *G08G 1/09* (2013.01); *G08G 1/22* (2013.01); *H04N 7/18* (2013.01)

(56) References Cited

U.S. PATENT DOCUMENTS

| | | |
|---|---|---|
| 5,315,295 A | 5/1994 | Fujii |
| 5,661,650 A | 8/1997 | Sekine et al. |
| 5,765,116 A | 6/1998 | Wilson-Jones et al. |
| 5,844,505 A | 12/1998 | Van Ryzin |
| 5,976,731 A | 11/1999 | Matsuda |
| 5,987,364 A | 11/1999 | Le Gusquet et al. |
| 6,050,359 A | 4/2000 | Mouri et al. |
| 6,091,833 A | 7/2000 | Yasui et al. |
| 6,311,120 B1 | 10/2001 | Asada |
| 6,324,462 B1 | 11/2001 | Kageyama |
| 6,353,788 B1 | 3/2002 | Baker et al. |
| 6,385,528 B1 | 5/2002 | Takahashi |
| 6,489,887 B2 | 12/2002 | Satoh et al. |
| 6,675,081 B2 | 1/2004 | Shuman et al. |
| 6,675,085 B2 | 1/2004 | Staub |
| 6,748,302 B2 | 6/2004 | Kawazoe |
| 7,433,772 B2 | 10/2008 | Isaji et al. |
| 7,463,963 B2 | 12/2008 | Higuchi |
| 7,503,221 B2 | 10/2009 | Urvoy et al. |
| 7,647,178 B2 * | 1/2010 | Ekmark ............... G08G 1/161 |
| | | 701/301 |
| 7,711,464 B2 | 5/2010 | Kaufmann |
| 7,765,066 B2 | 7/2010 | Braeuchle et al. |
| 7,831,366 B2 | 11/2010 | Imai et al. |
| 7,970,535 B2 | 6/2011 | Katoh et al. |
| 8,050,863 B2 | 11/2011 | Trepagnier et al. |
| 8,090,537 B2 | 1/2012 | Nishira et al. |
| 8,315,775 B2 | 11/2012 | Biondo et al. |
| 8,406,957 B2 | 3/2013 | Kim |
| 8,411,900 B2 | 4/2013 | Naka et al. |
| 8,412,433 B2 | 4/2013 | Yasui et al. |
| 8,457,827 B1 * | 6/2013 | Ferguson .............. B60W 30/16 |
| | | 701/28 |
| 8,473,144 B1 | 6/2013 | Dolgov et al. |
| 8,504,233 B1 | 8/2013 | Ferguson et al. |
| 8,504,283 B2 | 8/2013 | Aso et al. |
| 8,571,786 B2 | 10/2013 | Iwasaki et al. |
| 8,600,657 B2 | 12/2013 | Saito |
| 8,626,391 B2 | 1/2014 | Kim |
| 8,666,591 B2 | 3/2014 | Stahlin et al. |
| 8,751,154 B2 | 6/2014 | Zhang et al. |

(56) References Cited

U.S. PATENT DOCUMENTS

| | | | |
|---|---|---|---|
| 8,762,021 B2 | 6/2014 | Yoshihama | |
| 8,903,588 B2 * | 12/2014 | Schmudderich | G06V 20/58 701/96 |
| 9,542,846 B2 | 1/2017 | Zeng et al. | |
| 2003/0163239 A1 | 8/2003 | Winner et al. | |
| 2006/0095195 A1 | 5/2006 | Nishimura et al. | |
| 2007/0050114 A1 | 3/2007 | Hiroyuki et al. | |
| 2007/0233351 A1 | 10/2007 | Wang | |
| 2008/0027607 A1 | 1/2008 | Ertl et al. | |
| 2008/0033621 A1 | 2/2008 | Masahide et al. | |
| 2008/0065328 A1 | 3/2008 | Eidehall et al. | |
| 2008/0239078 A1 | 10/2008 | Mohr et al. | |
| 2009/0138201 A1 | 5/2009 | Eckstein et al. | |
| 2009/0157247 A1 | 6/2009 | Sjöegren et al. | |
| 2010/0292886 A1 | 11/2010 | Szczerba et al. | |
| 2010/0292895 A1 | 11/2010 | Masaki et al. | |
| 2011/0090071 A1 | 4/2011 | Platonov et al. | |
| 2011/0118936 A1 | 5/2011 | Hong | |
| 2011/0313665 A1 | 12/2011 | Lueke et al. | |
| 2012/0143488 A1 | 6/2012 | Othmezouri et al. | |
| 2012/0242835 A1 | 9/2012 | Li et al. | |
| 2012/0283912 A1 | 11/2012 | Lee et al. | |
| 2013/0006473 A1 | 1/2013 | Buerkle | |
| 2013/0222127 A1 | 8/2013 | Ray Avalani | |
| 2014/0005907 A1 * | 1/2014 | Bajpai | B60W 10/18 701/96 |
| 2014/0067206 A1 | 3/2014 | Pflug | |
| 2014/0088830 A1 | 3/2014 | Roh et al. | |

FOREIGN PATENT DOCUMENTS

| | | |
|---|---|---|
| DE | 102011086299 A1 | 5/2013 |
| EP | 2275318 A1 | 1/2011 |

OTHER PUBLICATIONS

Extended European Search Report issued by the European Patent Office dated Dec. 2, 2020, in European Application No. 20159457.9-1207.

Extended European Search Report issued by the European Patent Office dated Mar. 11, 2021, in European Application No. 20212599.3-1207 (12 pages).

Chiang Hsin-Han et al.: "Embedded Driver-Assistance System Using Multiple Sensors for Safe Overtaking Maneuver," IEEE Systems Journal, vol. 8, No. 3, Nov. 16, 2012, pp. 681-698, XP055775237, US ISSN: 1932-8184, DOI: 10.1109/JSYST.2012.2212636 Retrieved from the Internet: URL: https://ieeexplore.ieee.org/stampPDF/getPDF_jsp?tp=&arnumber=6352826&ref=aHROcHM6Ly9pZWVleHBsb3J1Lm11ZWUub3. JnL2Flc3RyYWNOL2RvY3VtZW50LzYzNTI4MIY/Y2FzYV90b2tlbj11fQWh0QmJFRUxyQUFBQUFB0kQ3VFI3NOlxVU9zeWtyMPF9DYmpnUlFVcm5XVzBOVmx6N0V0azJ0WxSU1kzdmE2cURRkandzVFF1mHZOQ27xe1BubXJfRUdl>.

Isermann et al., "Collision-Avoidance Systems PRORETA: Situation Analysis and Intervention Control," *Control Engineering Practice*. Nov. 2012, 20(11); 1236-46.

Audi, "Driver Assistance Systems," *Audi USA News*, Jan. 10, 2012, 4 pages.

Noor et al., "Intelligent and Connected: Automated Cars that Communicate: How Much Can That Save Us in Lives, Money, and Frustration?" *Mechanical Engineering—CIME*, Nov. 1, 2012, pp. 32-37.

Arpin et al., "A High Accuracy Vehicle Positioning System Implemented in a Lane Assistance System when GPS is Unavailable," Dept. of Mech. Eng., U. of Minnesota, Minneapolis, MN, Jul. 2011, 82 pages.

Cheng et al., "Lane Tracking with Omnidirectional Cameras: Algorithms and Evaluation," *EURASIP Journal on Embedded Systems*, Dec. 2007, Hindawi Publication Corp., 2007: 46972, 8 pages.

Office Action for U.S. Appl. No. 17/102,616 dated Sep. 9, 2022.

Office Action for U.S. Appl. No. 17/102,647 dated Sep. 13, 2022.

Extended European Search Report issued by the European Patent Office dated Mar. 11, 2021, in European Application No. 20212597.7-1207 (13 pages).

Extended European Search Report issued by the European Patent Office dated Mar. 11, 2021, in European Application No. 20212598.5-1207 (10 pages).

* cited by examiner

SYSTEMS AND METHODS FOR NAVIGATING A VEHICLE AMONG ENCROACHING VEHICLES

CROSS REFERENCES TO RELATED APPLICATIONS

This application is a continuation application of U.S. application Ser. No. 16/393,846, filed Apr. 24, 2019, which is a continuation of U.S. application Ser. No. 14/560,420, filed Dec. 4, 2014, now U.S. Pat. No. 10,293,826, issued May 21, 2019, which claims the benefit of priority of U.S. Provisional Patent Application No. 61/911,490, filed Dec. 4, 2013, U.S. Provisional Patent Application No. 61/993,084, filed on May 14, 2014, U.S. Provisional Patent Application No. 61/993,111, filed on May 14, 2014; U.S. Provisional Patent Application 62/015,524, filed on Jun. 23, 2014; U.S. Provisional Patent Application 62/022,221, filed on Jul. 9, 2014; U.S. Provisional Patent Application No. 62/040,224, filed on Aug. 21, 2014; and U.S. Provisional Patent Application 62/040,269, filed on Aug. 21, 2014. All of the foregoing applications are incorporated herein by reference in their entirety.

BACKGROUND

I. Technical Field

The present disclosure relates generally to autonomous vehicle navigation and, more specifically, to systems and methods that use cameras to provide autonomous vehicle navigation features.

II. Background Information

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle and cause a navigational response based on an analysis of images captured by one or more of the cameras.

Consistent with a disclosed embodiment, a driver assist navigation system is provided for a vehicle. The system may include at least one image capture device configured to acquire a plurality of images of an area in a vicinity of the vehicle; a data interface; and at least one processing device. The at least one processing device may be configured to: receive the plurality of images via the data interface; determine from the plurality of images a first lane constraint on a first side of the vehicle; determine from the plurality of images a second lane constraint on a second side of the vehicle opposite to the first side of the vehicle, wherein the first and second lane constraints define a lane within which the vehicle travels and wherein a first distance corresponds to a distance between the first side of the vehicle and the first lane constraint and a second distance corresponds to a distance between the second side of the vehicle and the second lane constraint; determine, based on the plurality of images, whether a lane offset condition exists on the first side of the vehicle; if a lane offset condition exists on the first side of the vehicle, cause the vehicle to travel within the first and second lane constraints such that the first distance is greater than the second distance; determine, based on the plurality of images, whether a lane offset condition exists on the second side of the vehicle; and if a lane offset condition exists on the second side of the vehicle, cause the vehicle to travel within the first and second lane constraints such that the first distance is less than the second distance.

Consistent with another disclosed embodiment, a vehicle may include a first vehicle side; a second vehicle side opposite the first vehicle side; at least one image capture device configured to acquire a plurality of images of an area in a vicinity of the vehicle; a data interface; and at least one processing device. The at least one processing device may be configured to: receive the plurality of images via the data interface; determine from the plurality of images a first lane constraint on the first vehicle side; determine from the plurality of images a second lane constraint on the second vehicle side, wherein the first and second lane constraints define a lane within which the vehicle travels and wherein a first distance corresponds to a distance between the first vehicle side and the first lane constraint and a second distance corresponds to a distance between the second vehicle side and the second lane constraint; determine, based on the plurality of images, whether a lane offset condition exists on the first vehicle side; if a lane offset condition exists on the first vehicle side, cause the vehicle to travel within the first and second lane constraints such that the first distance is greater than the second distance; determine, based on the plurality of images, whether a lane offset condition exists on the second vehicle side; and if a lane offset condition exists on the second vehicle side, cause the vehicle to travel within the first and second lane constraints such that the first distance is less than the second distance.

Consistent with another disclosed embodiment, a method is provided for navigating a vehicle. The method may include acquiring, using at least one image capture device, a plurality of images of an area in the vicinity of the vehicle; determining from the plurality of images a first lane constraint on a first side of the vehicle; determining from the plurality of images a second lane constraint on a second side of the vehicle opposite to the first side of the vehicle, wherein the first and second lane constraints define a lane within which the vehicle travels and wherein a first distance corresponds to a distance between the first side of the vehicle and the first lane constraint and a second distance corresponds to a distance between the second side of the vehicle and the second lane constraint; determining, based on the plurality of images, whether a lane offset condition exists on the first side of the vehicle; if a lane offset condition exists on the first side of the vehicle, causing the vehicle to travel within the first and second lane constraints such that the first distance is greater than the second distance; determining, based on the plurality of images, whether a lane offset condition exists on the second side of the vehicle; and if a lane offset condition exists on the second side of the vehicle, causing the vehicle to travel within the first and second lane constraints such that the first distance is less than the second distance.

Consistent with a disclosed embodiment, a driver assist navigation system is provided for a vehicle. The system may include at least one image capture device configured to acquire a plurality of images of an area in a vicinity of the vehicle; a data interface; and at least one processing device. The at least processing device may be configured to: receive the plurality of images via the data interface; determine from the plurality of images a current lane of travel from among a plurality of available travel lanes; and cause the vehicle to change lanes if the current lane of travel is not the same as a predetermined default travel lane.

Consistent with another disclosed embodiment, a vehicle may include a body; at least one image capture device configured to acquire a plurality of images of an area in a vicinity of the vehicle; a data interface; and at least one processing device. The at least one processing device may be configured to: receive the plurality of images via the data interface; determine from the plurality of images a current lane of travel from among a plurality of available travel lanes; and cause the vehicle to change lanes if the current lane of travel is not the same as a predetermined default travel lane.

Consistent with another disclosed embodiment, a method is provided for navigating a vehicle. The method may include acquiring, using at least one image capture device, a plurality of images of an area in a vicinity of the vehicle; determining from the plurality of images a current lane of travel from among a plurality of available travel lanes; and causing the vehicle to change lanes if the current lane of travel is not the same as a predetermined default travel lane.

Consistent with a disclosed embodiment, a driver assist navigation system is provided for a vehicle. The system may include at least one image capture device configured to acquire a plurality of images of an area in a vicinity of the vehicle; a data interface; and at least one processing device. The at least one processing device may be configured to: receive the plurality of images via the data interface; recognize a curve to be navigated based on map data and vehicle position information; determine an initial target velocity for the vehicle based on at least one characteristic of the curve as reflected in the map data; adjust a velocity of the vehicle to the initial target velocity; determine, based on the plurality of images, one or more observed characteristics of the curve; determine an updated target velocity based on the one or more observed characteristics of the curve; and adjust the velocity of the vehicle to the updated target velocity.

Consistent with another disclosed embodiment, a vehicle may include a body; at least one image capture device configured to acquire a plurality of images of an area in a vicinity of the vehicle; a data interface; and at least one processing device. The at least one processing device may be configured to: receive the plurality of images via the data interface; recognize a curve to be navigated based on map data and vehicle position information; determine an initial target velocity for the vehicle based on at least one characteristic of the curve as reflected in the map data; adjust a velocity of the vehicle to the initial target velocity; determine, based on the plurality of images, one or more observed characteristics of the curve; determine an updated target velocity based on the one or more observed characteristics of the curve; and adjust the velocity of the vehicle to the updated target velocity.

Consistent with another disclosed embodiment, a method is provided for navigating a vehicle. The method may include acquiring, using at least one image capture device, a plurality of images of an area in a vicinity of the vehicle; recognizing a curve to be navigated based on map data and vehicle position information; determining an initial target velocity for the vehicle based on at least one characteristic of the curve as reflected in the map data; adjusting a velocity of the vehicle to the initial target velocity; determining, based on the plurality of images, one or more observed characteristics of the curve; determining an updated target velocity based on the one or more observed characteristics of the curve; and adjusting the velocity of the vehicle to the updated target velocity.

Consistent with a disclosed embodiment, a driver assist navigation system is provided for a primary vehicle. The system may include at least one image capture device configured to acquire a plurality of images of an area in a vicinity of the primary vehicle; a data interface; and at least one processing device. The at least one processing device may be configured to: receive the plurality of images via the data interface; determine, from at least some of the plurality of images, a first lane constraint on a first side of the primary vehicle; determine, from at least some of the plurality of images, a second lane constraint on a second side of the primary vehicle opposite to the first side of the primary vehicle, wherein the first and second lane constraints define a lane within which the primary vehicle travels; cause the primary vehicle to travel within the first and second lane constraints; locate in the plurality of images a leading vehicle; determine, based on the plurality of images, at least one action taken by the leading vehicle; and cause the primary vehicle to mimic the at least one action of the leading vehicle.

Consistent with another disclosed embodiment, a primary vehicle may include a body; at least one image capture device configured to acquire a plurality of images of an area in a vicinity of the primary vehicle; a data interface; and at least one processing device. The at least one processing device may be configured to: receive the plurality of images via the data interface; determine, from at least some of the plurality of images, a first lane constraint on a first side of the primary vehicle; determine, from at least some of the plurality of images, a second lane constraint on a second side of the primary vehicle opposite to the first side of the primary vehicle, wherein the first and second lane constraints define a lane within which the primary vehicle travels; cause the primary vehicle to travel within the first and second lane constraints; locate in the plurality of images a leading vehicle; determine, based on the plurality of images, at least one action taken by the leading vehicle; and cause the primary vehicle to mimic the at least one action of the leading vehicle.

Consistent with another disclosed embodiment, a method is provided for navigating a primary vehicle. The method ma include acquiring, using at least one image capture device, a plurality of images of an area in a vicinity of the primary vehicle; determining, from at least some of the plurality of images, a first lane constraint on a first side of the primary vehicle; determining, from at least some of the plurality of images, a second lane constraint on a second side of the primary vehicle opposite to the first side of the primary vehicle, wherein the first and second lane constraints define a lane within which the primary vehicle travels; causing the primary vehicle to travel within the first and second lane constraints; locating in the plurality of images a leading vehicle; determining, based on the plurality of images, at least one action taken by the leading vehicle; and causing the primary vehicle to mimic the at least one action of the leading vehicle.

Consistent with a disclosed embodiment, a driver assist navigation system is provided for a user vehicle. They system may include at least one image capture device configured to acquire a plurality of images of an area in a vicinity of the user vehicle; a data interface; and at least one processing device. The at least one processing device may be configured to: receive the plurality of images via the data interface; determine from the plurality of images a first lane constraint on a first side of the user vehicle; determine from the plurality of images a second lane constraint on a second side of the user vehicle opposite to the first side of the user vehicle, wherein the first and second lane constraints define a lane within which the user vehicle travels; acquire, based on the plurality of images, a target vehicle; enable the user vehicle to pass the target vehicle if the target vehicle is determined to be in a lane different from the lane in which the user vehicle is traveling; monitor a position of the target vehicle based on the plurality of images; and cause the user vehicle to abort the pass before completion of the pass, if the target vehicle is determined to be entering the lane in which the user vehicle is traveling.

Consistent with another disclosed embodiment, a user vehicle may include at least one image capture device configured to acquire a plurality of images of an area in a vicinity of the user vehicle; a data interface; and at least one processing device. The at least one processing device may be configured to: receive the plurality of images via the data interface; determine from the plurality of images a first lane constraint on a first side of the user vehicle; determine from the plurality of images a second lane constraint on a second side of the user vehicle opposite to the first side of the user vehicle, wherein the first and second lane constraints define a lane within which the user vehicle travels; acquire, based on the plurality of images, a target vehicle; enable the user vehicle to pass the target vehicle if the target vehicle is determined to be in a lane different from the lane in which the user vehicle is traveling; monitor a position of the target vehicle based on the plurality of images; and cause the user vehicle to abort the pass before completion of the pass, if the target vehicle is determined to be entering the lane in which the user vehicle is traveling.

Consistent with another disclosed embodiment, a method is provided for navigating a user vehicle. The method may include acquiring, using at least one image capture device, a plurality of images of an area in a vicinity of the user vehicle; determining from the plurality of images a first lane constraint on a first side of the user vehicle; determining from the plurality of images a second lane constraint on a second side of the user vehicle opposite to the first side of the user vehicle, wherein the first and second lane constraints define a lane within which the user vehicle travels; acquiring, based on the plurality of images, a target vehicle; enabling the user vehicle to pass the target vehicle if the target vehicle is determined to be in a lane different from the lane in which the user vehicle is traveling; monitoring a position of the target vehicle based on the plurality of images; and causing the user vehicle to abort the pass before completion of the pass, if the target vehicle is determined to be entering the lane in which the user vehicle is traveling.

Consistent with a disclosed embodiment, a driver assist navigation system is provided for a user vehicle. The system may include at least one image capture device configured to acquire a plurality of images of an area in a vicinity of the user vehicle; a data interface; and at least one processing device. The at least one processing device may be configured to: receive the plurality of images via the data interface; determine from the plurality of images a first lane constraint on a first side of the user vehicle; determine from the plurality of images a second lane constraint on a second side of the user vehicle opposite to the first side of the user vehicle, wherein the first and second lane constraints define a lane within which the user vehicle travels; determine, based on the plurality of images, whether an encroaching vehicle is approaching from a side of the user vehicle; and cause the user vehicle to maintain a current velocity and to travel within the first and second lane constraints such that a first distance, on the side of the user vehicle that the encroaching vehicle is approaching from, is greater than a second distance.

Consistent with another disclosed embodiment, a user vehicle may include at least one image capture device configured to acquire a plurality of images of an area in a vicinity of the user vehicle; a data interface; and at least one processing device. The at least one processing device may be configured to: receive the plurality of images via the data interface; determine from the plurality of images a first lane constraint on a first side of the user vehicle; determine from the plurality of images a second lane constraint on a second side of the user vehicle opposite to the first side of the user vehicle, wherein the first and second lane constraints define a lane within which the user vehicle travels; determine, based on the plurality of images, whether an encroaching vehicle is approaching from a side of the user vehicle; and cause the user vehicle to maintain a current velocity and to travel within the first and second lane constraints such that a first distance, on the side of the user vehicle that the encroaching vehicle is approaching from, is greater than a second distance.

Consistent with another disclosed embodiment, a method for navigating a user vehicle is provided. The method may include acquiring, using at least one image capture device, a plurality of images of an area in a vicinity of the user vehicle; determining from the plurality of images a first lane constraint on a first side of the user vehicle; determining from the plurality of images a second lane constraint on a second side of the user vehicle opposite to the first side of the user vehicle, wherein the first and second lane constraints define a lane within which the user vehicle travels; determining, based on the plurality of images, whether an encroaching vehicle is approaching from a side of the user vehicle; and causing the user vehicle to maintain a current velocity and to travel within the first and second lane constraints such that a first distance, on the side of the user vehicle that the encroaching vehicle is approaching from, is greater than a second distance.

Consistent with a disclosed embodiment, a driver assist navigation system is provided for a primary vehicle. They system may include at least one image capture device configured to acquire a plurality of images of an area in a vicinity of the primary vehicle; a data interface; and at least one processing device. The at least processing device may be configured to: receive the plurality of images via the data interface; identify a target object within the plurality of images; monitor, via the plurality of images, a motion of the target object and a distance between the primary vehicle and the target object; determine an indicator of an intercept time between the primary vehicle and the target object based on the monitored motion and the distance between the primary vehicle and the target object; and cause a response in the primary vehicle based on a comparison of the intercept time to a plurality of predetermined intercept thresholds.

Consistent with another disclosed embodiment, a primary vehicle may include a body; at least one image capture device configured to acquire a plurality of images of an area in a vicinity of the primary vehicle; a data interface; and at least one processing device. The at least one processing device may be configured to: receive the plurality of images via the data interface; identify a target object within the plurality of images; monitor, via the plurality of images, a motion of the target object and a distance between the primary vehicle and the target object; determine an indicator of an intercept time between the primary vehicle and the target object based on the monitored motion and the distance between the primary vehicle and the target object; and cause a response in the primary vehicle based on a comparison of the intercept time to a plurality of predetermined intercept thresholds.

Consistent with another disclosed embodiment, a method for navigating a primary vehicle may include acquiring, via at least one image capture device, a plurality of images of an area in a vicinity of the primary vehicle; identifying a target object within the plurality of images; monitoring, based on the plurality of images, a motion of the target object and a distance between the primary vehicle and the target object; determining an indicator of an intercept time between the primary vehicle and the target object based on the monitored motion and the distance between the primary vehicle and the target object; and causing a response in the primary vehicle based on a comparison of the intercept time to a plurality of predetermined intercept thresholds.

Consistent with a disclosed embodiment, a driver assist navigation system is provided for a vehicle. The system may include at least one image capture device configured to acquire a plurality of images of an area in a vicinity of the vehicle; a data interface; and at least one processing device. The at least one processing device may be configured to: receive the plurality of images via the data interface; identify, based on analysis of the plurality of images, a trigger for stopping the vehicle; and based on the identified trigger, cause the vehicle to stop according to a braking profile including a first segment associated with a first deceleration rate, a second segment which includes a second deceleration rate less than the first deceleration rate, and a third segment in which a level of braking is decreased as a target stopping location is approached, as determined based on the analysis of the plurality of images.

Consistent with another disclosed embodiment, a vehicle may include a body; at least one image capture device configured to acquire a plurality of images of an area in a vicinity of the vehicle; a data interface; and at least one processing device. The at least one processing device may be configured to: receive the plurality of images via the data interface; identify, based on analysis of the plurality of images, a trigger for stopping the vehicle; and based on the identified trigger, cause the vehicle to stop according to a braking profile including a first segment associated with a first deceleration rate, a second segment which includes a second deceleration rate less than the first deceleration rate, and a third segment in which a level of braking is decreased as a target stopping location is approached, as determined based on the analysis of the plurality of images.

Consistent with another disclosed embodiment, a method is provided for navigating a vehicle. The method may include acquiring, via at least one image capture plurality of images of an area in a vicinity of the vehicle; identifying, based on analysis of the plurality of images, a trigger for stopping the vehicle; and based on the identified trigger, causing the vehicle to stop according to a braking profile including a first segment associated with a first deceleration rate, a second segment which includes a second deceleration rate less than the first deceleration rate, and a third segment in which a level of braking is decreased as a target stopping location is approached, as determined based on the analysis of the plurality of images.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
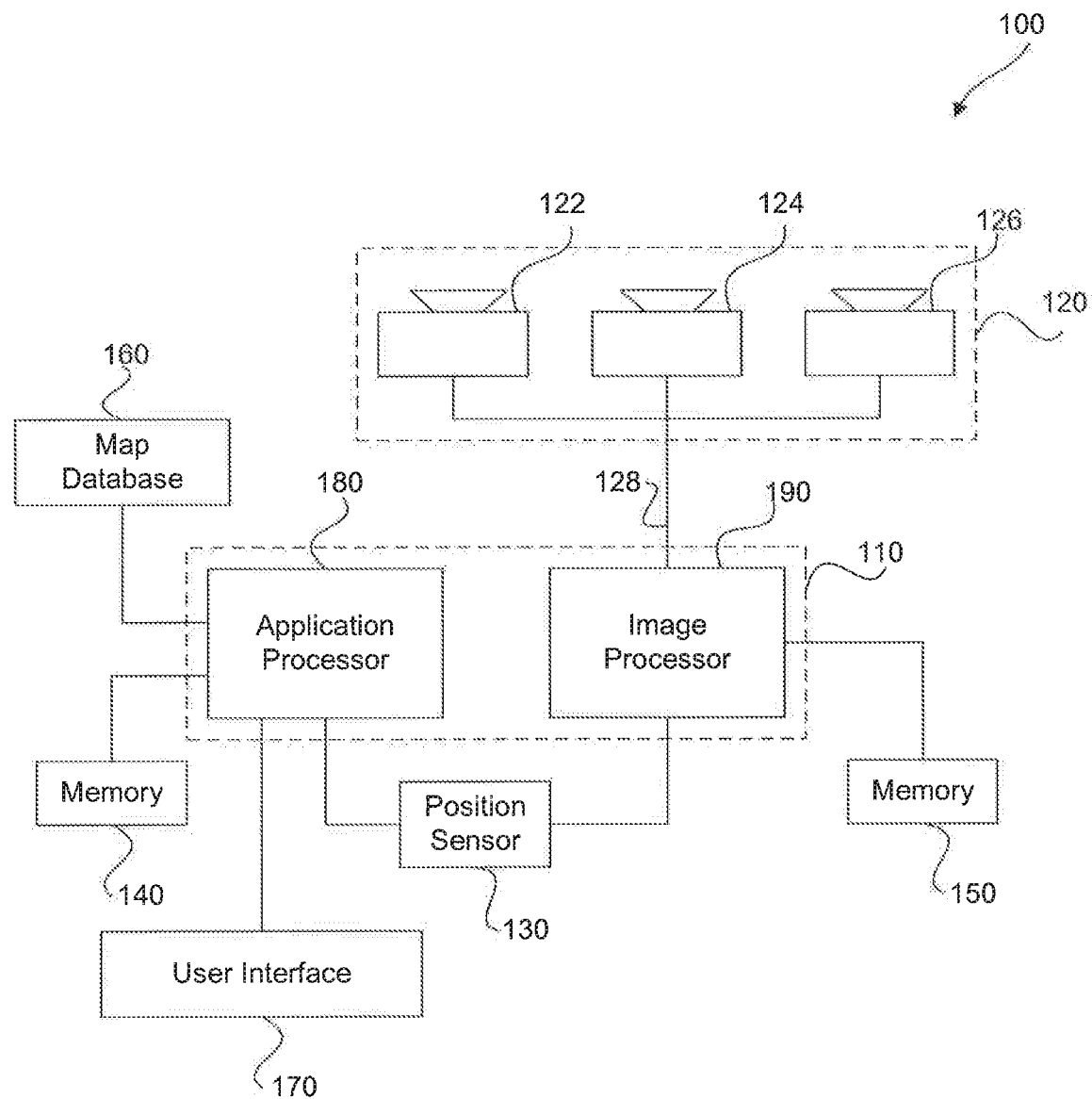
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide systems and methods that use cameras to provide autonomous navigation features. In various embodiments, the system may include one, two or more cameras that monitor the environment of a vehicle. In one embodiment, the system may monitor and adjust the free space between a vehicle and the boundaries of the lane within which the vehicle is traveling. In another embodiment, the system may select a particular lane as a default lane for the vehicle to use while traveling. In another embodiment, the system may control the speed of the vehicle in different scenarios, such as while making a turn. In yet another embodiment, the system may mimic the actions of a leading vehicle. In yet another embodiment, the system may monitor a target vehicle and enable the vehicle to pass the target vehicle under certain conditions (e.g., if the target vehicle is traveling in a lane different from the lane within which the vehicle is traveling. In still yet another embodiment, the system may produce a natural feeling response to a laterally encroaching vehicle, such as a vehicle attempting to move into the lane within which the vehicle is traveling.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
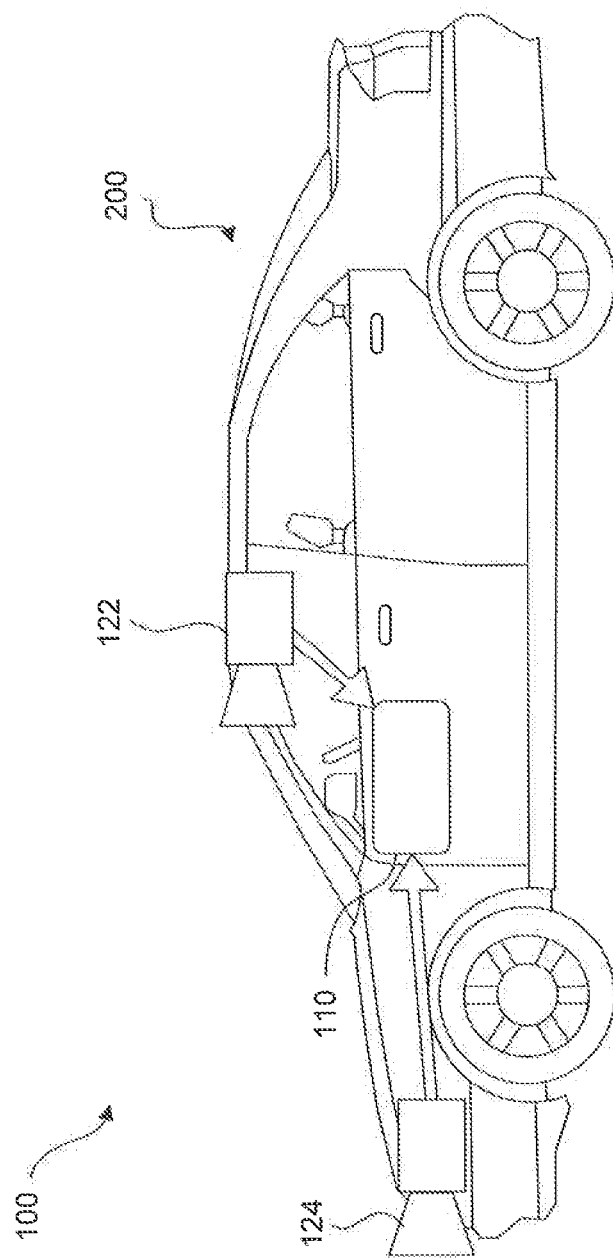
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
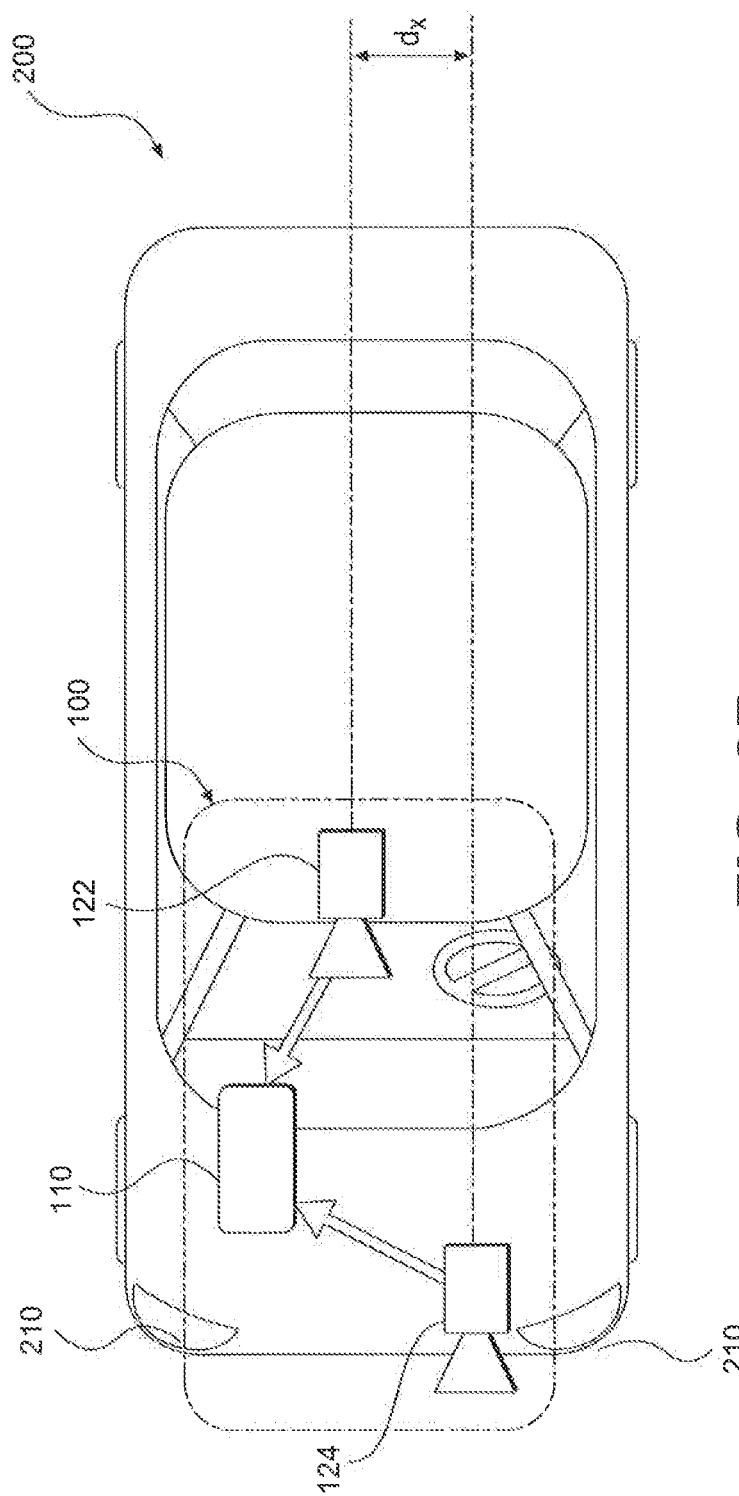
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
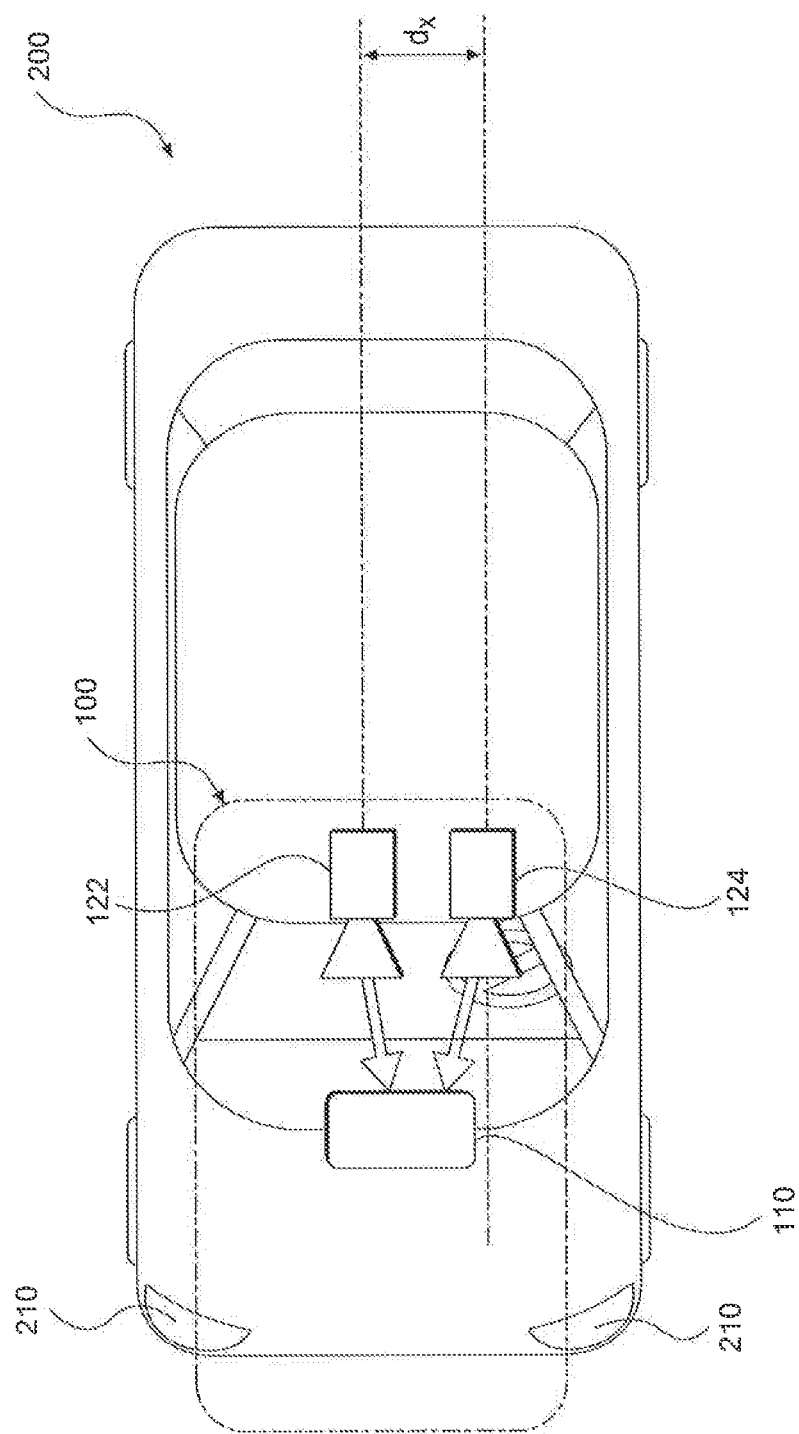
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
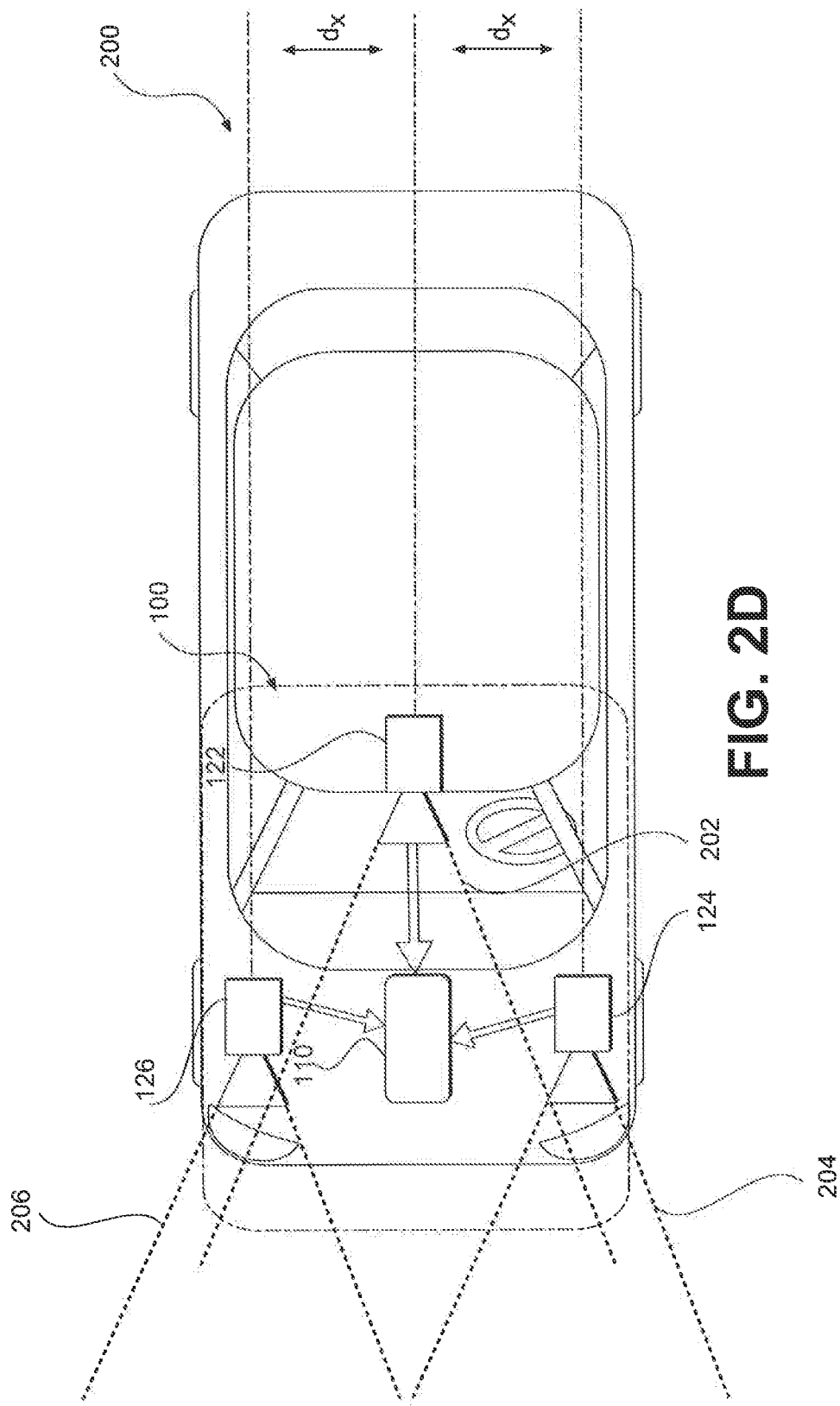
FIG. 2D is a diagrammatic top view representation of yet another embodiment of a vehicle including a system consistent with the disclosed embodiments.
Figure 2E:
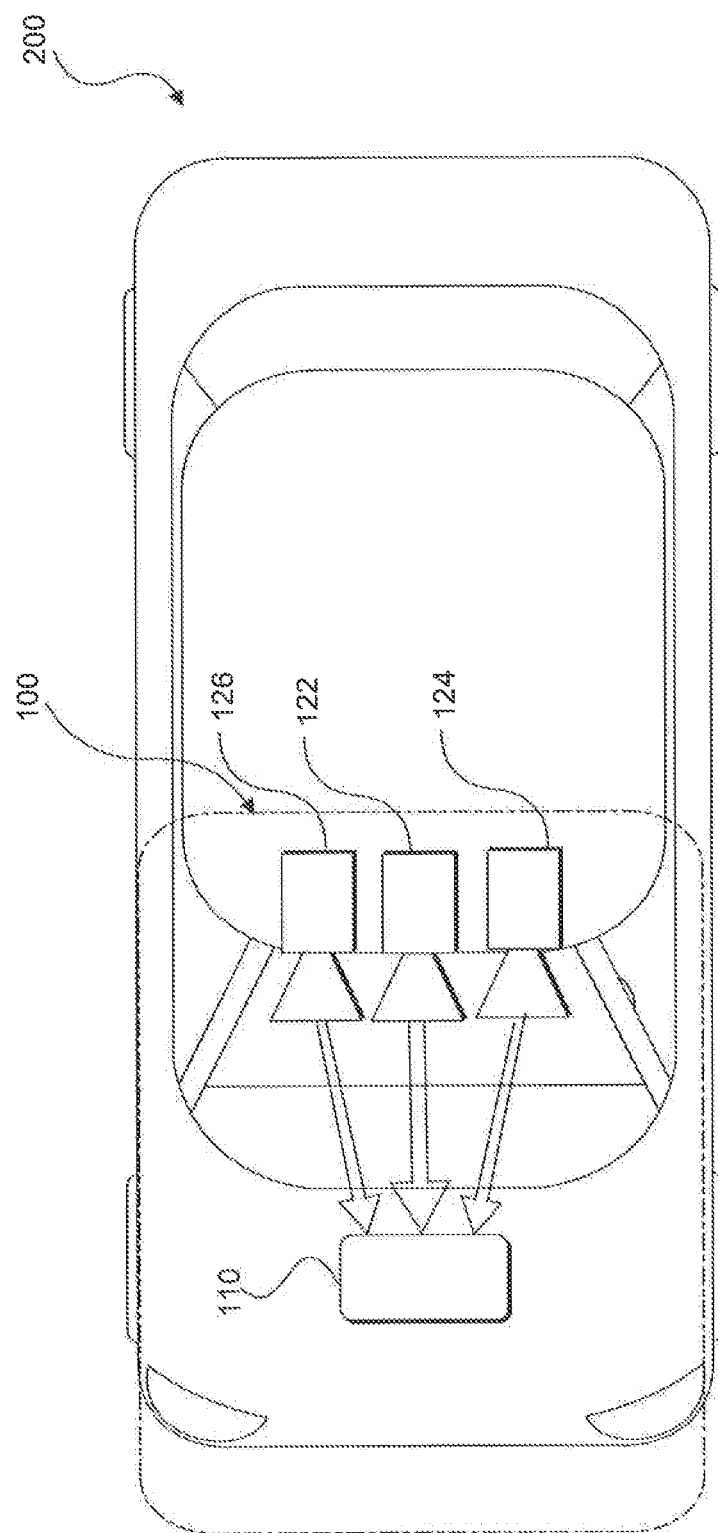
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
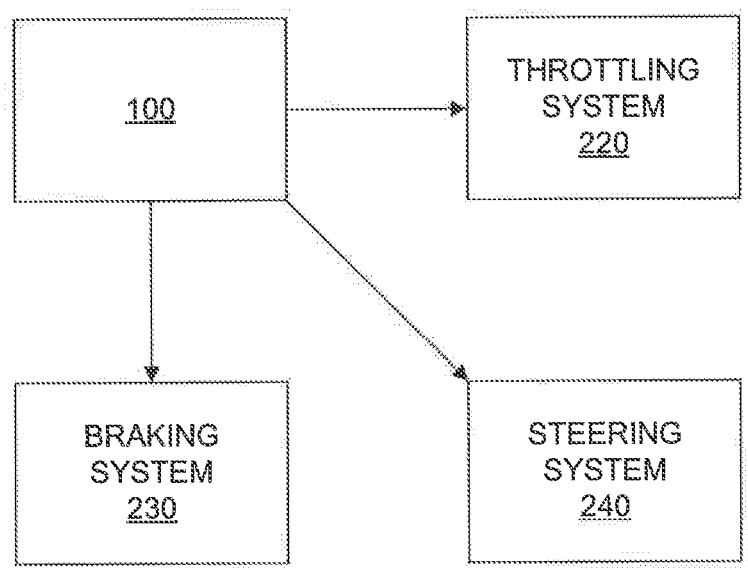
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
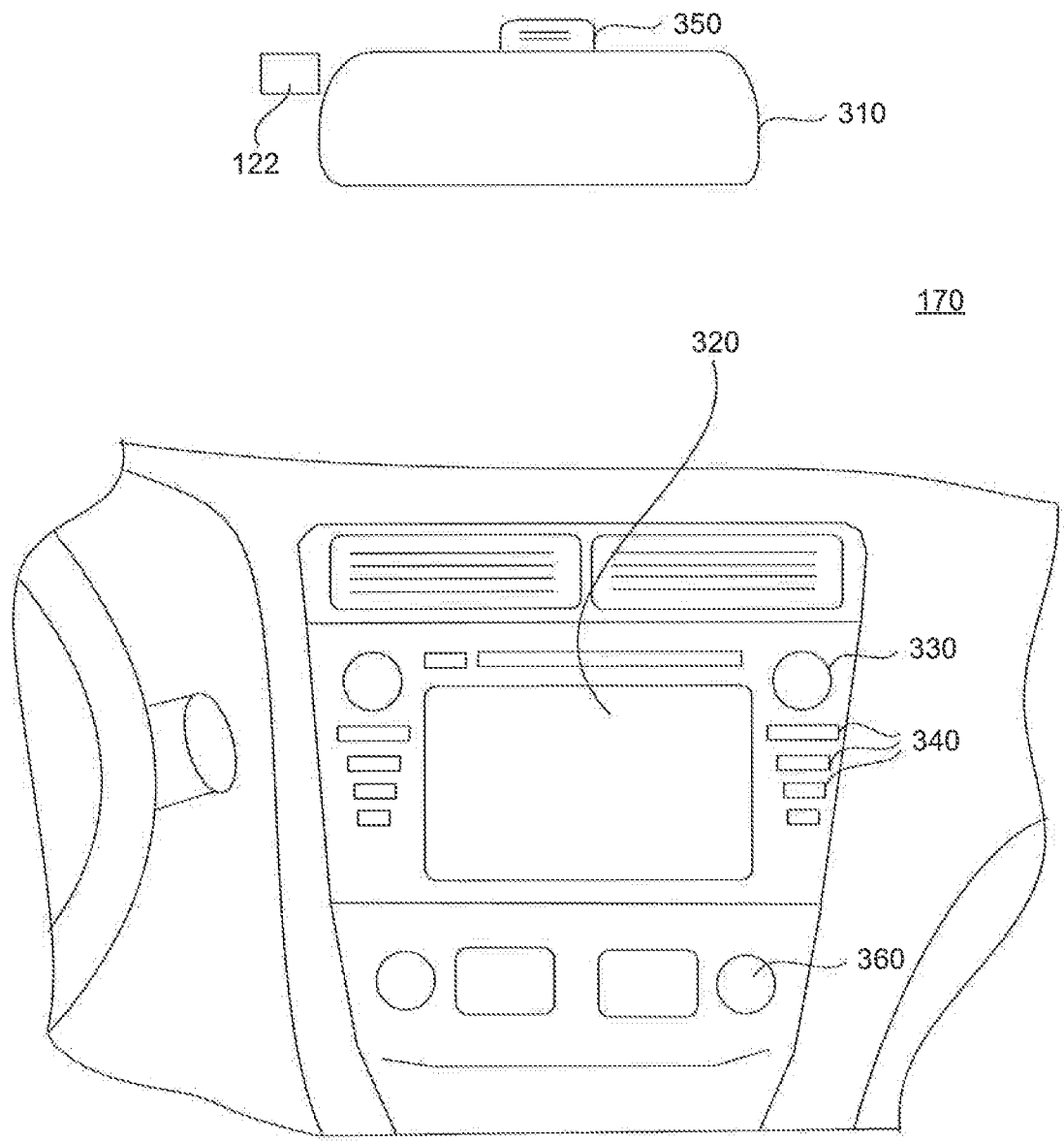
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
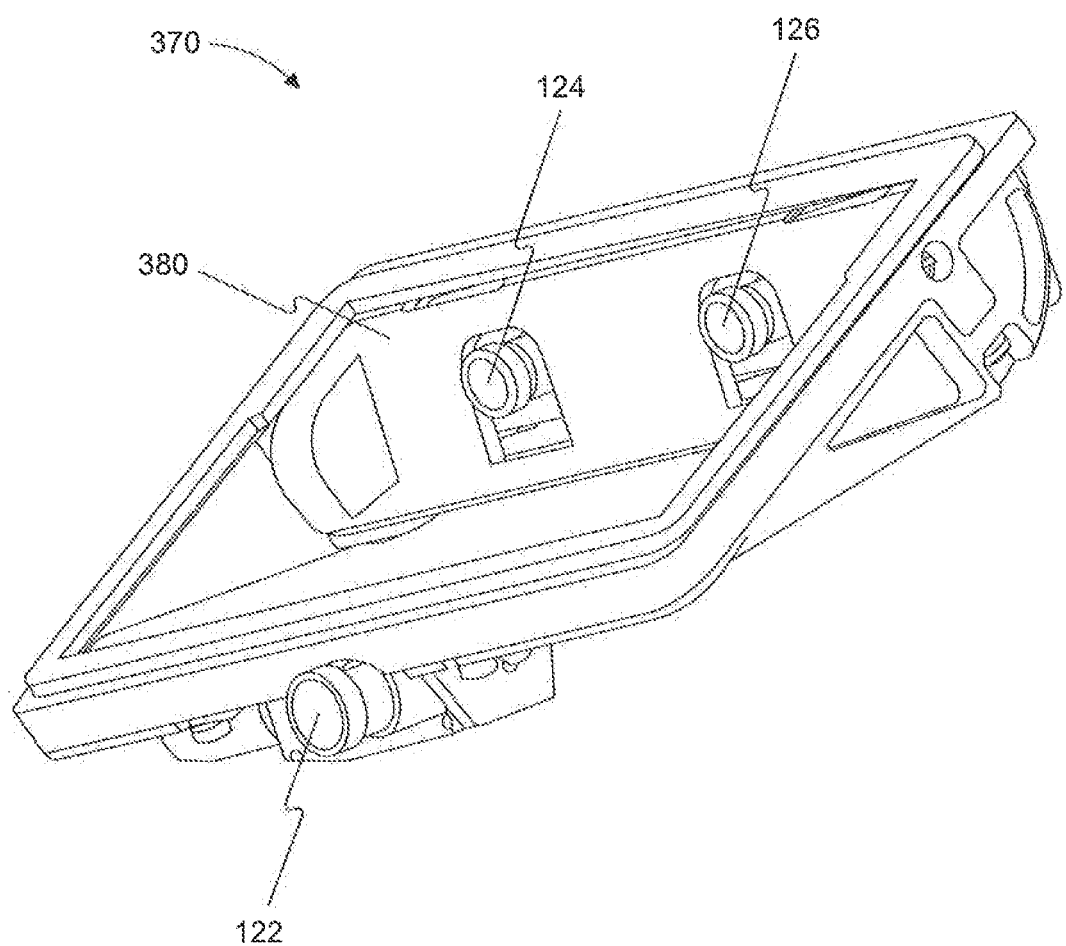
FIG. 3B is an illustration of an example of a camera mount that is configured to be positioned behind a rearview mirror and against a vehicle windshield consistent with the disclosed embodiments.
Figure 3C:
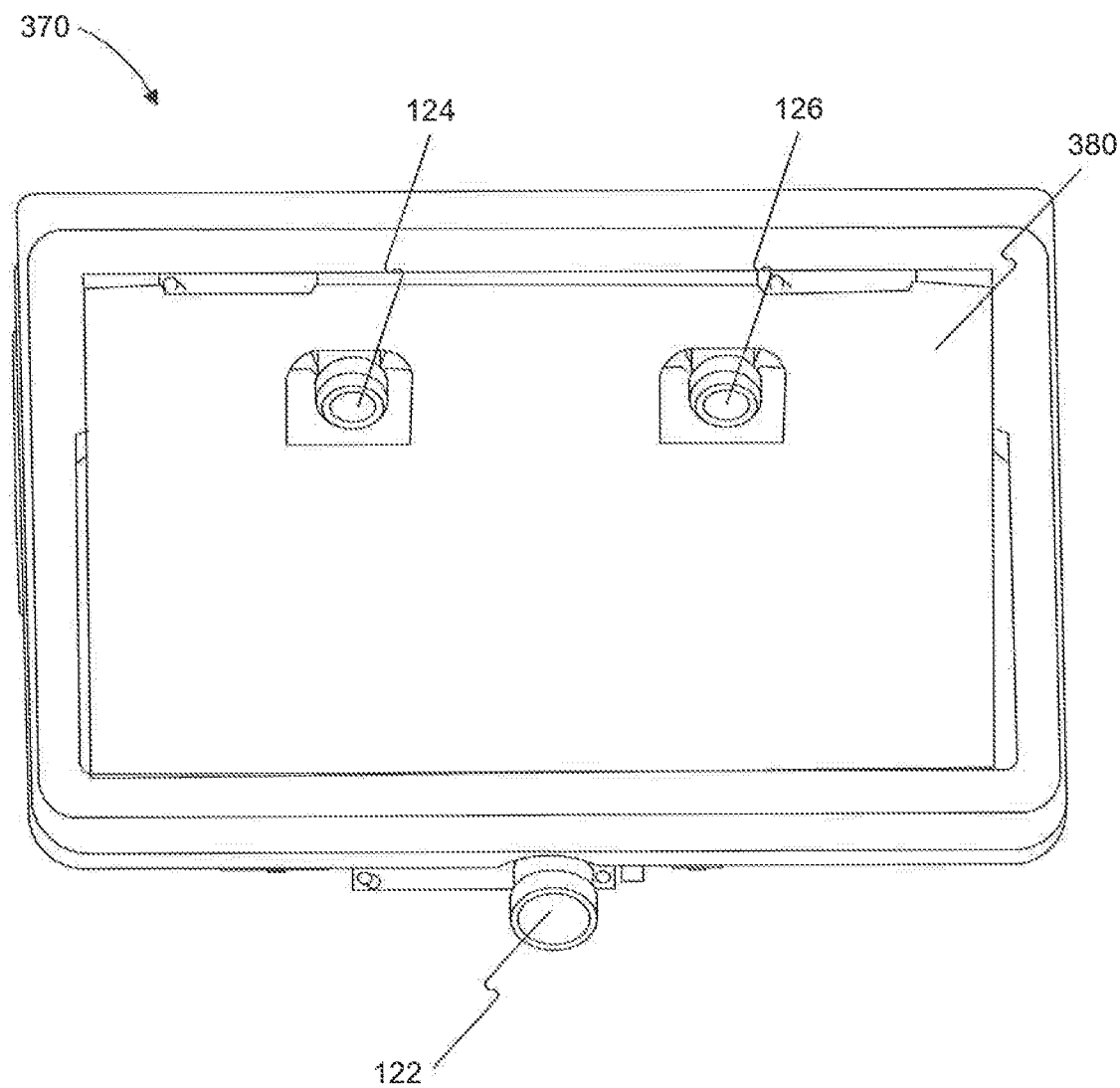
FIG. 3C is an illustration of the camera mount shown in FIG. 3B from a different perspective consistent with the disclosed embodiments.
Figure 3D:
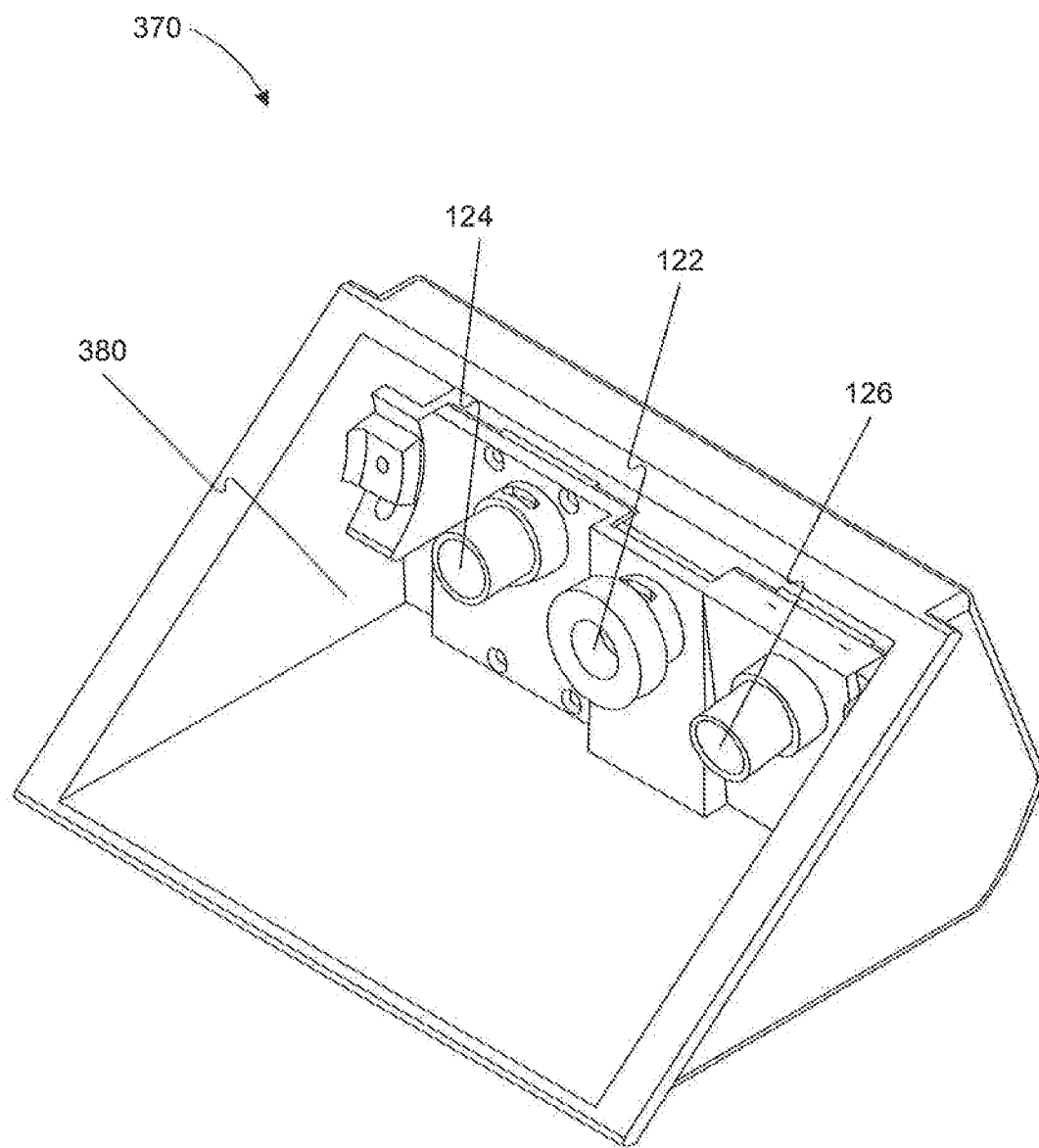
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data.

Further, consistent with disclosed embodiments, the functionality provided by system 100 may cause vehicle 200 to take different actions to navigate vehicle 200 within a lane and/or relative to other vehicles and/or objects. For example, system 100 may adjust the positioning of vehicle 200 relative to a lane within which vehicle 200 is traveling and/or relative to objects positioned near vehicle 200, select a particular lane for vehicle 200 to use while traveling, and take action in response to an encroaching vehicle, such as a vehicle attempting to move into the lane within which vehicle 200 is traveling. Additionally, system 100 may control the speed of vehicle 200 in different scenarios, such as when vehicle 200 is making a turn. System 100 may further cause vehicle 200 to mimic the actions of a leading vehicle or monitor a target vehicle and navigate vehicle 200 so that it passes the target vehicle. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
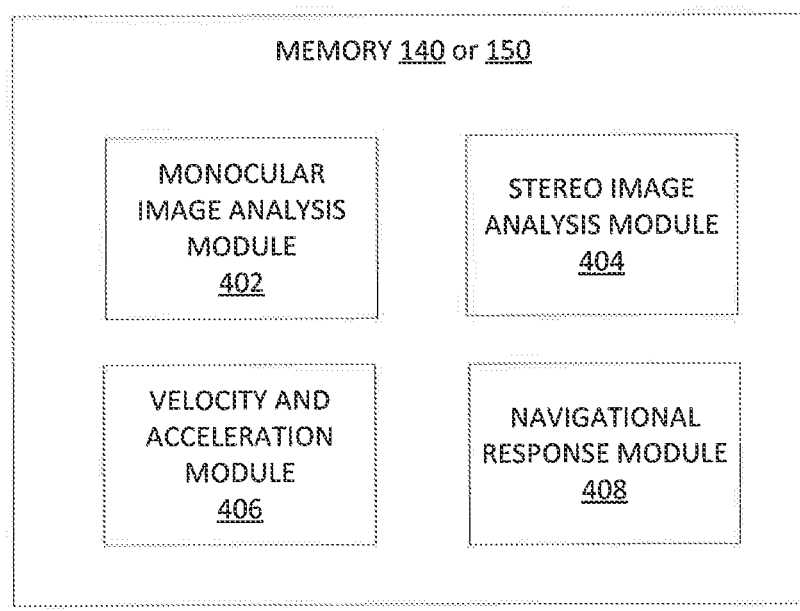
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
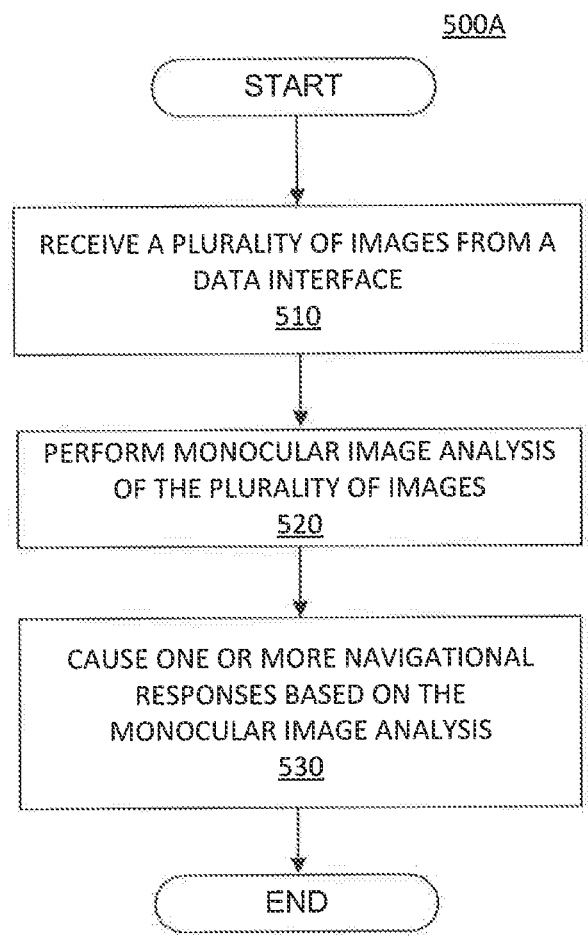
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
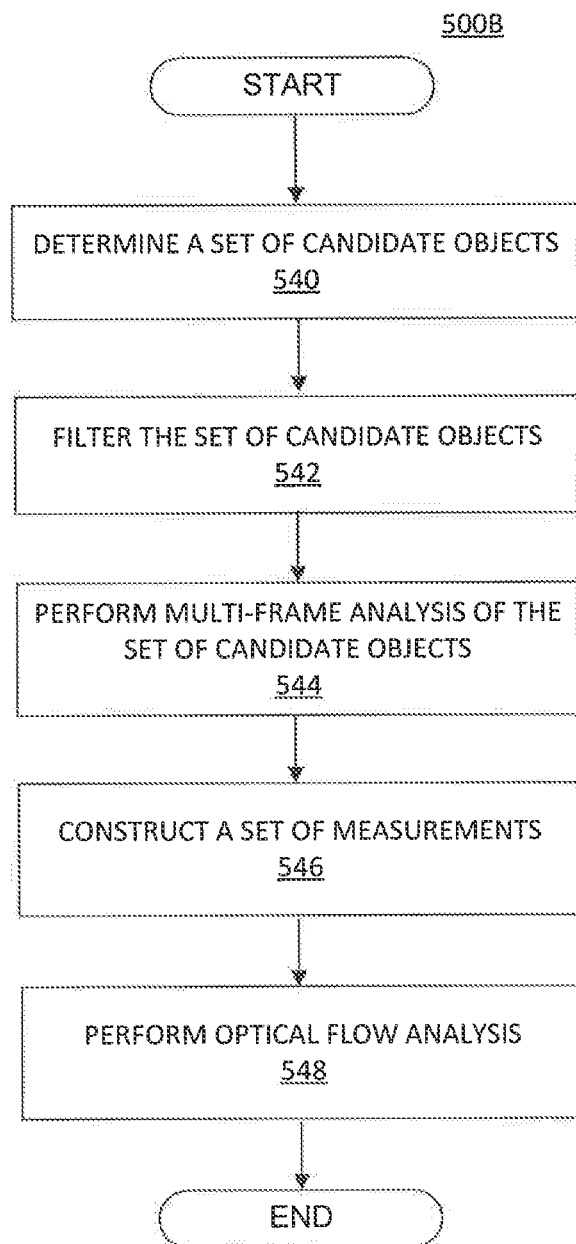
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
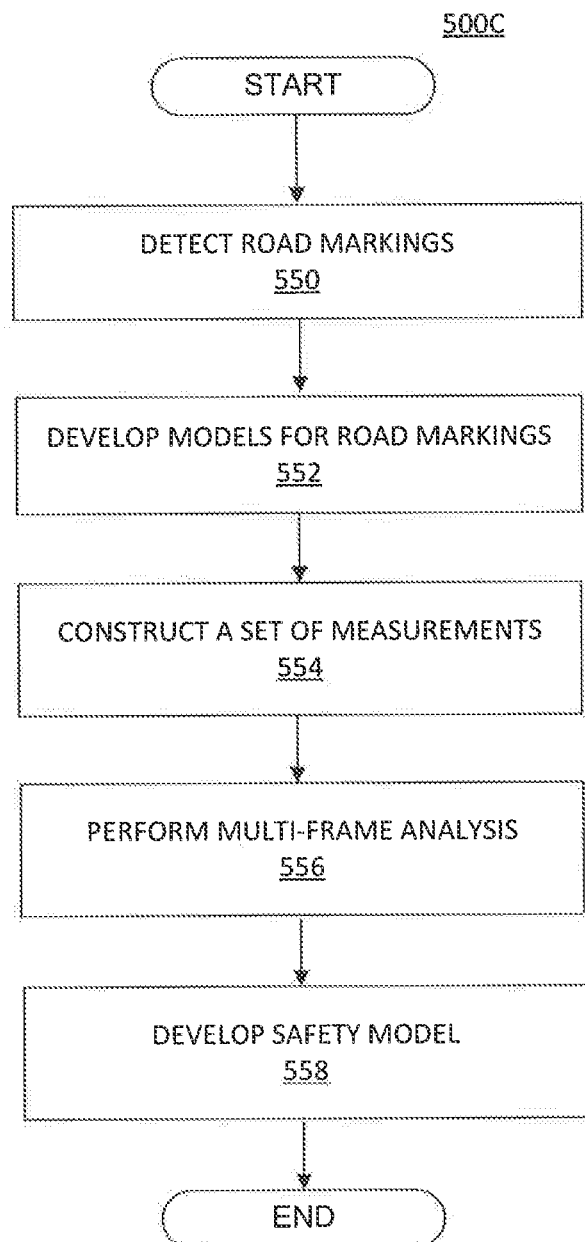
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
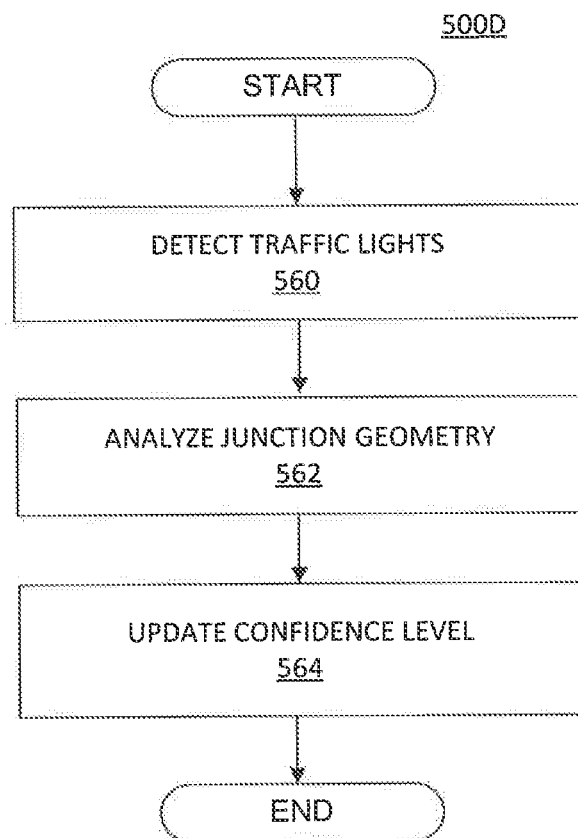
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
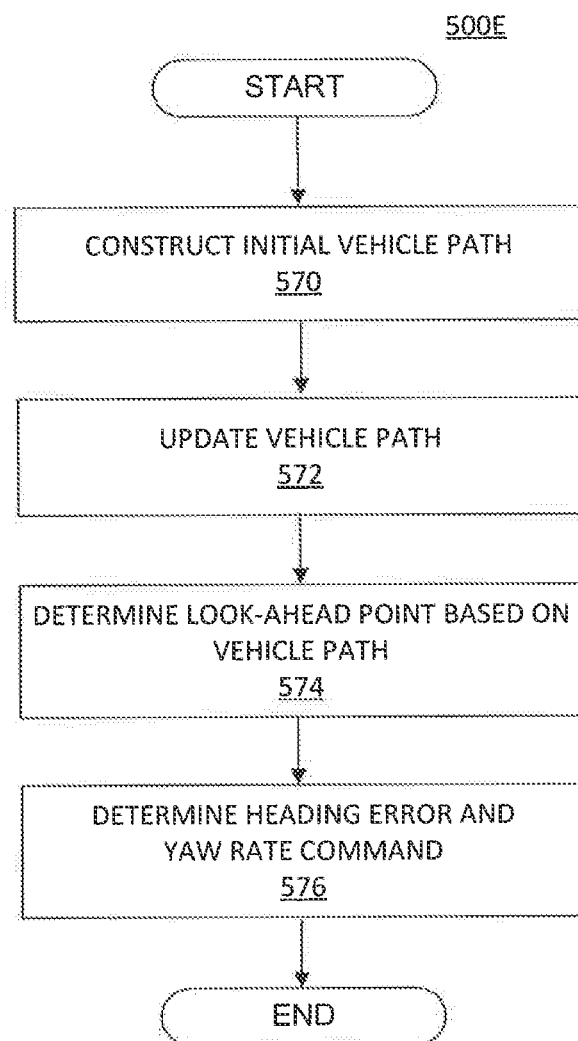
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
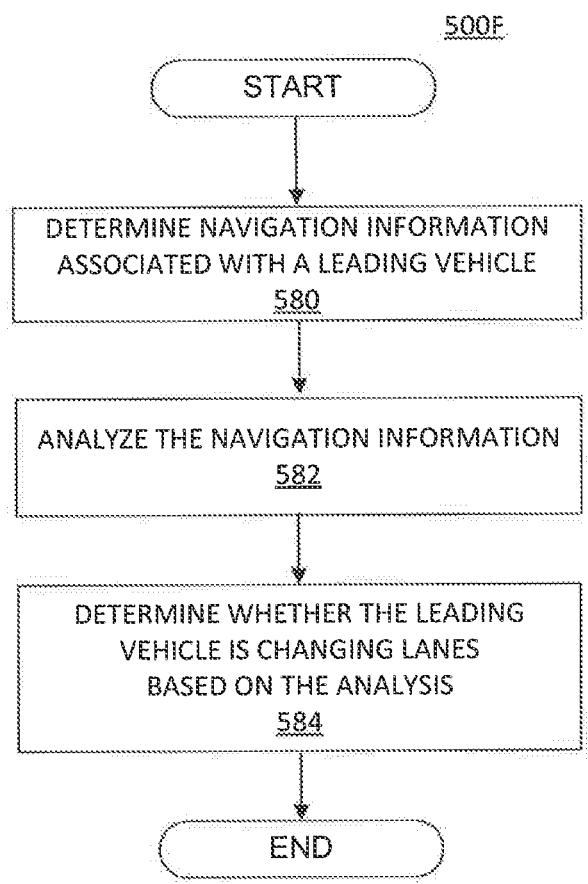
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
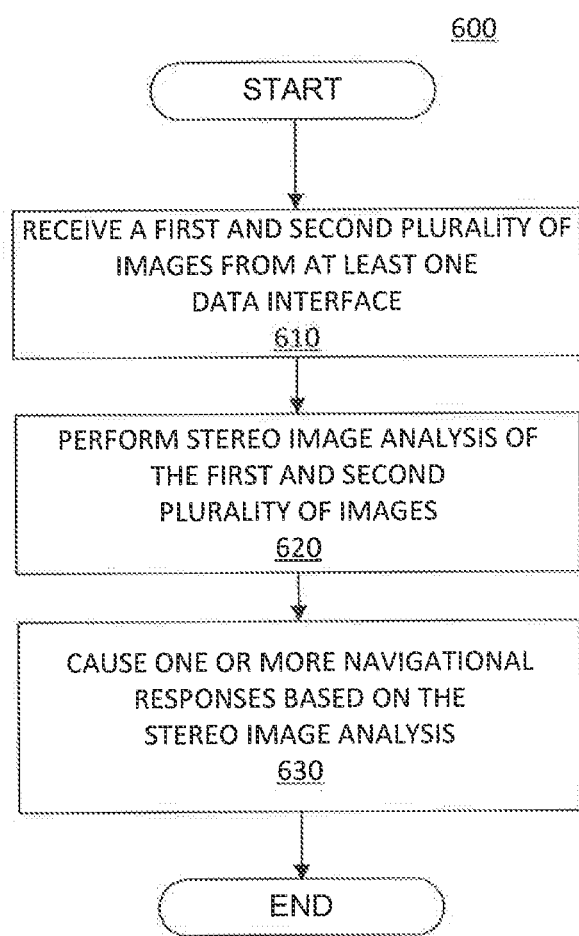
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
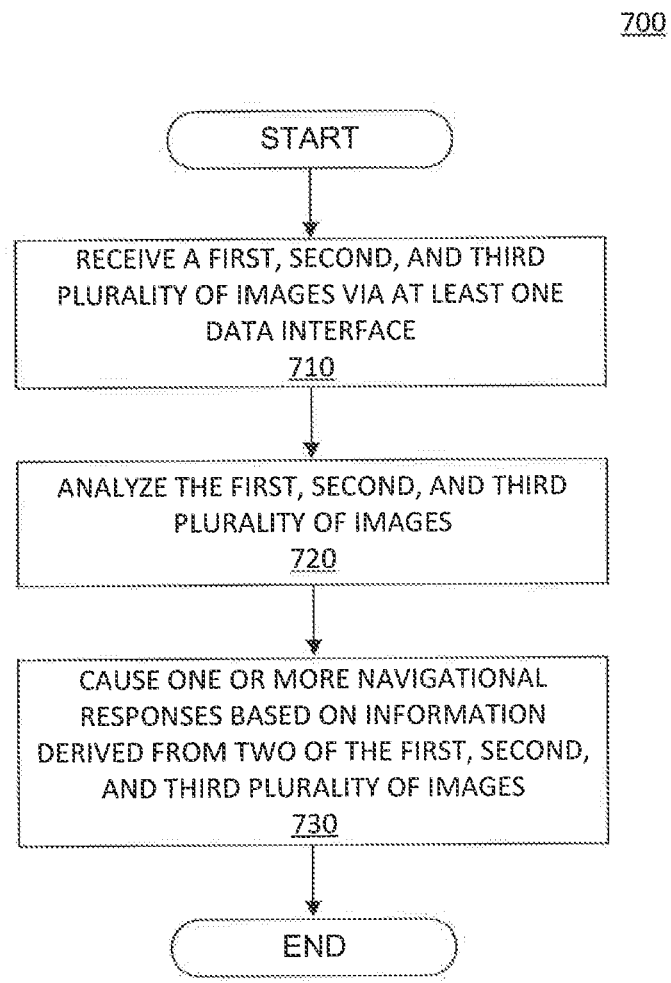
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Smart Lane Offset

System 100 may provide driver assist functionality that monitors and adjusts the free space between vehicle 200 and boundaries (e.g., lane boundaries) within which vehicle 200 is traveling. A lane may refer to a designated or intended travel path of a vehicle and may have marked (e.g., lines on a road) or unmarked boundaries (e.g., an edge of a road, a road barrier, guard rail, parked vehicles, etc.). For instance, as a default, system 100 may maximize or increase the free space between vehicle 200 and the current lane boundaries. Further, under certain conditions, system 100 may offset vehicle 200 toward one side of the current lane of travel without leaving the lane. For example, where vehicle 200 is traveling around a curve, system 100 may decrease the offset towards the inside of the curve (e.g., adjust the position of vehicle 200 so that it is closer to the inside of the curve). As another example, where obstacles—such as parked cars, pedestrians, or cyclists—are present on one side of the lane, system 100 may increase the offset on the side of vehicle 200 where the obstacles are located (e.g., adjust the position of vehicle 200 so that it is further from the obstacles).

Figure 8A:
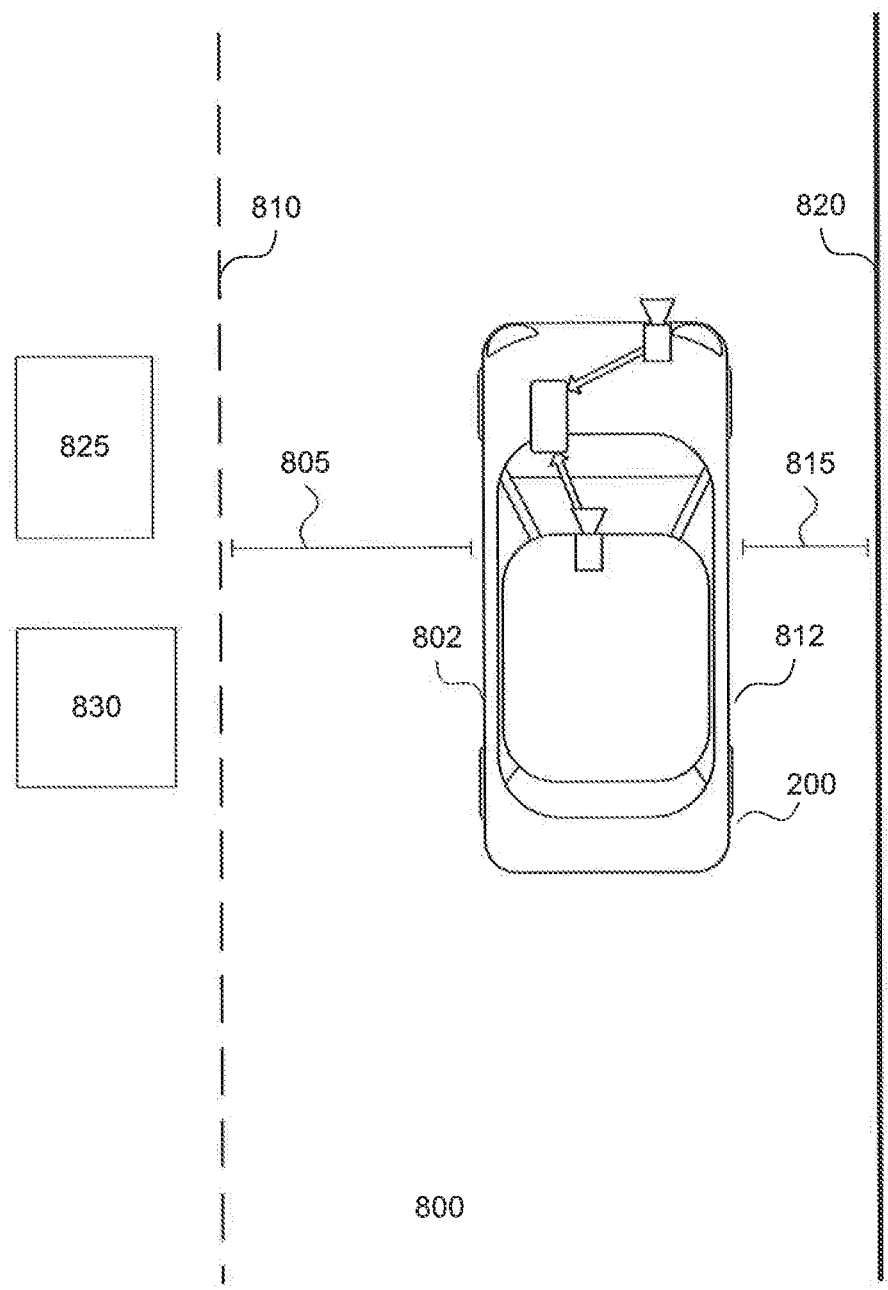
FIG. 8A is a diagrammatic representation of an exemplary vehicle traveling within a first and a second lane constraint in which a lane offset condition exists on the first vehicle side consistent with the disclosed embodiments.

FIG. 8A illustrates vehicle 200 traveling on a roadway 800 in which the disclosed systems and methods for identifying lane constraints and operating vehicle 200 within the lane constraints may be used. As shown, vehicle 200 may have a first vehicle side 802, which may be a first distance 805 from a first lane constraint 810. Similarly, vehicle 200 may have a second vehicle side 812 opposite from first vehicle side 802, and second vehicle side 812 may be a second distance 815 from second lane constraint 820. In this manner, first lane constraint 810 and second lane constraint 820 may define a lane within which vehicle 200 may travel.

Processing unit 110 may be configured to determine first lane constraint 810 and second lane constraint 820 based on a plurality of images acquired by image capture device 122-126 that processing unit 110 may receive via data interface 128. According to some embodiments, first lane constraint 810 and/or second lane constraint 820 may be identified by visible lane boundaries, such as dashed or solid lines marked on a road surface. Additionally or alternatively, first lane constraint 810 and/or second lane constraint 820 may include an edge of a road surface or a barrier. Additionally or alternatively, first lane constraint 810 and/or second lane constrain 820 may include markers (e.g., Botts' dots). According to some embodiments, processing unit 110 may determine first lane constraint 810 and/or second lane constraint 820 by identifying a midpoint of a road surface width. According to some embodiments, if processing unit 110 identifies only first lane constraint 810, processing unit 110 may estimate second lane constraint 820, such as based on an estimated lane width or road width. Processing unit 110 may identify lane constraints in this manner when, for example, lines designating road lanes are not painted or otherwise labeled.

Detection of first lane constraint 810 and/or second lane constraint 820 may include processing unit 110 determining their 3D models in camera coordinate system. For example, the 3D models of first lane constraint 810 and/or second lane constraint 820 may be described by a third-degree polynomial. In addition to 3D modeling of first lane constraint 810 and/or second lane constraint 820, processing unit 110 may perform multi-frame estimation of host motion parameters, such as the speed, yaw and pitch rates, and acceleration of vehicle 200. Optionally, processing unit 110 may detect static and moving vehicles and their position, heading, speed, and acceleration, all relative to vehicle 200. Processing unit 110 may further determine a road elevation model to transform all of the information acquired from the plurality of images into 3D space.

Generally, as a default condition, vehicle 200 may travel relatively centered within first and second lane constraints 810 and/or 820. However, in some circumstances, environmental factors may make this undesirable or unfeasible, such as when objects or structures are present on one side of the road. Thus, there may be circumstances in which it may be desirable or advantageous for vehicle 200 to be closer to one lane constraint or the other. Processing unit 110 may also be configured to determine whether such circumstances, called lane offset conditions, exist based on the plurality of images.

To determine whether lane offset conditions exist, processing unit 110 may be configured to determine the presence of one or more objects 825 in the vicinity of vehicle 200. For example object 825 may comprise another vehicle, such as a car, truck or motorcycle traveling on roadway 800. Processing unit 110 may determine, for each object 825, an offset profile. The offset profile may include a determination of whether in its current and predicted position object 825 will be within a predefined range of vehicle 200. If processing unit 110 determines that object 825 is or will be within a predefined range of vehicle 200, processing unit 110 may determine whether there is enough space within first lane constraint 810 and second lane constraint 820, for vehicle 200 to bypass object 825. If there is not enough space, processing unit 110 may execute a lane change. If there is enough space, processing unit 110 may determine whether there is enough time to bypass object 825 before the distance between vehicle 200 and object 825 closes. If there is enough time, processing unit 110 may initiate and or activate the offset maneuver to bypass object 825. The offset maneuver may be executed by processing unit 110 so that the movement of vehicle 200 is smooth and comfortable for the driver. For example, the offset slew rate may be approximately 0.15 to 0.75 m/sec. The offset maneuver may be executed so that the maximum amplitude of the offset maneuver will occur when the gap between vehicle 200 and object 825 closes. If there is not enough time, processing unit 110 may initiate braking (e.g., by transmitting electronic signals to braking system 230) and then initiate offset maneuver.

After each offset profile is set for each object 825, processing unit may combine offset profiles such that the maximum lateral distance is kept from each object 825 that vehicle 200 is bypassing. That is, offset maneuvers may be modified and/or executed such that the lateral distance between vehicle 200 and each object 825 that vehicle 200 is bypassing is maximized.

Additionally or alternatively, object 825 may be a parked or stationary vehicle, a wall, or a person, such as pedestrian or cycling traffic. Processing unit 110 may determine a lane offset condition exists based on certain characteristics of object 825. For example, processing unit 110 may determine object 825 constitutes a lane offset condition if the height of object 825 exceeds a predetermined threshold, such as 10 cm from a road surface. In this manner, processing unit 110 may be configured to filter out objects that would not present a lane offset condition, such as small pieces of debris.

Additionally or alternatively, processing unit 110 may be configured to determine whether a lane offset condition exists on first vehicle side 802 based on a position of a target object 830 on vehicle first side 802. Target object 830 may include one or more objects that constitute a lane offset condition. Additionally or alternatively, target object 830 may not constitute a lane offset condition. For example, target object 830 may be a street sign or other object a sufficient distance from the travel lane or occurring with sufficient infrequency to not constitute a lane offset condition. Processing unit 110 may be configured to conclude a lane offset condition does not exist if such a target object 830 is detected.

Figure 8B:
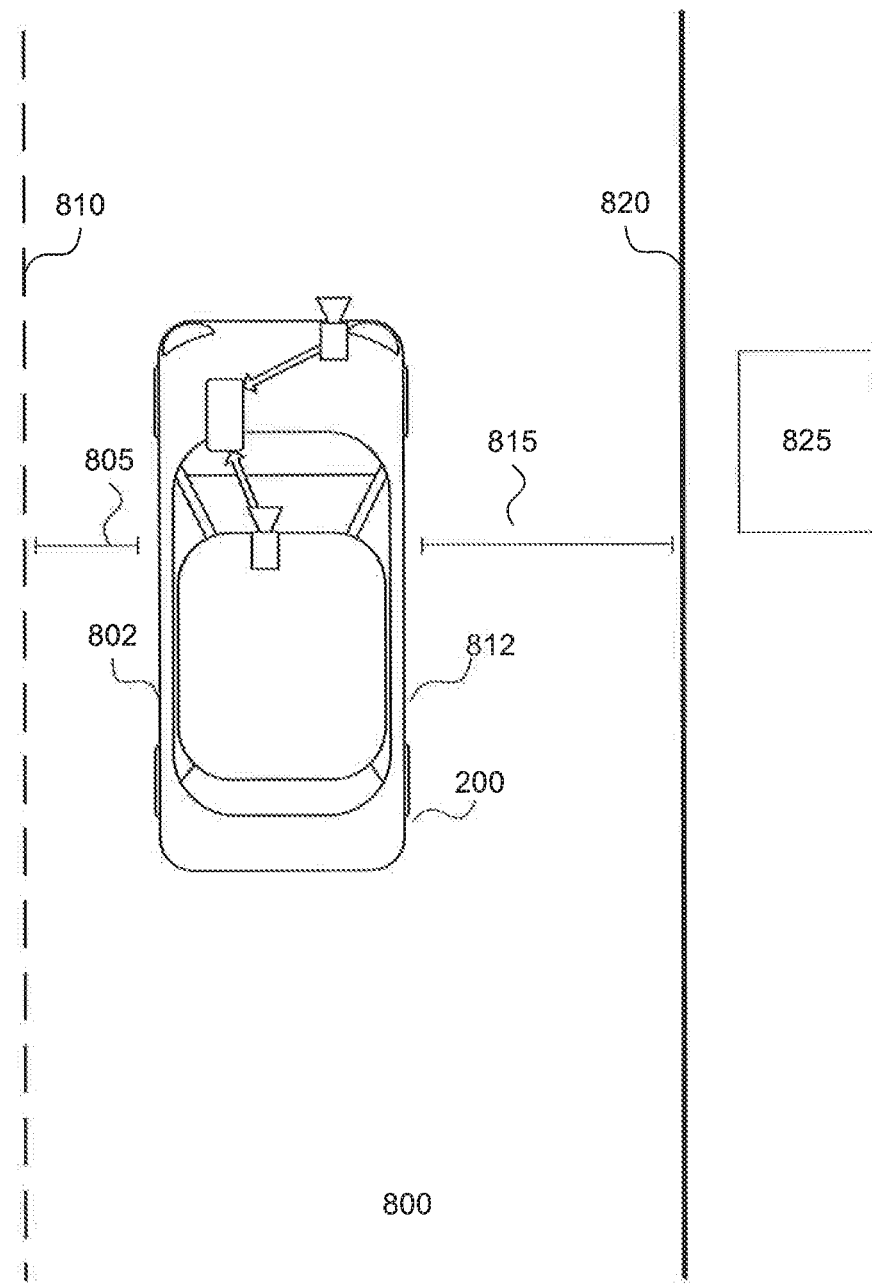
FIG. 8B is a diagrammatic representation of an exemplary vehicle traveling within a first and a second lane constraint in which a lane offset condition exists on the second vehicle side consistent with the disclosed embodiments.

Processing unit 110 may be configured to cause vehicle 200 to travel such that first distance 805 and second distance 810 are substantially different to avoid or stay farther away from object 825. For example, if a lane offset condition exists on first vehicle side 802, processing unit 110 may be configured to cause vehicle 200 to travel within first lane constraint 810 and second lane constraint 820 such that first distance 805 is greater than second distance 815. This is illustrated, for example, in FIG. 8A. Alternatively, if a lane offset condition exists on second vehicle side 812, processing unit 110 may create or execute an offset profile that is configured to cause vehicle 200 to travel within first lane constraint 810 and second lane constraint 820 such that first distance 805 is less than second distance 815. This is illustrated, for example, in FIG. 8B.

As another example, a parked vehicle may be located on one side of vehicle 200 and a pedestrian may be located on the other side of vehicle 200. In such a situation, system 100 may determine that is desirable to reduce the distance between vehicle 200 and the parked vehicle, in order to provide more space between vehicle 200 and the pedestrian. Accordingly, processing unit 110 may cause vehicle 200 to travel such that the distance between the parked vehicle is reduced.

The identity of first vehicle side 802 and second vehicle side 812 need not be static, such that at different points in time, processing unit 110 may identify first vehicle side 802 as the driver's side or as the passenger's side of vehicle 200. For example, the identity of first vehicle side 802 may change depending on the presence of one or more objects 825 on that side of vehicle 200, such that if one lane offset condition exists based on object 825, it exists on first vehicle side 802. In such circumstances, processing unit 110 may create or execute an offset profile that is configured to cause vehicle 200 to travel within first lane constraint 810 and second lane constraint 820 such that first distance 805, which is greater than second distance 815, is provided toward object 825.

According to some embodiments, when a lane offset condition exists on first vehicle side 802, processing unit 110 may create an offset profile configured to cause vehicle 200 to travel within first lane constraint 810 and second lane constraint 820 such that first distance 805 is at least 1.25 times greater than second distance 815. Additionally or alternatively, when a lane offset condition exists on first vehicle side 802, processing unit 110 may create an offset profile that is configured to cause vehicle 200 to travel within first lane constraint 810 and second lane constraint 820 such that first distance 805 is at least 2 times greater than second distance 815.

Figure 8C:
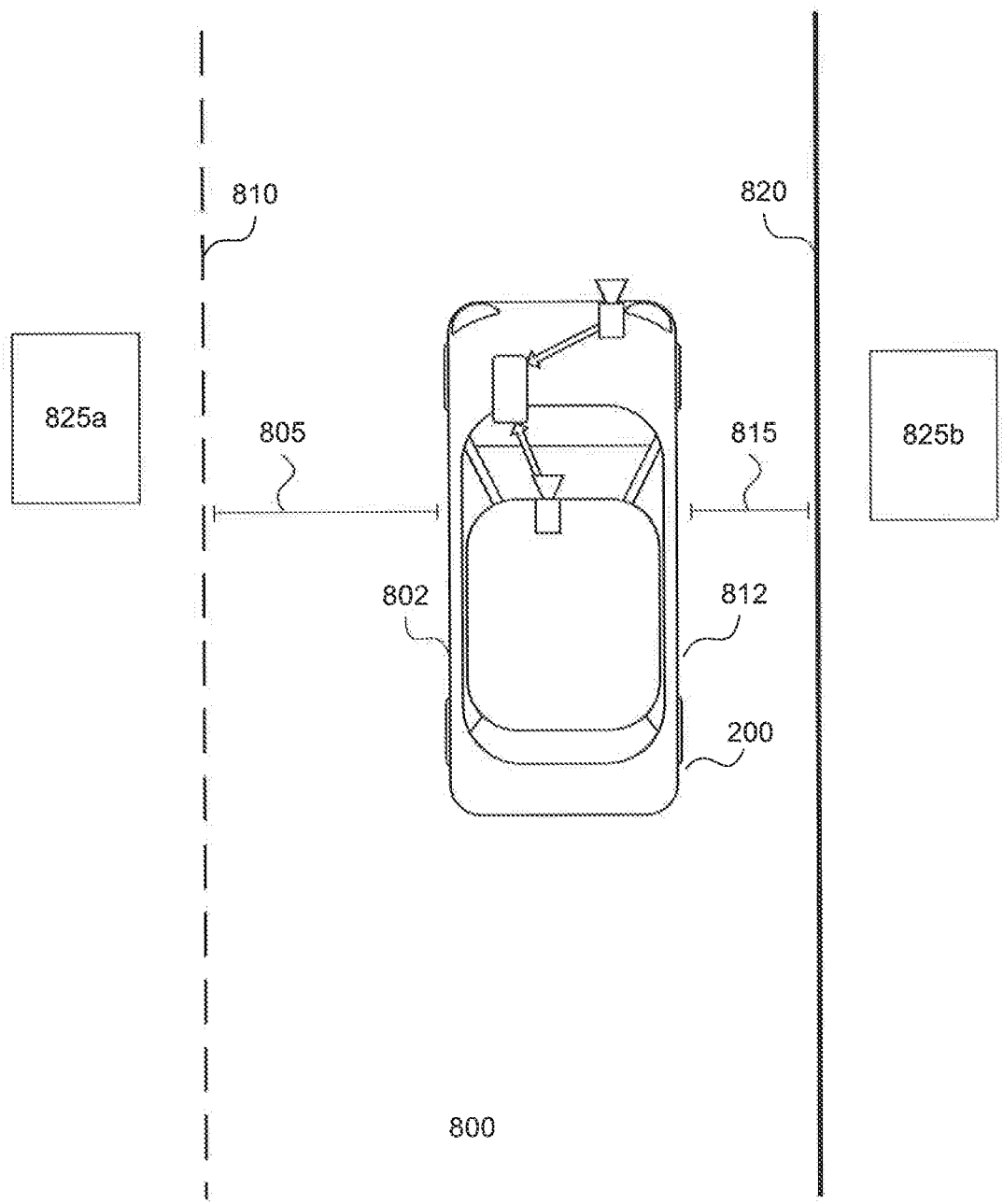
FIG. 8C is a diagrammatic representation of an exemplary vehicle traveling within a first and a second lane constraint on a curved road consistent with the disclosed embodiments.

In some embodiments, as shown in FIG. 8C, processing unit 110 may determine a lane offset condition exists on both first vehicle side 802 and on second vehicle side 812. Processing unit 110 may then create an offset profile for this offset condition that is configured to cause vehicle 200 to travel within first lane constraint 810 and second lane constraint 820 such that first distance 805 is substantially the same as second distance 815.

Processing unit 110 may be configured so that the offset profiles for moving objects 825 as well as stationary objects 825 are prioritized. For example, processing unit 110 may prioritize offset profiles to keep a predefined distance between vehicle 200 and moving objects 825 and/or static objects 825. Processing unit 200 may prioritize these offset conditions over those offset conditions based on certain lane characteristics, such as a curve. The last priority lane offset condition may include mimicking a lead vehicle.

Processing unit 110 may factor offset profiles or offset conditions into a desired look-ahead point, which may be located at the middle of the lane defined by first lane constraint 810 and second lane constraint 820. Processing unit 110 may compute and implement a yaw rate command based on the look-ahead point and the offset profiles. The yaw rate command may be used to compute a torque command based on the yaw rate command and the yaw rate of vehicle 200 measured by using a gyroscope. Processing unit 110 may transmit the torque command to a steering system (e.g., steering system 240) of vehicle 200.

According to some embodiments, input from a driver of vehicle 200, such as via user interface 170, may override processing unit 110. For example, a user input may override the control of processing unit 110 to cause vehicle 200 to travel within first lane constraint 810 and second lane constraint 820 such that first distance 805 is greater than second distance 815.

Additionally or alternatively, processing unit 110 may be configured to determine, based on the plurality of images captured by image capture device 122, whether a lane offset condition is substantially non-existent. This may include circumstances in which one or more objects 825 below a certain size threshold are detected, one or more objects 825 detected are outside of a predetermined distance from the lane constraint, and/or when no objects 825 are detected. Under such circumstances, processing unit 110 may be configured to cause vehicle 200 to travel within first lane constraint 810 and second lane constraint 820 such that first distance 805 is equal to or substantially equal to second distance 815.

Figure 8D:
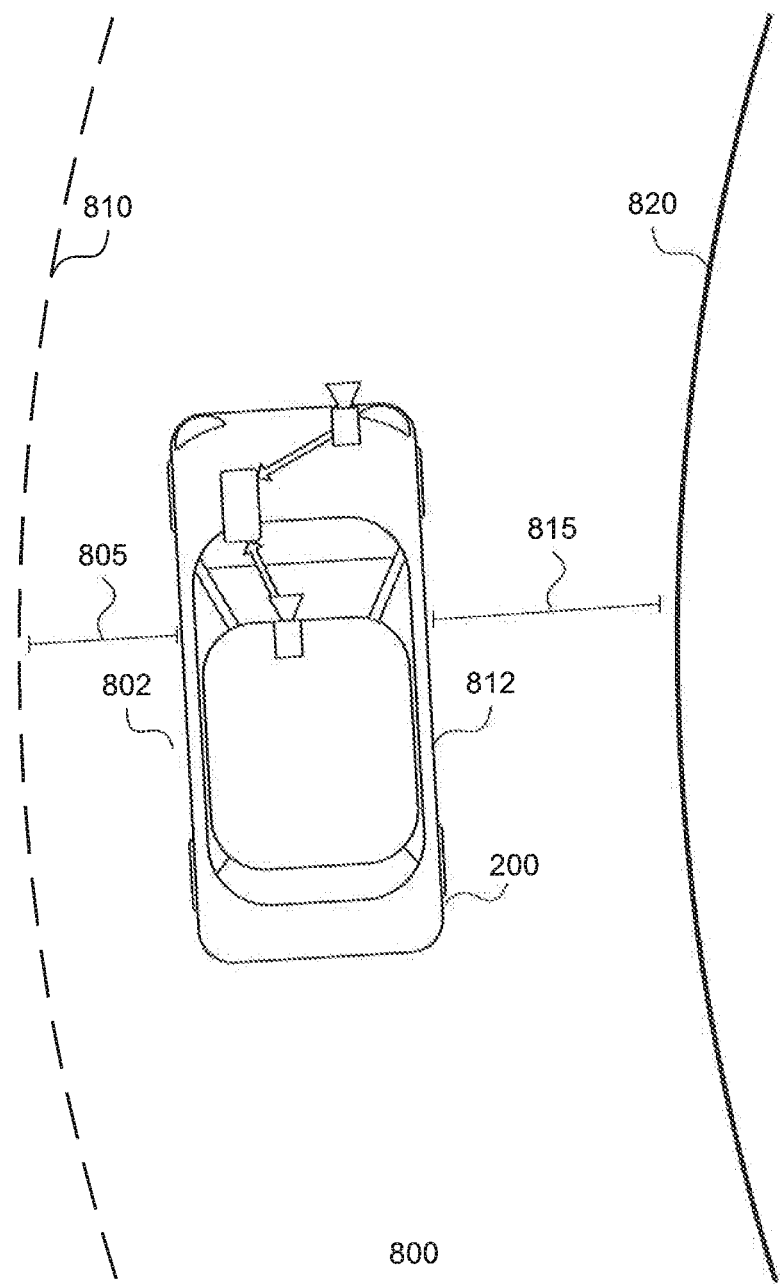
FIG. 8D is a diagrammatic representation of an exemplary vehicle traveling within a first and a second lane constraint in which a lane offset condition exists on both the first vehicle side and on the second vehicle side consistent with the disclosed embodiments.

A lane offset condition may include a curved road, as illustrated in FIG. 8D. Processing unit 110 may be configured to cause vehicle 200 to travel within first lane constraint 810 and second lane constraint 820 such that first distance 805 is toward the outside of the curved road relative to vehicle 200 and second distance 815 is toward an inside of the curved road relative to vehicle 200. For example, first distance 805 may be less than second distance 815.

Figure 9:
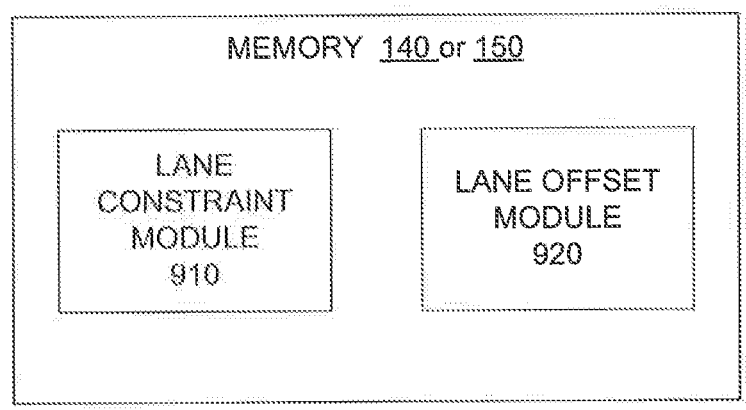
FIG. 9 is a diagrammatic representation of the memory of an exemplary navigation system consistent with the disclosed embodiments.

FIG. 9 is an exemplary block diagram of memory 140 and/or 150, which may store instructions for performing one or more operations consistent with disclosed embodiments. As illustrated in FIG. 9, memory 140 may store one or more modules for performing the lane offset condition detection and responses described herein. For example, memory 140 may store a lane constraint module 910 and a lane offset module 920. Application processor 180 and/or image processor 190 may execute the instructions stored in any of modules 910 and 920 included in memory 140. One of skill in the art will understand that references in the following discussions to processing unit 110 may refer to application processor 180 and image processor 190 individually or collectively. Accordingly, steps of any of the following processes may be performed by one or more processing devices.

Lane constraint module 910 may store instructions which, when executed by processing unit 110, may detect and define first lane constraint 810 and second lane constraint 820. For example, lane offset module 910 may process the plurality of images received from at least one image capture device 122-124 to detect first lane constraint 810 and second lane constraint 820. As discussed above, this may include identifying painted lane lines and/or measuring a midpoint of a road surface.

Lane offset module 920 may store instructions which, when executed by processing unit 110, may detect the presence of a lane offset condition and/or identify whether lane offset condition is present on first vehicle side 802 and/or second vehicle side 812. For example, lane offset module 920 may process the plurality of images to detect the presence of object(s) 825 on first vehicle side 802 and/or second vehicle side 812. Lane offset module 920 may process the plurality of images to detect a curve in the road on which vehicle 200 is traveling. Additionally or alternatively, lane offset module 920 may receive information from another module or other system indicative of the presence of object(s) 825 and/or a curved lane. Lane offset module 920 may execute control to change the position of vehicle 200 to first lane constraint 810 and/or second lane constraint 820. For example, if lane offset module 920 determines a lane offset condition only on first vehicle side 802, lane offset module 920 may move vehicle 200 closer to second lane constraint 820. On the other hand, if lane offset module 920 determines a lane offset condition only on first vehicle side 812, lane offset module 920 may move vehicle 200 closer to first lane constraint 810.

Figure 10:
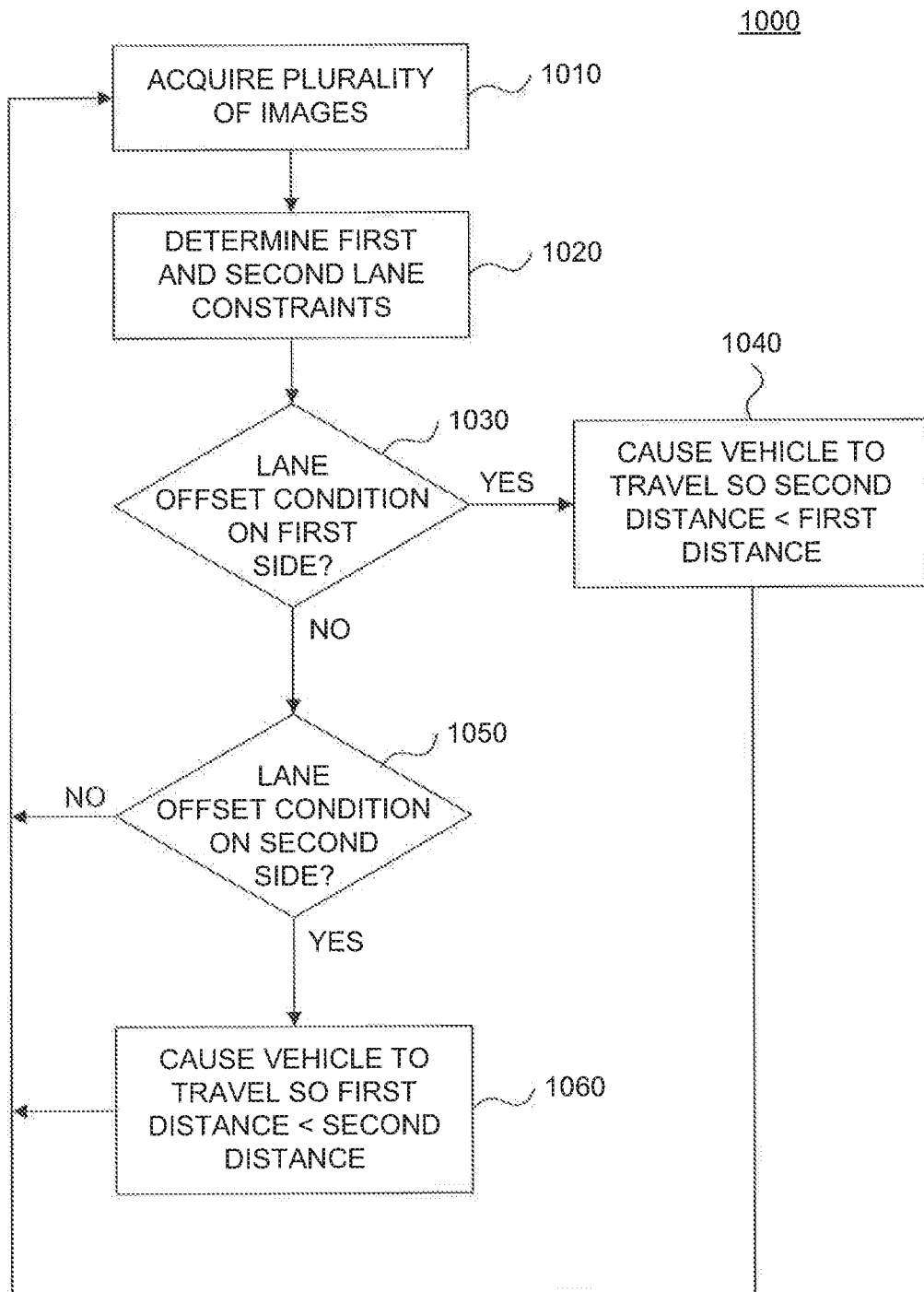
FIG. 10 is a flowchart of an exemplary method for navigating a vehicle consistent with the disclosed embodiments.

FIG. 10 illustrates a process 1000 for navigating vehicle 200, consistent with disclosed embodiments. Process 1000 may identify lane constraints that define a lane of travel for vehicle travel. Process 1000 include causing vehicle 200 to travel closer to one or the other lane constraint, such as first lane constraint 810 or second lane constraint 820, in response to detecting a lane offset condition. In this manner, process 1000 may be used to drive vehicle 200 within lane constraints as well as account for environmental factors that may make it more desirable to shift vehicle 200 within first lane constraint 810 and second lane constraint 820.

At step 1010, process 1000 may include acquiring, using at least one image capture device 122, 124, and/or 126, a plurality of images of an area in the vicinity of vehicle 200. For example, processing unit 110 may receive the plurality of images may through data interface 128. For example, processing unit 110 may be configured to determine the presence of one or more objects 825 on the side of the road. For example, object 825 may be a parked or stationary vehicle, a wall, or a person, such as pedestrian or cycling traffic. Processing unit 110 may determine if a lane offset condition exists based on certain characteristics of object 825. For example, processing unit 110 may determine that object 825 constitutes a lane offset condition if the height of object 825 exceeds a predetermined threshold, such as 10 cm from a road surface. In this manner, processing unit 110 may be configured to filter out objects that would not present a lane offset condition, such as small pieces of debris.

Additionally or alternatively, processing unit 110 may be configured to determine whether a lane offset condition exists on first vehicle side 802 based on a position of a target object 830 on vehicle first side 802. Target object 830 may be one or more objects that constitute a lane offset condition. Additionally or alternatively, target object 830 may not constitute a lane offset condition. For example, target object 830 may be a road barrier or a street sign. Processing unit 110 may be configured to conclude a lane offset condition does not exist if such a target object 830 is detected.

At step 1020, process 1000 may determine from the plurality of images a first lane constraint on first vehicle side 802 and a second lane constraint on second vehicle side 812. For example, processing unit 110 may be configured to determine first lane constraint 810 and second lane constraint 820 based on the plurality of images received via data interface 128.

At step 1030, process 1000 may determine whether a lane offset condition exists on first vehicle side 802. If a lane offset condition does exist on first vehicle side 802, at step 1040, process 1000 may include causing vehicle 200 to travel within first lane constraint 810 and second lane constraint 820 such that second distance 815 is less than first distance 805. Processing unit 110 may be configured to cause vehicle 200 to travel such that first distance 805 and second distance 810 are substantially different to avoid or stay farther away from object 825. For example, if a lane offset condition exists on first vehicle side 802, processing unit 110 may be configured to cause vehicle 200 to travel within first lane constraint 810 and second lane constraint 820 such that first distance 805 is greater than second distance 815. This is illustrated, for example, in FIG. 8A. Alternatively, if a lane offset condition exists on second vehicle side 812, processing unit 110 may be configured to cause vehicle 200 to travel within first lane constraint 810 and second lane constraint 820 such that first distance 805 is less than second distance 815. This is illustrated, for example, in FIG. 8B. For example, to navigate vehicle 200 according to process 1000, processing unit 110 may transmit electronic signals to one or more of throttling system 220, braking system 230, and/or steering system 240 of vehicle 200. If a lane offset condition does not exist on first vehicle side 802, in step 1050, method may include determining whether lane offset condition exists on second vehicle side 812. If a lane offset condition exists on second vehicle side 812, the method may include causing vehicle 200 to travel between first lane constraint 810 and second lane constraint 820 such that first distance 805 is less than second distance 815.

Navigating a Vehicle to a Default Lane

System 100 may provide driver assist functionality that monitors the location of vehicle 200 in a current lane of travel and moves vehicle 200 into a predetermined default travel lane if the current lane of travel is not the predetermined default travel lane. The predetermined default travel lane may be defined by a user input and/or as a result of processing images received from at least one image capture device 122-126.

System 100 may also provide notification of an impending lane change of vehicle 200 to the predetermined default travel lane to the driver and passengers of vehicle 200 and/or other drivers. For example, system 100 may activate a turn signal positioned at or near one of bumper regions 210. Additionally or alternatively, system 100 may sound an audible notification, such as through speakers 360. Vehicle 200 may use system 100 to select a particular lane as predetermined default travel lane when vehicle is traveling. When the current lane within which vehicle 200 is traveling—e.g., the current lane of travel—differs from the predetermined default travel lane, system 100 may cause vehicle 200 to make a lane change, e.g., into the predetermined default travel lane.

Figure 11:
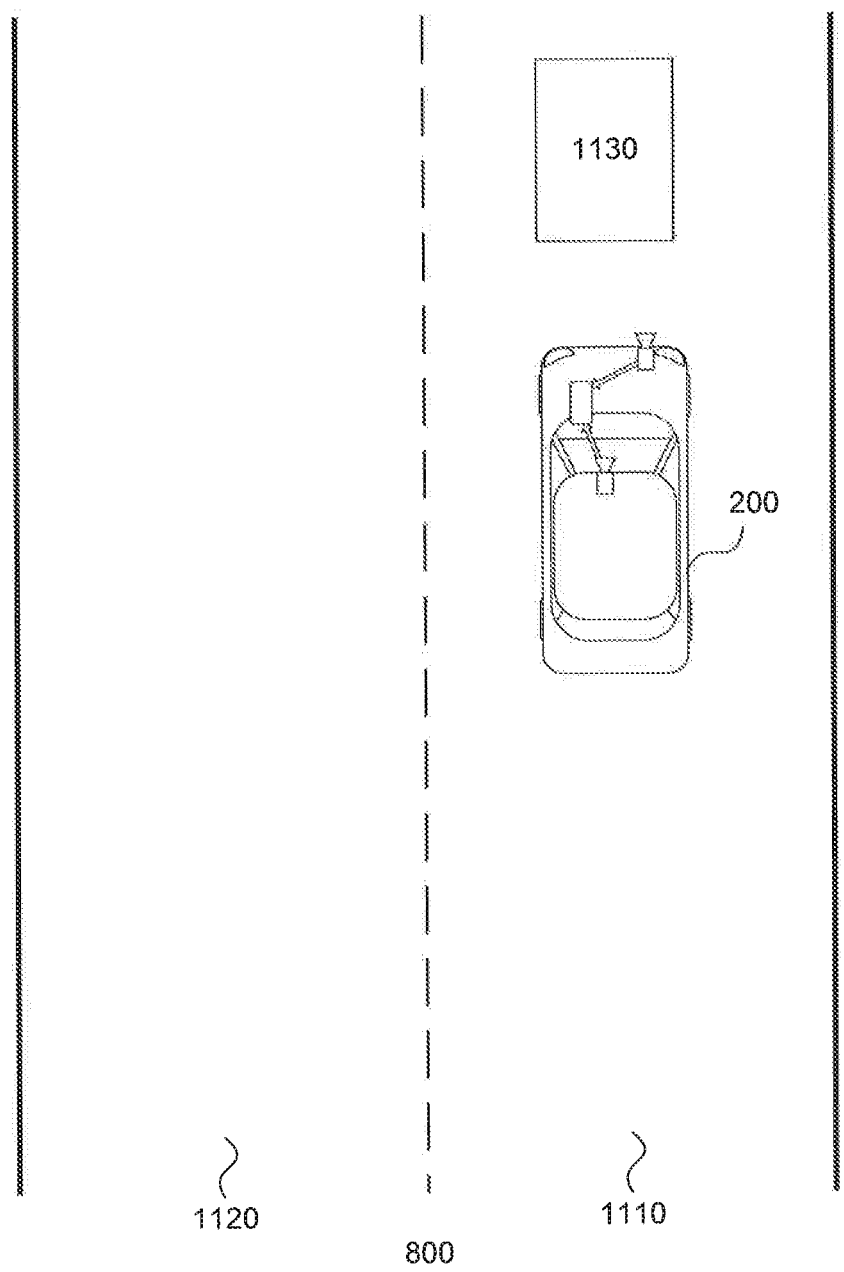
FIG. 11 is a diagrammatic representation of an exemplary vehicle including a navigation system traveling within a default lane consistent with the disclosed embodiments.

FIG. 11 illustrates vehicle 200 traveling in a current lane of travel 1110 of roadway 800. According to some embodiments, vehicle 200 may have a predetermined default travel lane 1120. For example, predetermined default travel lane 1120 may be the right-most lane of roadway 800. Navigation system 100 may be configured to determine whether vehicle 200 is traveling in predetermined default travel lane 1120 and, if not, cause vehicle 200 to change to predetermined default travel lane 1120. For example, processing unit 110 may be configured to compare current lane of travel 1110 with predetermined default travel lane 1120 and cause vehicle 200 to return to predetermined default travel lane 1120.

According to some embodiments, processing unit 110 may detect an object 1130 in predetermined default travel lane 1120 based on a plurality of images acquired by one or more of image capture devices 122-126. Processing unit 110 may detect the position and speed of vehicle 200 relative to object 1130 by analyzing the images using techniques described in connection with FIGS. 5A-5D, above. According to some embodiments, processing unit 110 may determine whether vehicle 200 should pass object 1130. This may be desirable if, for example, the speed and/or acceleration of vehicle 200 relative to object 1130 exceeds a certain threshold.

Figure 12A:
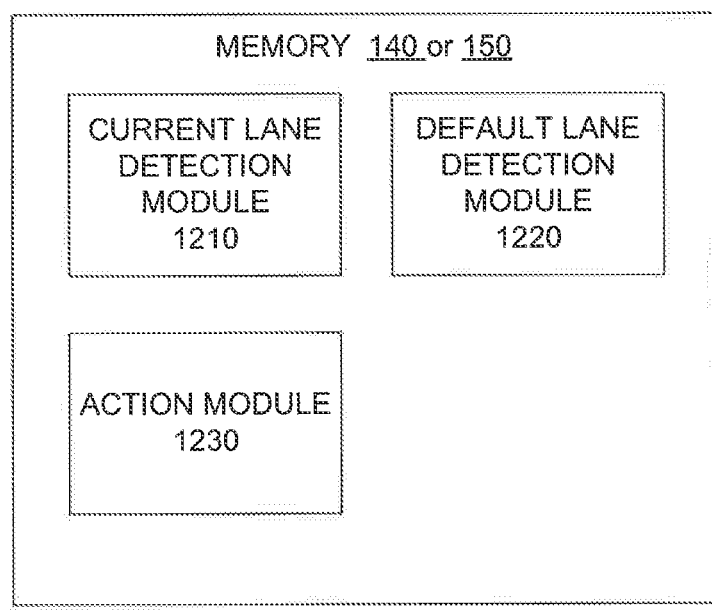
FIG. 12A is a diagrammatic representation of the memory of an exemplary navigation system consistent with the disclosed embodiments.

FIG. 12A is an exemplary block diagram of memory 140, which may store instructions for performing one or more operations consistent with disclosed embodiments. As illustrated in FIG. 12A, memory 140 may store one or more modules for performing the default travel lane and current travel lane detection and responses described herein. For example, memory 140 may store a current lane detection module 1210, a default lane detection module 1220, and an action module 1230.

Current lane detection module 1210 may store instructions which, when executed by processing unit 110, may detect and define current lane of travel 1110. For example, processing unit 110 may execute current lane detection module 1212 to process the plurality of images received from at least one image capture device 122-124 and detect current lane of travel 1110. This may include detecting the relative position of vehicle 200 with respect to the edge of roadway 800, a midpoint of roadway 800, and/or lane markers, such as painted lane lines. Processing unit 110 may detect the position of vehicle 200 relative to roadway 800 by analyzing the images using techniques described in connection with FIGS. 5A-5D, above.

Default lane detection module 1220 may store instructions which, when executed by processing unit 110, may identify predetermined default travel lane 1120 and compare default lane detection module 1220 to current lane of travel 1110 identified by current lane detection module 1210. Default lane detection module 1220 may identify predetermined default travel lane 1120 based upon a user input and/or the plurality of images received from at least one image capture device 122-124. For example, a user may select a default lane through voice commands received by speakers 360 or by making a selection on a menu displayed on touch screen 320.

In some embodiments, predetermined default travel lane 1120 may be the right-most travel lane, or it may be the lane that has the more desirable features. For example, default lane detection module 1220 may include instructions to select the lane with less traffic, the lane in which vehicles are traveling closest to speed of vehicle 200, and/or a lane closest to an approaching exit or street to which vehicle 200 will turn. In some embodiments, predetermined default travel lane 1120 may be determined based on data received from position sensor 130, such as a global positioning system.

Action module 1230 may store instructions which, when executed by processing unit 110, may cause a response to the identification of current lane of travel 1110 and predetermined default travel lane 1120. For example, processing unit 110 may execute action module 1230 to cause vehicle 200 to change lanes if current lane of travel 1110 is not the same as predetermined default travel lane 1120. Additionally or alternatively, action module 1230 may initiate a notification of the lane change, such as activating turn signal 210 and or causing an audible announcement.

Action module 1230 may include instructions that cause processing unit 110 to determine whether vehicle 200 should move out of predetermined default travel lane 1120. For example, action module 1230 may determine that object 1130 in predetermined default travel lane 1120 should be bypassed by vehicle 200.

Action module 1230 may further include instructions that cause processing unit 110 to determine whether it is safe to make a lane change. For example, prior to executing a lane change, processing unit 110 may evaluate determine one or more characteristics of roadway 800 based on, for example, analysis of the plurality of images conducted using techniques described in connection with FIGS. 5A-5D, above. If the analysis indicates conditions are not safe to change lanes, processing unit 110 may determine that vehicle 200 should stay in the current lane.

Action module 1230 may include additional instructions for manipulating vehicle 200 to maneuver out of and return to predetermined default travel lane 1120, such as for bypassing object 1130. When executing these instructions, processing unit 110 may estimate a location of predetermined default travel lane 1120 using estimated motion of vehicle 200. This may be advantageous in circumstances in which predetermined default travel lane 1120 does not remain detectable by image capture devices 122-124.

Processing unit 110 may be configured to execute an offset profile that offsets vehicle 200 from predetermined default travel lane 1120 by a full lane width, which may be estimated based on the distance between detected lane markers. The offset maneuver defined by offset profile may be executed by processing unit 110 so that the movement of vehicle 200 is smooth and comfortable for the driver. For example, the offset slew rate may be approximately 0.15 to 0.75 m/sec. During the offset maneuver, processing unit 110 may execute instructions from action module 1230 that switch to following the center of current lane of travel 1110. These instructions may include gradually transitioning from following the predicted lane with offset to following current lane of travel 1110. A gradual transition may be accomplished by defining desired look-ahead point so that it is not allowed to change in time more than the recommended slew rate, which may be around 0.25 m/sec.

The instructions for transitioning vehicle 200 from predetermined default travel lane 1120 may be used to transition vehicle 200 back into predetermined default travel lane. For example, processing unit 110 may be configured to execute an offset profile that offsets vehicle 200 from current lane of travel 1110 by a full lane width, which may be estimated based on the distance between detected lane markers. The offset maneuver defined by offset profile may be executed by processing unit 110 so that the movement of vehicle 200 is smooth and comfortable for the driver. For example, the offset slew rate may be approximately 0.15 to 0.75 m/sec. During the offset maneuver, processing unit 110 may execute instructions from action module 1230 that switch to following the center of predetermined default travel lane 1120. These instructions may include gradually transitioning from following the predicted lane with offset to following predetermined default travel lane 1120. A gradual transition may be accomplished by defining desired look-ahead point so that it is not allowed to change in time more than the recommended slew rate, which may be around 0.25 m/sec.

At one or more of the steps for transitioning vehicle 200 between two lanes, processing unit 110 may compute and implement a yaw rate command based on the look-ahead point and the offset profiles. The yaw rate command may be used to compute a torque command based on the yaw rate command and the yaw rate of vehicle 200 measured using a gyroscope. Processing unit 110 may transmit a torque command to a steering system (e.g., steering system 240) of vehicle 200.

Figure 12B:
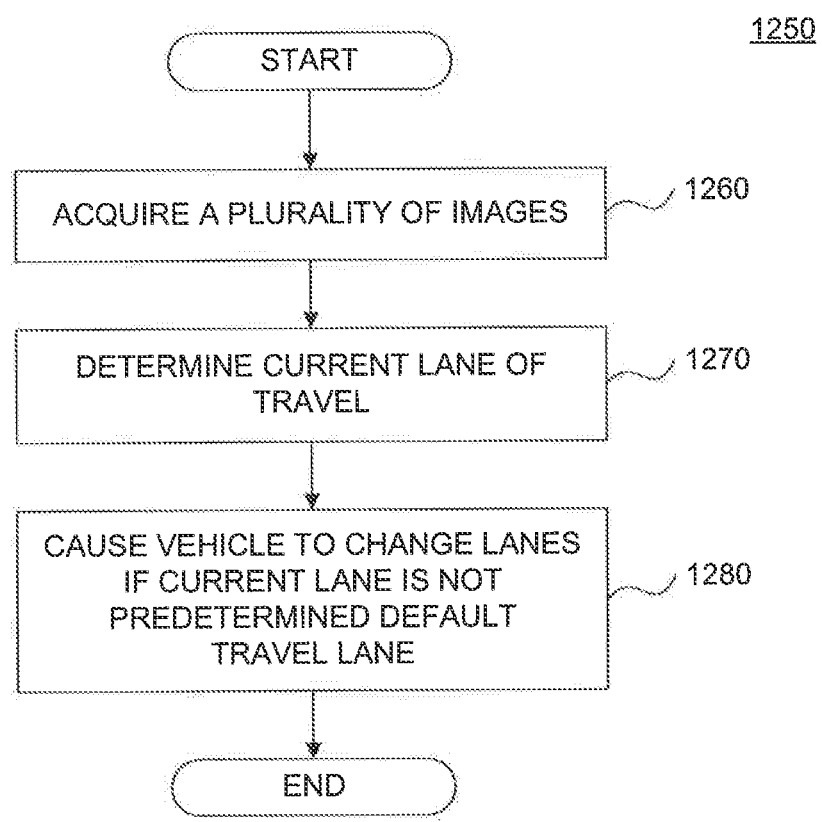
FIG. 12B is a flowchart of an exemplary process for navigating a vehicle consistent with the disclosed embodiments.

FIG. 12B illustrates a process 1250 for navigating vehicle 200 to a default lane consistent with disclosed embodiments. According to some embodiments, process 1250 may be implemented by one or more components of navigation system 100, such as at least one processing unit 110. Process 1250 may identify current lane of travel 1110 of vehicle 200 and compare it with predetermined default travel lane 1120 to determine whether vehicle 200 is traveling within predetermined default travel lane 1120. If vehicle 200 is not traveling in predetermined default travel lane 1120, processing unit 110 may cause vehicle 200 to change lanes so that it navigates to default travel lane 1120.

At step 1260, one or more of image capture devices 122-124 may acquire a plurality of images of an area in a vicinity of vehicle 200. Processing unit 110 may receive the plurality of images via data interface 128.

At step 1270, processing unit 110 may execute current lane detection module 1210 detect and define current lane of travel 1110. For example, processing unit 110 may process the plurality of images to, for example, detect the relative position of vehicle 200 with respect to the edge of roadway 100, a midpoint of roadway 100, and/or painted lane markers. Processing unit 110 may detect the position of vehicle 200 relative to roadway 800 by analyzing the images using techniques described in connection with FIGS. 5A-5D, above.

At step 1280, processing unit 110 may execute default lane detection module 1220 to identify predetermined default travel lane 1120 and compare default lane detection module 1220 to current lane of travel 1110 identified by current lane detection module 1210. Default lane detection module 1220 may identify predetermined default travel lane 1120 based upon a user input and/or the plurality of images received from at least one image capture device 122-124.

For example, as discussed above, processing unit 110 may determine predetermined default travel lane 1120 based on any number of factors. Predetermined default travel lane 1120 may be the right-most lane among the plurality of travel lanes 1110 and 1120. Additionally or alternatively, predetermined default travel lane 1120 may be determined based on an input received from a user via user interface 170, by processing the plurality of images, and/or based on data received from position sensor 130, such as a global positioning system. Predetermined default travel lane 1120 may be determined once, once per vehicle trip, or on regular intervals. For example, predetermined default travel lane 1120 may be determined dynamically in response to conditions at a given location.

If current lane 1110 is not the same as predetermined default travel lane 1120, processing unit 110 may execute action module 1230 to cause vehicle 100 to navigate to default travel lane 1120. For example, processing unit 110 may transmit electronic signals to one or more of throttling system 220, braking system 230, and/or steering system 240 of vehicle 200 to trigger the desired response. For example, processing unit 110 may cause steering system 240 to turn the steering wheel of vehicle 200 to achieve a rotation of a predetermined angle.

Further, prior to executing a lane change, processing unit 110 may determine whether it is safe (e.g., there are no vehicles or objects in the way) to change lanes. As discussed above, processing unit 110 may evaluate one or more characteristics of roadway 800 based on, for example, analysis of the plurality of images conducted using techniques described in connection with FIGS. 5A-5D, above. If conditions are not safe to change lanes, processing unit 110 may determine that vehicle 200 should stay in the current lane.

In some embodiments, execution of action module 1230 may initiate a notification of the lane change. For example, processing unit 110 may cause a signal to activate a turn signal and/or cause an audible announcement via speakers 360. Accordingly, such notification may occur prior to vehicle 200 changing lanes. In other embodiments, execution of action module 1230 may initiate a notification to a driver of vehicle 200 that vehicle 200 is not traveling in a default lane without causing the lane change to occur. Accordingly, in such an embodiment, the driver of vehicle 200 may determine whether to manually take action and steer vehicle 200 to change lanes.

In some embodiments, system 100 may notify the user of vehicle 200 and/or other drivers in the vicinity of vehicle 200 that vehicle 200 will be changing lanes if vehicle 200 will be moved to predetermined default travel lane 1120. For example, processing unit 110 may activate a turn signal of vehicle 200 prior to causing vehicle 200 to change lanes. Additionally or alternatively, an audible announcement to notify other drivers in the vicinity may be caused by processing unit 110. The audible announcement may be transmitted via, for example, Bluetooth, to receivers included in other nearby vehicles. Additionally or alternatively, at least one processing unit 110 may cause an audible indicator to notify the driver of vehicle 200 prior to causing vehicle 200 to switch lanes. In this manner, driver of vehicle 200 can anticipate the control system 100 will exert on vehicle 200.

Controlling Velocity of a Turning Vehicle

System 100 may provide driver assist functionality that controls the velocity (i.e., speed and/or direction) of vehicle 200 in different scenarios, such as while making a turn (e.g., through a curve). For example, system 100 may be configured to use a combination of map, position, and/or visual data to control the velocity of vehicle 200 when turning. In particular, system 100 may control the velocity of vehicle 200 as it approaches a curve, while navigating a curve, and/or as it exits a curve. System 100 may consider different factors to control the velocity depending on the position of vehicle 200 relative to the curve at a given time. For example, system 100 may initially cause vehicle 200 to slow down in response to learning that a curve is located a certain distance ahead of vehicle 200. While vehicle 200 turns through the curve, however, system 100 may cause vehicle 200 to accelerate and/or charge direction based on an analysis of the characteristics of the curve.

Figure 13A:
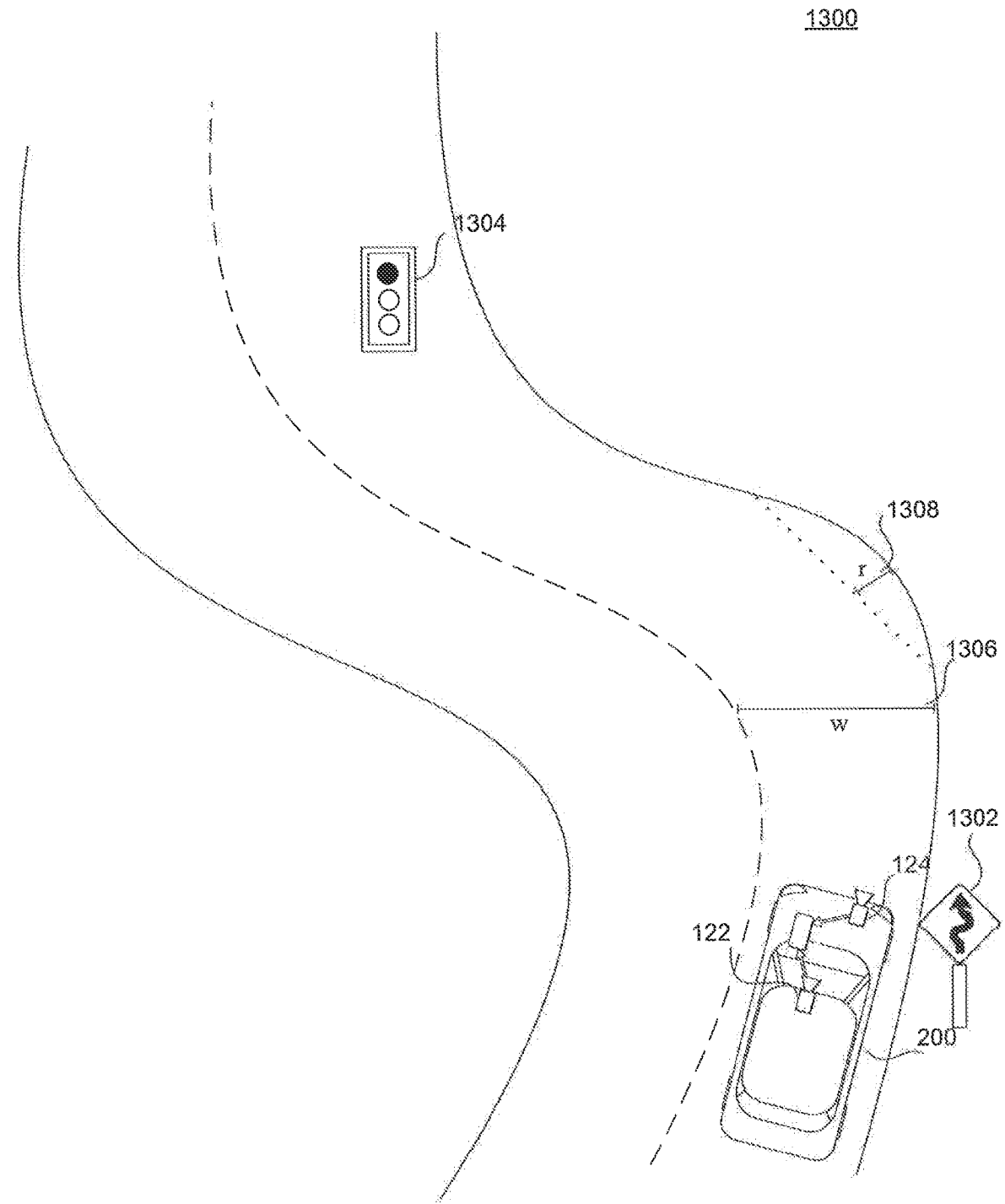
FIGS. 13A and 13B are diagrammatic representations of an exemplary vehicle approaching, and navigating, a curve with one or more characteristics consistent with the disclosed embodiments.
Figure 13B:
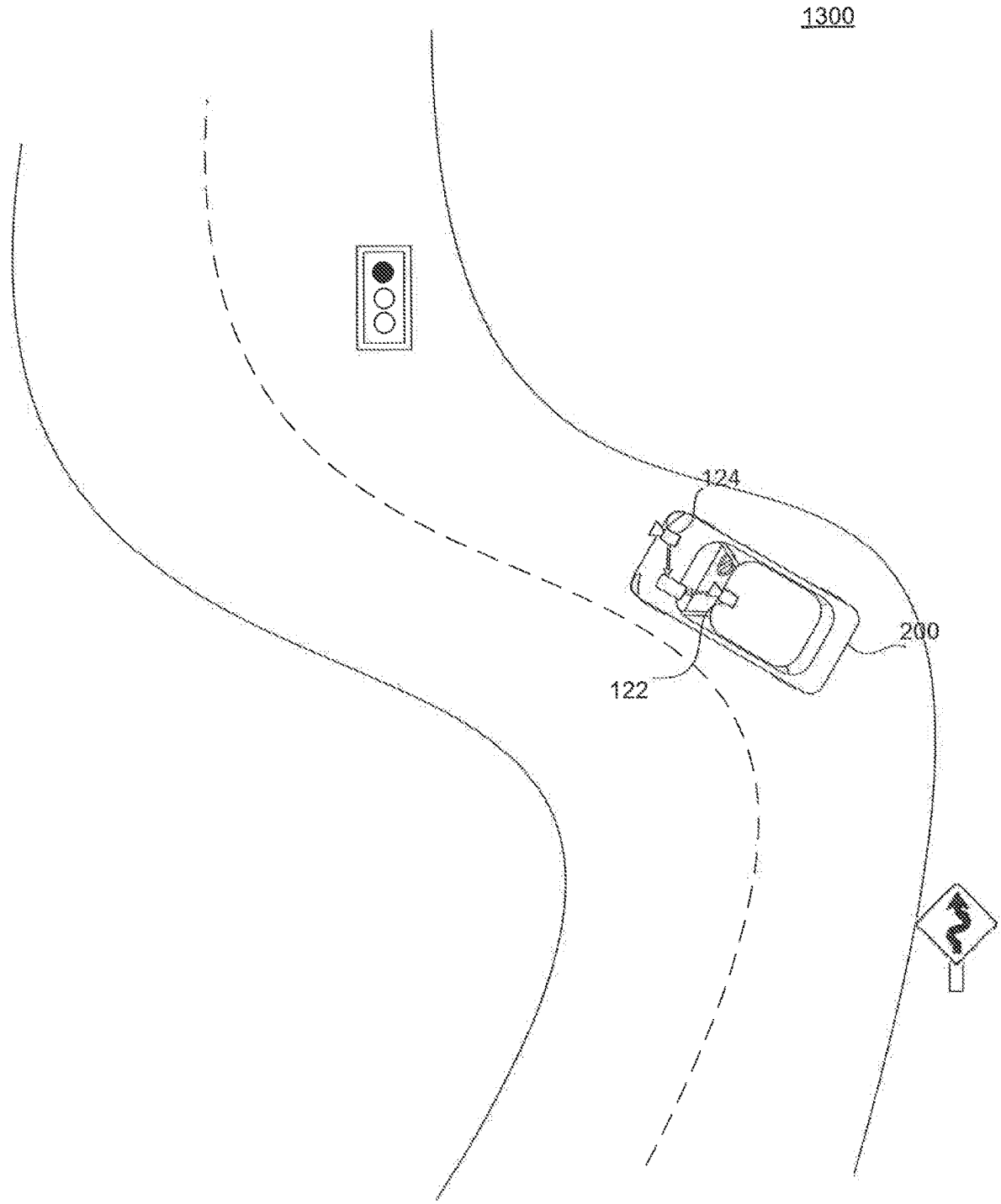

FIGS. 13A and 13B are diagrammatic representations of a vehicle (e.g., vehicle 200) approaching, and navigating, a curve with one or more characteristics on road 1300, consistent with the disclosed embodiments. As illustrated in FIG. 13A, visual indicators, such as road sign 1302 located near road 1300, may inform vehicle 200 that a curve lies ahead. In response to the warning provided by road sign 1302, a driver of vehicle 200 and/or a system 100 providing driver assist functionality of vehicle 200 may adjust the velocity of vehicle 200 (e.g., by slowing down and/or steering) to safely navigate the curve.

As vehicle 200 approaches the curve, system 100 may detect the lane width 1306 and the curve radius 1308 by using image capture devices 122 and/or 124 (which may be cameras) of vehicle 200. Based on the curve radius 1308, the lane width 1306, and other characteristics associated with the curve detected using image capture devices 122 and/or 124, system 100 may adjust the velocity of vehicle 200. Specifically, system 100 may adjust the velocity as vehicle 200 approaches the curve and/or while vehicle 200 navigates the curve. System 100 may also adjust the velocity as vehicle 200 exits the curve, in response to, for example, traffic light 1304 appearing after the curve. Further detail regarding adjustments to the velocity of vehicle 200 and detection of the lane width 1306, the radius of curvature or curve radius 1308, and characteristics associated with the curve are described in connection with FIGS. 14 and 15, below.

In some embodiments, system 100 may recognize a curve to be navigated based on map data and/or vehicle position information (e.g., GPS data). System 100 may determine an initial target velocity for the vehicle based on one or more characteristics of the curve as reflected in the map data. System 100 may adjust a velocity of the vehicle to the initial target velocity and determine, based on one or more images acquired by one or more of image capture devices 122-126, one or more observed characteristics of the curve. System 100 may determine an updated target velocity based on the one or more observed characteristics of the curve and adjust the velocity of the vehicle to the updated target velocity.

Figure 14:
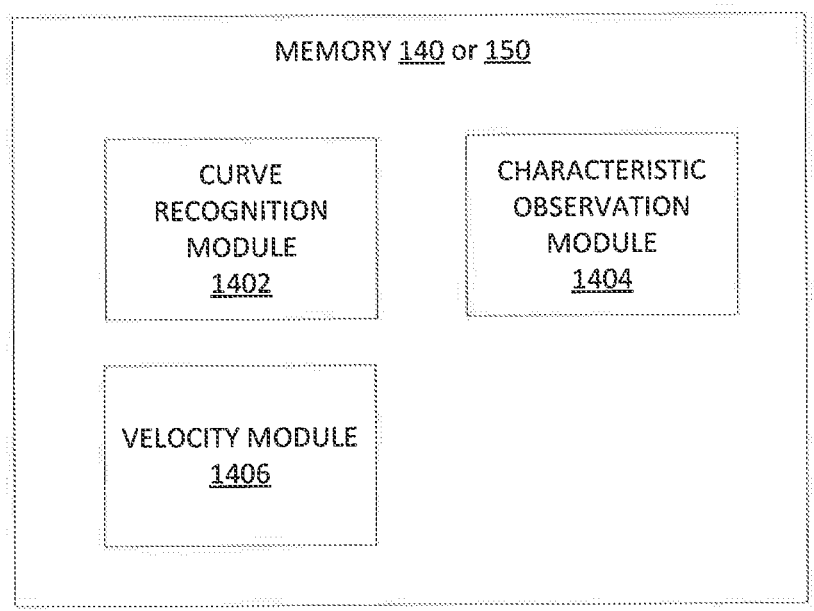
FIG. 14 is an exemplary block diagram of a memory configured to store instructions for performing one or more operations consistent with the disclosed embodiments.

FIG. 14 is an exemplary block diagram of a memory configured to store instructions for performing one or more operations consistent with the disclosed embodiments. As indicated in FIG. 14, memory 140 may store a curve recognition module 1402, a characteristic observation module 1404, and a velocity module 1406. The disclosed embodiments are not limited to any particular configuration of memory 140. Further, processing unit 110 may execute the instructions stored in any of modules 1402-1406 included in memory 140.

In one embodiment, curve recognition module 1402 may store software instructions (such as computer vision software) which, when executed by processing unit 110, detects a curve by, for example, analyzing one or more sets of images and/or using map and/or position data (e.g., data stored in map database 160). The image sets may be acquired by one or more of image capture devices 122, 124, and 126. Based on the analysis, system 100 (e.g., via processing unit 110) may cause a change in velocity of vehicle 200. For example, processing unit 110 may cause vehicle 200 to reduce its speed by a predetermined amount and/or adjust its direction by a particular angle if processing unit 110 detects the presence of a curve located within a minimum threshold distance ahead of vehicle 200.

In one embodiment, characteristic observation module 1404 may store software instructions (such as computer vision software) which, when executed by processing unit 110, observes characteristics associated with a curve detected by system 100 (e.g., via execution of curve recognition module 1402). Processing unit 110 may observe characteristics associated with a detected curve by analyzing one or more sets of images acquired by one or more of image capture devices 122, 124, and 126 and/or using map and/or position data (e.g., data stored in map database 160). The analysis may yield information associated with the curve, such as curve radius 1308, lane width 1306, a degree of curvature, a rate of change in curvature, a degree of banking, a length or arc length of the curve, and the like. These characteristics may include estimated values (e.g., curve characteristics calculated using preexisting data and/or mathematical models based on such data) and actual values (e.g., curve characteristics calculated by analyzing captured images of the curve). Based on the analysis, processing unit 110 may cause a change in velocity of vehicle 200. For example, processing unit 110 may cause vehicle 200 to reduce its speed and/or adjust its direction by a particular angle in view of a high rate of change in curvature associated with a curve located 25 meters ahead of vehicle 200.

In one embodiment, velocity module 1406 may store software instructions configured to analyze data from one or more computing and electromechanical devices configured to determine a target velocity and cause a change in velocity of vehicle 200 to the target velocity. For example, processing unit 110 may execute velocity module 1406 to calculate a target velocity for vehicle 200 based on data derived from execution of curve recognition module 1402 and characteristic observation module 1404. Such data may include, for example, an initial target position and initial velocity, an updated target position and updated velocity, a final target position and final velocity, and the like. In addition, processing unit 110 may calculate a velocity for vehicle 200 based on input from other systems of vehicle 200, such as a throttling system 220, braking system 230, and/or steering system 240 of vehicle 200. Based on the calculated target velocity, processing unit 110 may transmit electronic signals (e.g., via a controller area network bus ("CAN bus")) to throttling system 220, braking system 230, and/or steering system 240 of vehicle 200 to trigger a change in the speed and/or direction of vehicle 200 by, for example, physically depressing the brake, easing up off the accelerator of vehicle 200, or steering vehicle 200 in a particular direction (e.g., at a particular angle). An increase in speed may be associated with a corresponding acceleration (e.g., between 0.2 m/sec$^2$ and 3.0 m/sec$^2$). Conversely, a decrease in speed may be associated with a corresponding deceleration. In addition, the acceleration or deceleration may be based on the road type (e.g., highway, city street, country road, etc.), the presence of any speed constraints nearby (e.g., sharp curves, traffic lights), as well as a road width or lane width 1306. For purposes of this disclosure, deceleration may refer to an acceleration having a negative value.

Figure 15:
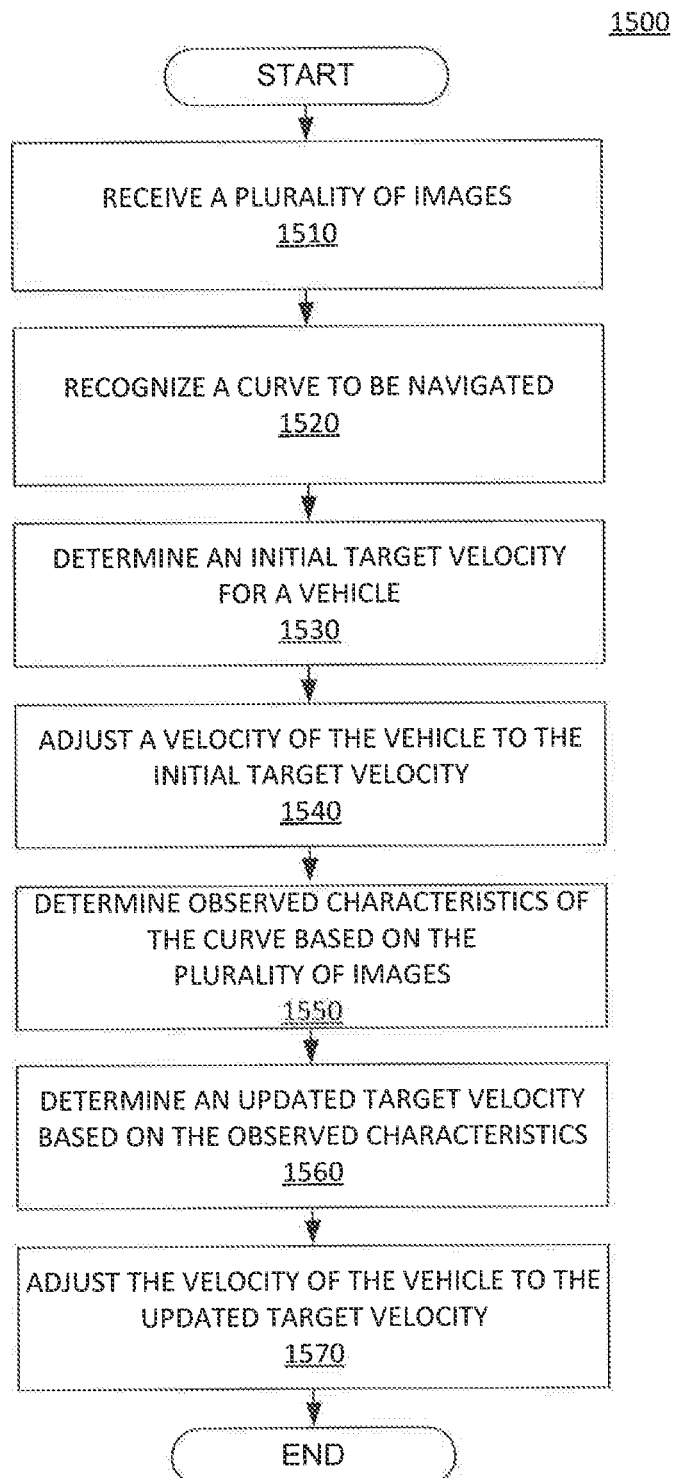
FIG. 15 is a flow chart showing an exemplary process for controlling the velocity of a vehicle based on a detected curve and observed characteristics of the curve consistent with disclosed embodiments.

FIG. 15 is a flow chart showing an exemplary process 1500 for controlling the velocity of a vehicle based on a detected curve and observed characteristics of the curve and/or map data regarding the curve consistent with disclosed embodiments. At step 1510, processing unit 110 may receive a plurality of images via data interface 128 between processing unit 110 and image acquisition unit 120. For instance, a camera included in image acquisition unit 120 (such as image capture device 122) may capture a plurality of images and transmit them over a digital connection (e.g., USB, wireless, Bluetooth, etc.) to processing unit 110. In some embodiments, processing unit 110 may receive more than one plurality of images via a plurality of data interfaces. For example, processing unit 110 may receive a plurality of images from each of image capture devices 122, 124, 126, each of which may have an associated data interface for communicating data to processing unit 110. The disclosed embodiments are not limited to any particular data interface configurations or protocols.

At step 1520, processing unit 110 may execute curve recognition module 1502 to detect a curve located ahead of vehicle 200 based on, for example, map and/or position data (e.g., data stored in map database 160). Such data may indicate the location of a curve that is present on a given road. The data may indicate the absolute position of a particular curve (e.g., via GPS coordinates) or the relative position of the curve (e.g., by describing the curve relative to vehicle 200, road sign 1302, traffic light 1304, and/or other descriptive landmarks). In some embodiments, processing unit 110 may execute curve recognition module 1502 to detect the curve by analyzing the plurality of images. The analysis may be conducted using techniques described in connection with FIGS. 5A-5D and 6, above.

At step 1530, processing unit 110 may execute velocity module 1406 to determine an initial target velocity for vehicle 200 based on, for example, data derived from execution of curve recognition module 1402. The initial target velocity may reflect a speed and a direction for vehicle 200 to safely enter an upcoming curve and may be determined using techniques described in connection with FIG. 14, above. For example, velocity module 1406 may determine the initial target velocity based on known or estimated characteristics associated with the upcoming curve, such as the curve radius 1308 and the degree of banking. Velocity module 1406 may calculate the initial target velocity in accordance with mathematical models and/or formulae and based on various constraints. In some embodiments, for example, velocity module 1406 may determine the initial target velocity based on the presence of traffic lights (such as traffic light 1304) before, during, or after a curve, weather conditions (e.g., light rain, heavy rain, windy, clear, etc.), road conditions (e.g., paved road, unpaved road, potholes, etc.), posted speed limits, the presence of vehicles or pedestrians nearby, etc. The initial target velocity may also be based on a lateral acceleration limit associated with vehicle 200. In some embodiments, the lateral acceleration limit may be in the range of 0.2 m/sec$^2$ and 3.0 m/sec$^2$ and may be adjusted depending on the curve characteristics, the road width, or lane width 1306. Additionally, the initial target velocity may be based on a focal range associated with one or more cameras, such as image capture devices 122 and 124.

For example, velocity module 1406 may determine the initial target velocity based on the radius of curvature of the road ahead of vehicle 200. Velocity module 1406 may determine the radius of curvature at various distances from vehicle 200 and store the information in a vector R (1:n). In one embodiment, velocity module 1406 may determine the radius of curvature at: (1) the current position of vehicle 200, (2) a distance $D_{end}$ from vehicle 200, where $D_{end}$ represents the distance ahead of vehicle 200 at which knowledge of the road characteristics allows system 100 to control navigational responses in vehicle 200 such that the driver may feel comfortable, and (3) at incremental distances from vehicle 200, such as every 1 meter, etc. The value of distance $D_{end}$ may depend on the current speed of vehicle 200, $V_{ego}$. For example, the greater the value of $V_{ego}$ (e.g., the faster vehicle 200 is traveling), the greater the value of $D_{end}$ (e.g., the longer the distance may be taken into account to provide system 100 with sufficient time to provide a navigational response, such as comfortably reducing the speed of vehicle 200 based on an approaching sharp turn or curve). In one embodiment, $D_{end}$ may be calculated according to the following equation: $D_{end}=(V_{ego}^2/2)/(0.7/40*V_{ego}+0.5)$. Thus, the vector D (1:n)=[1:1:n], where n=floor($D_{end}$).

In some embodiments, velocity module 1406 may determine the initial target velocity based on a lateral acceleration constraint, $a_{max}$, e.g., the maximum allowed lateral acceleration. $a_{max}$ may fall in the range of 1.5 to 3.5 meters/sec$^2$. Based on $a_{max}$ and the radius of curvature vector R (discussed above), velocity module 1406 may limit the speed of vehicle 200 (e.g., at different points or distances from the current position of vehicle 200) to a speed $v_{lim}$, calculated as: $v_{lim}$ (1:n)=sqrt ($a_{max}*R$ (1:n)). In addition, a deceleration constraint that follows from the determination of vii, may be calculated as: $dec_{lim}$=min {(($v_{lim}(1:n)^2-V_{ego}^2)/2$), max {$d_{min}$, D (1:n)$-2*V_{ego}$}}, where $d_{min}$ is equal to 40 meters. The value of $d_{min}$ may represent a point at which deceleration feels comfortable for the driver of vehicle 200.

In some embodiments, velocity module 1406 may determine the initial target velocity based on a curvature slew rate constraint, $slew_{max}$, which may be based on the curvature rate of change. $slew_{max}$ may fall in the range of 0.5 to 1.5 meters/sec$^3$. Velocity module 1406 may determine $v_{lim}$, according the following equation: $v_{lim}(1:n)=(slew_{max}/abs\{diff\{1/R(1:n)\}\})^{1/3}$ Further, velocity module 1406 may determine $dec_{lim}$ according to the equation: $dec_{lim}$=min {(($v_{lim}$ (1:n)$^2-V_{ego}^2$)/2), max {$d_{min}$, D (1:n)$-2*V_{ego}$}}, where $d_{min}$ is equal to 40 meters.

In some embodiments, velocity module 1406 may determine a comfort constraint such that the driver of vehicle 200 is comfortable while vehicle 200 is undergoing various navigational responses, such as making a turn or navigating a curve. Velocity module 1406 may determine $v_{lim}$ according to the following equation: $v_{lim}$ (1:n)=4/500*R (1:n)+22.5. Further, velocity module 1406 may determine $dec_{lim}$ according to the equation: $dec_{lim}$=min {(($v_{lim}$ (1:n)$^2-V_{ego}^2$)/2), max {$d_{min}$, D (1:n)$-2*V_{ego}$}}, where $d_{min}$ is equal to 40 meters.

Velocity module 1406 may merge the three constraints determined above—the lateral acceleration constraint, the curvature slew rate constraint, and comfort constraint—by using the smallest value of $dec_{lim}$ calculated in association with each constraint. After merging the constraints, velocity module 1406 may arrive at the initial target velocity by determining how much to adjust the speed of vehicle 200, denoted $v_{com}$, according to the following equation: $v_{com}=v_{com(prev)}+dec_{lim}*\Delta t$, where $v_{com(prev)}$ represents the prior speed of vehicle 200 (e.g., a previously determined speed, the speed of vehicle 200 prior to any adjustment by velocity module 1406, etc.), and $\Delta t$ represents the time between the determination of $v_{com}$ and $v_{com(prev)}$.

At step 1540, processing unit 110 may execute velocity module 1406 to adjust a velocity of vehicle 200 to the initial target velocity determined at step 1530. Based on the current velocity of vehicle 200 and the initial target velocity determined at step 1530, processing unit 110 may transmit electronic signals to throttling system 220, braking system 230, and/or steering system 240 of vehicle 200 to change the velocity of vehicle 200 to the initial target velocity. Further, one or more actuators may control throttling system 220, braking system 230, and/or steering system 240. For example, processing unit 110 may transmit electronic signals that cause system 100 to physically depress the brake by a predetermined amount or ease partially off the accelerator of vehicle 200. Further, processing unit 110 may transmit electronic signals that cause system 100 to steer vehicle 200 in a particular direction. In some embodiments, the magnitude of acceleration (or de-acceleration) may be based on the difference between the current velocity of vehicle 200 and the initial target velocity. Where the difference is large (e.g., the current velocity is 10 km/hr greater than the initial target velocity), for example, system 100 may change the current velocity by braking in a manner that maximizes deceleration and results in vehicle 200 achieving the initial target velocity in the shortest amount of time safely possible. Alternatively, system 100 may apply the brakes in a manner that minimizes deceleration and results in vehicle 200 achieving the initial target velocity gradually. More generally, system 100 may change the current velocity to the initial target velocity according to any particular braking profile (e.g., a braking profile calling for a high level of braking for the first two seconds, and a low level of braking for the subsequent three seconds). The disclosed embodiments are not limited to any particular braking profile or manner of braking.

At step 1550, processing unit 110 may execute characteristic observation module 1404 to determine one or more characteristics of a curve located ahead of vehicle 200 based on, for example, analysis of the plurality of images conducted using techniques described in connection with FIGS. 5A-5D, above. The characteristics may include, for example, estimated and/or actual values associated with curve radius 1308, a road width or lane width 1306, a degree of curvature, a rate of change in curvature, a degree of banking, and the like. The characteristics may also include, for example, information conveyed by one or more road signs (such as road sign 1302). Furthermore, the characteristics may include the length or arc length of the detected curve, which may be a function of the speed of vehicle 200 as it approaches the curve. Processing unit 110 may execute characteristic observation module 1404 to calculate values associated with these characteristics (e.g., curve radius 1308, the degree of curvature, the rate of change in curvature, the arc length of the curve, etc.) based on mathematical models and/or formulae. In some embodiments, processing unit 110 may execute characteristic observation module 1404 to construct a mathematical model expressing the curvature of the curve as a function of distance (e.g., distance traveled). Such a model may be subject to constraints such as a maximum lateral acceleration constraint (e.g., in the range of 1.5 to 3.0 m/sec$^2$) and/or a maximum lateral acceleration derivative constraint (e.g., in the range of 0.8 to 1.2 m/sec$^2$). These constraints may yield a maximum speed for vehicle 200 as a function of distance traveled.

At step 1560, processing unit 110 may execute velocity module 1406 to calculate an updated target velocity based on the characteristics determined at step 1550. The updated target velocity may reflect an updated speed and/or direction for vehicle 200 to safely perform any combination of: (i) entering an upcoming curve, (ii) navigating through a curve, or (iii) exiting a curve. The updated target velocity may be determined using techniques described in connection with FIG. 14 and step 1530, above. For example, velocity module 1406 may determine the updated target velocity based on characteristics associated with a curve and mathematical models and/or formulae.

At step 1570, processing unit 110 may execute velocity module 1406 to adjust the velocity of vehicle 200 to the updated target velocity determined at step 1560. This adjustment may be accomplished using techniques described in connection with step 1540, above. For example, based on the current velocity of vehicle 200 and the updated target velocity determined at step 1560, processing unit 110 may transmit electronic signals (e.g., via a CAN bus) to throttling system 220, braking system 230, and/or steering system 240 of vehicle 200 to change the velocity of vehicle 200 to the updated target velocity. At this point, the current velocity of vehicle 200 is not necessarily the same as the initial target velocity determined at step 1530. For example, processing unit 110 may have determined the updated target velocity at step 1560 while in the process of adjusting the velocity of vehicle 200 to the initial target velocity. This may be true in the case where the difference in the velocity of vehicle 200 and the initial target velocity is large (e.g., greater than 10 km/hr) and the associated acceleration is small.

In some embodiments, system 100 may make regular updates to the target velocity based on continued observations of characteristics of a curve (e.g., based on image data depicting portions of the curve that vehicle 200 is approaching). Additionally, after system 100 has navigated vehicle 200 through a curve, system 100 may cause vehicle 200 to accelerate to a new target velocity suitable for traveling a segment of the road that does not have curves, as determined by analyzing map data, positional data, and/or image data acquired by system 100.

Mimicking a Leading Vehicle

System 100 may provide driver assist functionality that causes vehicle 200 to mimic (or decline to mimic) a leading vehicle in different scenarios, such as when the leading vehicle switches lanes, accelerates, or makes a turn. For example, system 100 may be configured to detect the leading vehicle by analyzing a plurality of images and determine one or more actions taken by the leading vehicle. In some scenarios, such as when the leading vehicle is turning at an intersection, system 100 may be configured to cause vehicle 200 to decline to mimic the turn. In other scenarios, such as when the leading vehicle is turning at an intersection without changing lanes within the intersection, system 100 may be configured to cause vehicle 200 to mimic the turn. System 100 may also be configured to cause vehicle 200 to mimic one or more actions of the leading vehicle based on a navigation history of the leading vehicle.

Figure 16A:
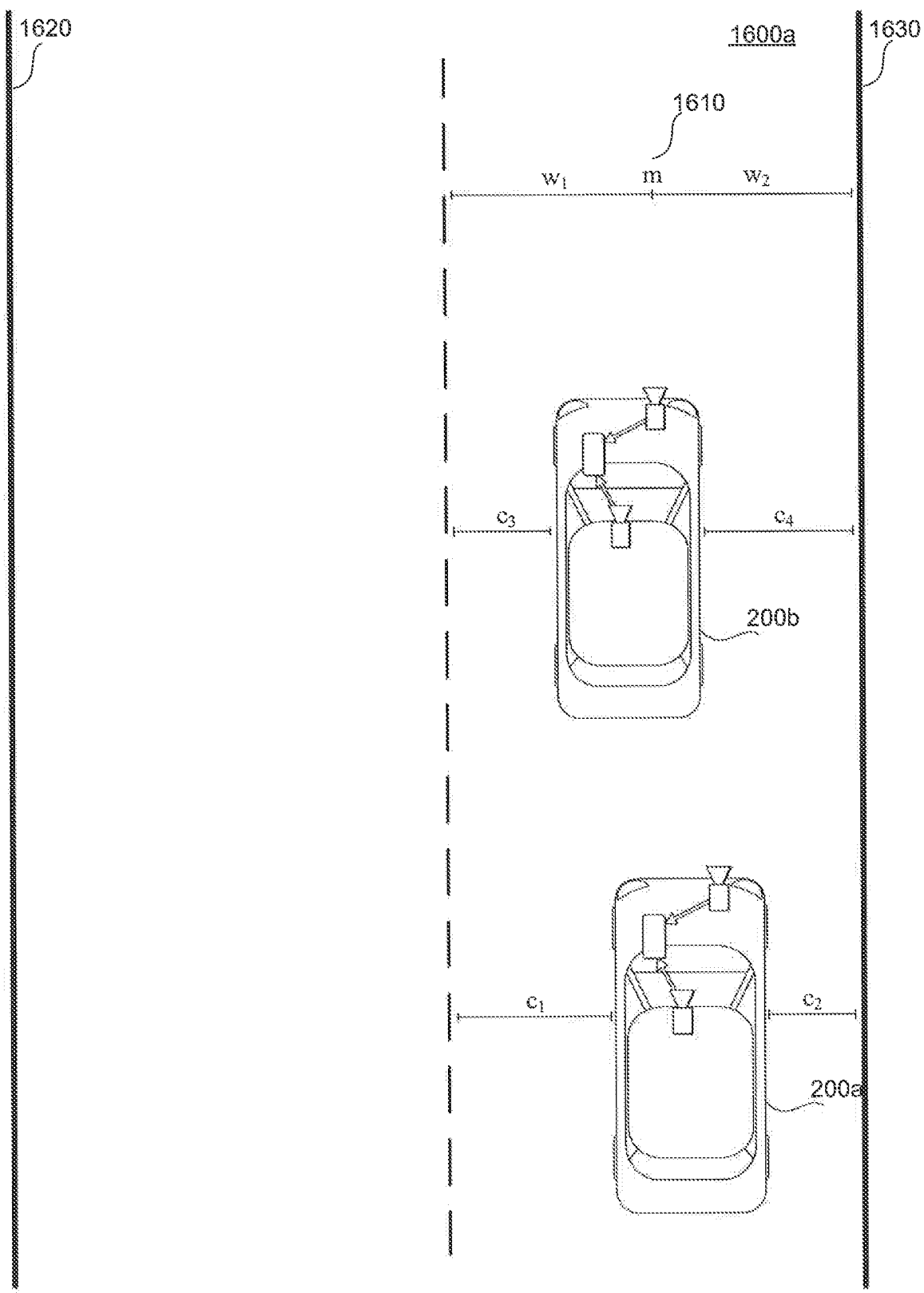
FIGS. 16A-16D are diagrammatic representations of a primary vehicle mimicking one or more actions of a leading vehicle consistent with the disclosed embodiments.
Figure 16B:
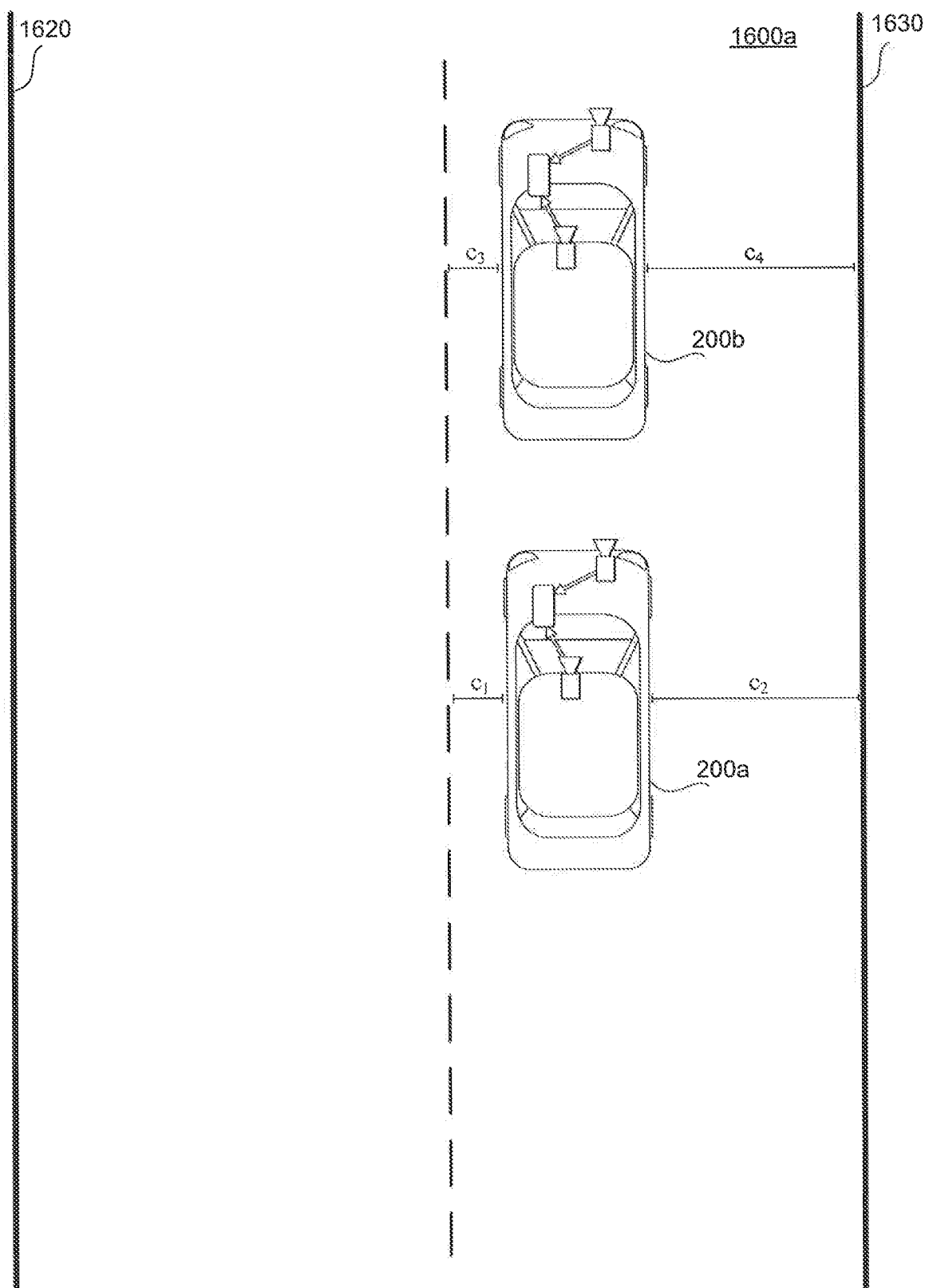

FIGS. 16A and 16B are diagrammatic representations of a primary vehicle 200a mimicking one or more actions of a leading vehicle 200b on road 1600a, consistent with the disclosed embodiments. As illustrated in FIGS. 16A and 16B, primary vehicle 200a may be trailing leading vehicle 200b while traveling in the same lane of road 1600a. The lane may have a left edge 1620, a right edge 1630, and a midpoint 1610, with $w_1$ and $w_2$ indicating the left and right halves of the lane, respectively. Primary vehicle 200a and leading vehicle 200b may be positioned in the lane such that neither vehicle is centered on the midpoint 1610. As shown in FIG. 16A, for example, primary vehicle 200a may be centered to the right of midpoint 1610 such that the distance $c_1$ between primary vehicle 200a and left edge 1620 is greater than the distance $c_2$ between primary vehicle 200a and right edge 1630. In contrast, leading vehicle 200b may be centered to the left of midpoint 1610 such that the distance $c_3$ between leading vehicle 200b and left edge 1620 is less than the distance $c_4$ between leading vehicle 200b and right edge 1630. Different configurations of the positions of primary vehicle 200a and leading vehicle 200b are possible. For example, primary vehicle 200a and leading vehicle 200b may be positioned anywhere on road 1600a. Further, although FIG. 16A depicts leading vehicle 200b as having a camera system, the disclosed embodiments are not limited to a configuration in which leading vehicle 200b includes a camera system.

System 100 of primary vehicle 200a may cause primary vehicle 200a to mimic one or more actions of leading vehicle 200b. As shown in FIG. 16B, for example, primary vehicle 200a may mimic a lane shift performed by leading vehicle 200b. After mimicking the lane shift, distance $c_1$ may be equal to distance $c_3$, and distance $c_2$ may be equal to distance $c_4$. In some embodiments, primary vehicle 200a may mimic a lane shift performed by leading vehicle 200b in a way such that distances $c_1$ and $c_3$, and $c_2$ and $c_4$, are unequal. For example, in the case where primary vehicle 200a mimics a leftward lane shift of primary vehicle 200b and is positioned (after the lane shift) to the left of primary vehicle 200a, $c_1$ will be less than $c_3$ and $c_2$ will be greater than $c_4$. Alternatively, where primary vehicle 200a mimics a leftward lane shift of primary vehicle 200b and is positioned to the right of primary vehicle 200a, $c_1$ will be greater than $c_3$ and $c_2$ will be less than $c_4$.

Figure 16C:
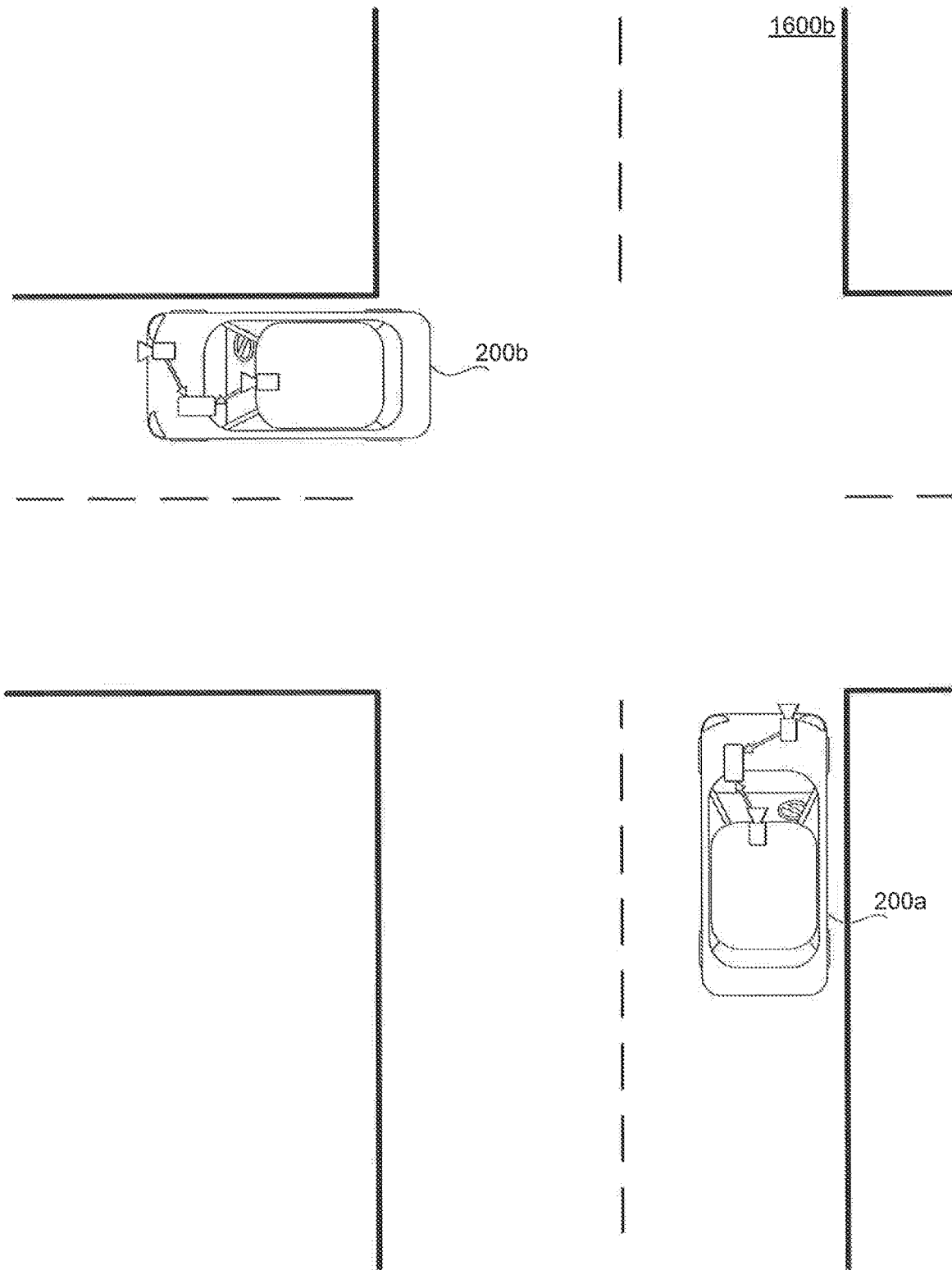
Figure 16D:
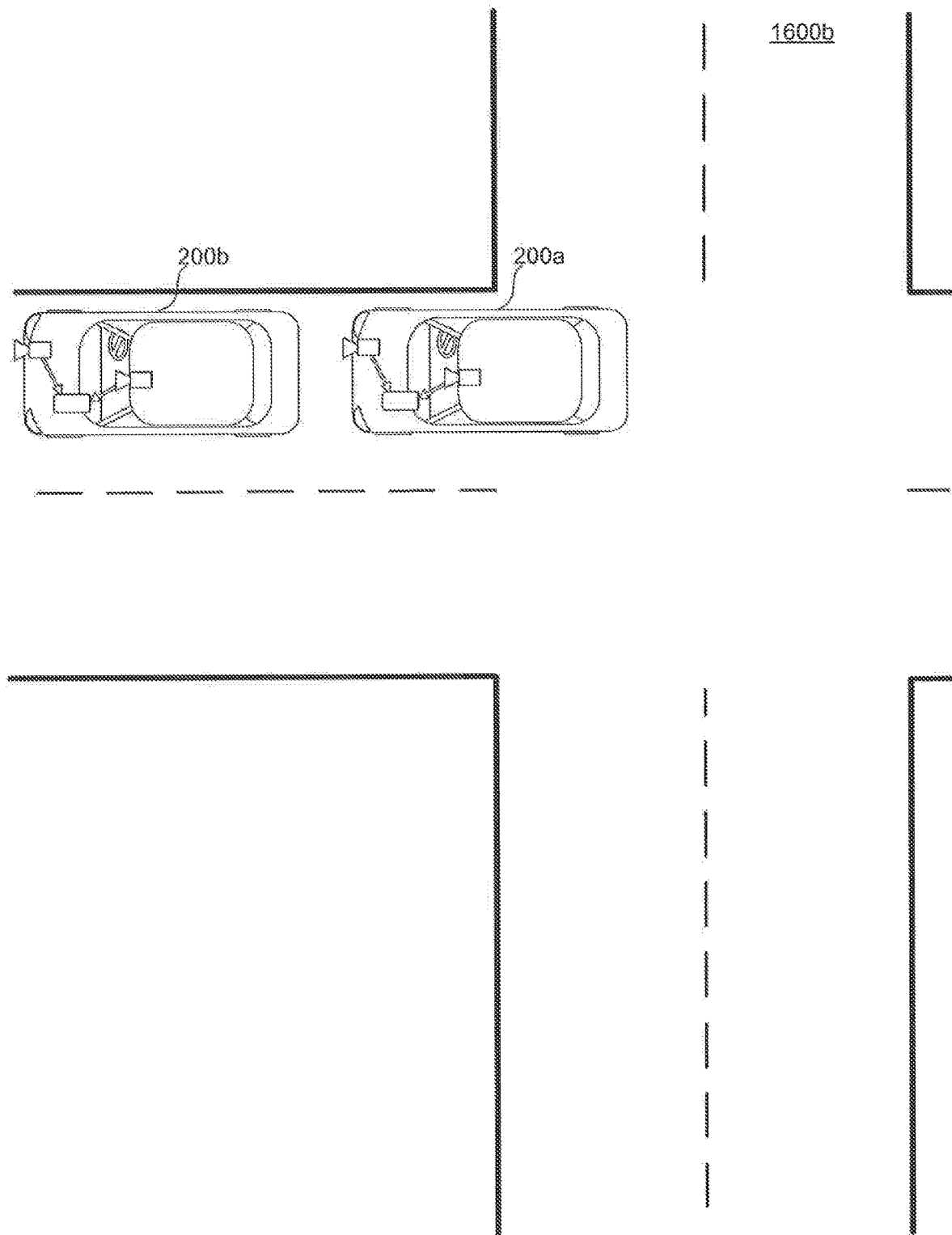

FIGS. 16C and 16D are diagrammatic representations of a primary vehicle 200a mimicking one or more actions of a leading vehicle 200b on road 1600b, consistent with the disclosed embodiments. As illustrated in FIG. 16C, primary vehicle 200a may be traveling behind leading vehicle 200b, which may make a left turn at an intersection. System 100 of primary vehicle 200a may cause primary vehicle 200a to mimic the left turn of leading vehicle 200b, as shown in FIG. 16D. System 100 may cause primary vehicle 200a to mimic the left turn based on various factors, such as whether leading vehicle 200b changes lanes while turning within the intersection, the navigation history associated with leading vehicle 200b, the relative difference in speed between primary vehicle 200a and leading vehicle 200b, and the like. Additionally, primary vehicle 200a may mimic leading vehicle 200b under various conditions, such as based on whether leading vehicle 200b is traveling along the same route or the same portion of a route that primary vehicle 200a is traveling along. Further detail regarding scenarios in which system 100 may cause primary vehicle 200a to mimic one or more actions of leading vehicle 200b are described in connection with FIGS. 17-22, below.

In some embodiments, system 100 may be configured to determine whether to mimic a particular movement of a leading vehicle. For example, system 100 may determine that certain movements of the leading vehicle do not need to be mimicked because the movements do not affect the course of the leading vehicle. For example, system 100 may determine that small changes in movements, such as moving within a particular lane, do not need to be mimicked. In other embodiments, system 100 may implement a smoothing operation to filter out small movements of a leading vehicle. The smoothing operation may cause the primary vehicle to implement more significant and/or important movements (e.g., changing lanes) of a leading vehicle while filtering out smaller movements not affecting the overall course of the leading vehicle.

Figure 17:
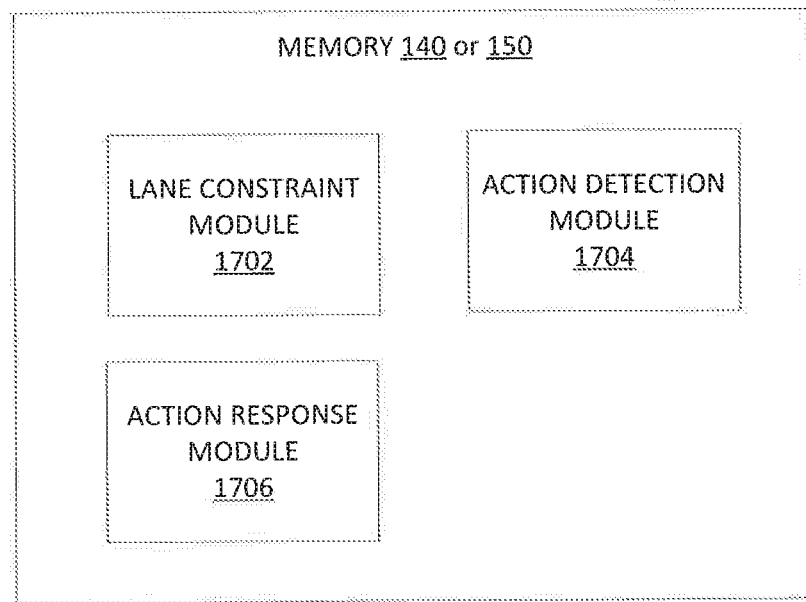
FIG. 17 is an exemplary block diagram of a memory configured to store instructions for performing one or more operations consistent with the disclosed embodiments.

FIG. 17 is an exemplary block diagram of a memory configured to store instructions for performing one or more operations consistent with the disclosed embodiments. As shown in FIG. 17, memory 140 may store a lane constraint module 1702, an action detection module 1704, and an action response module 1706. The disclosed embodiments are not limited to any particular configuration of memory 140. Further, processing unit 110 may execute the instructions stored in any of modules 1702-1706 included in memory 140.

In one embodiment, lane constraint module 1702 may store software instructions (such as computer vision software) which, when executed by processing unit 110, determine one or more constraints associated with a lane that primary vehicle 200a is traveling in. The lane constraints may include a midpoint 1610, a left edge 1620, and a right edge 1630 of the lane. The lane constraints may also include one or more lines or other symbols marked on the surface of road 1600a or 1600b. Processing unit 110 may execute lane constraint module 1702 to determine the constraints by, for example, analyzing one or more sets of images and/or using map and/or position data (e.g., data stored in map database 160). The image sets may be acquired by one or more of image capture devices 122, 124, and 126. Based on the analysis, system 100 (e.g., via processing unit 110) may cause primary vehicle 200a to travel within a lane defined by left edge 1620 and right edge 1630. In some embodiments, system 100 may cause primary vehicle 200a to move away from left edge 1620 or right edge 1630 if one of distance $c_1$ or $c_2$ is less than a predetermined threshold.

In one embodiment, action detection module 1704 may store software instructions (such as computer vision software) which, when executed by processing unit 110, detects one or more actions taken by leading vehicle 200b traveling in front of primary vehicle 200a. Leading vehicle 200b may be traveling in the same or different lane as primary vehicle 200a. Processing unit 110 may execute action detection module 1704 to detect one or more actions taken by leading vehicle 200b by, for example, analyzing one or more sets of images acquired by one or more of image capture devices 122, 124, and 126. Based on the analysis, processing unit 110 may determine, for example, that leading vehicle 200b has shifted lanes, made a turn, accelerated, decelerated, applied its brakes, and/or the like. As another example, leading vehicle 200b may perform a maneuver such that a first offset distance on a side of leading vehicle 200b adjacent to a first lane constraint is different from a second offset distance on a side of leading vehicle 200b adjacent to a second lane constraint. For example, processing unit 110 may perform the analysis based on the techniques described in connection with FIGS. 5A-5D, above.

In one embodiment, action response module 1706 may store software instructions (such as computer vision software) which, when executed by processing unit 110, determines one or more actions for primary vehicle 200a to take based on one or more actions taken by leading vehicle 200b detected by system 100 (e.g., via execution of action detection module 1704). For example, processing unit 110 may execute action response module 1706 to determine whether to mimic one or more actions of leading vehicle 200b. This determination may be based on the nature of leading vehicle 200b's actions (e.g., turn, lane shift, etc.), information associated with primary vehicle 200a (e.g., speed, distance $c_1$ and $c_2$ from the lane edges, etc.), road and environmental conditions (e.g., potholes, heavy rain or wind, etc.), and the like. In the case where processing unit 110 determines to mimic one or more actions of leading vehicle 200b, processing unit 110 may accomplish this by, for example, transmitting electronic signals (e.g., via a CAN bus) to throttling system 220, braking system 230, and/or steering system 240 of primary vehicle 200a to trigger a turn, lane shift, change in speed, and/or change in direction of primary vehicle 200a. Processing unit 110 may use the techniques described in connection with FIGS. 4-7, above, to cause primary vehicle 200a to mimic the one or more actions. To mimic the one or more actions, system 100 may provide control signals to one or more of throttling system 220, braking system 230, and steering system 240 to navigate vehicle 200 (e.g., by causing an acceleration, a turn, a lane shift, etc.). Further, one or more actuators may control throttling system 220, braking system 230, and/or steering system 240.

Figure 18:
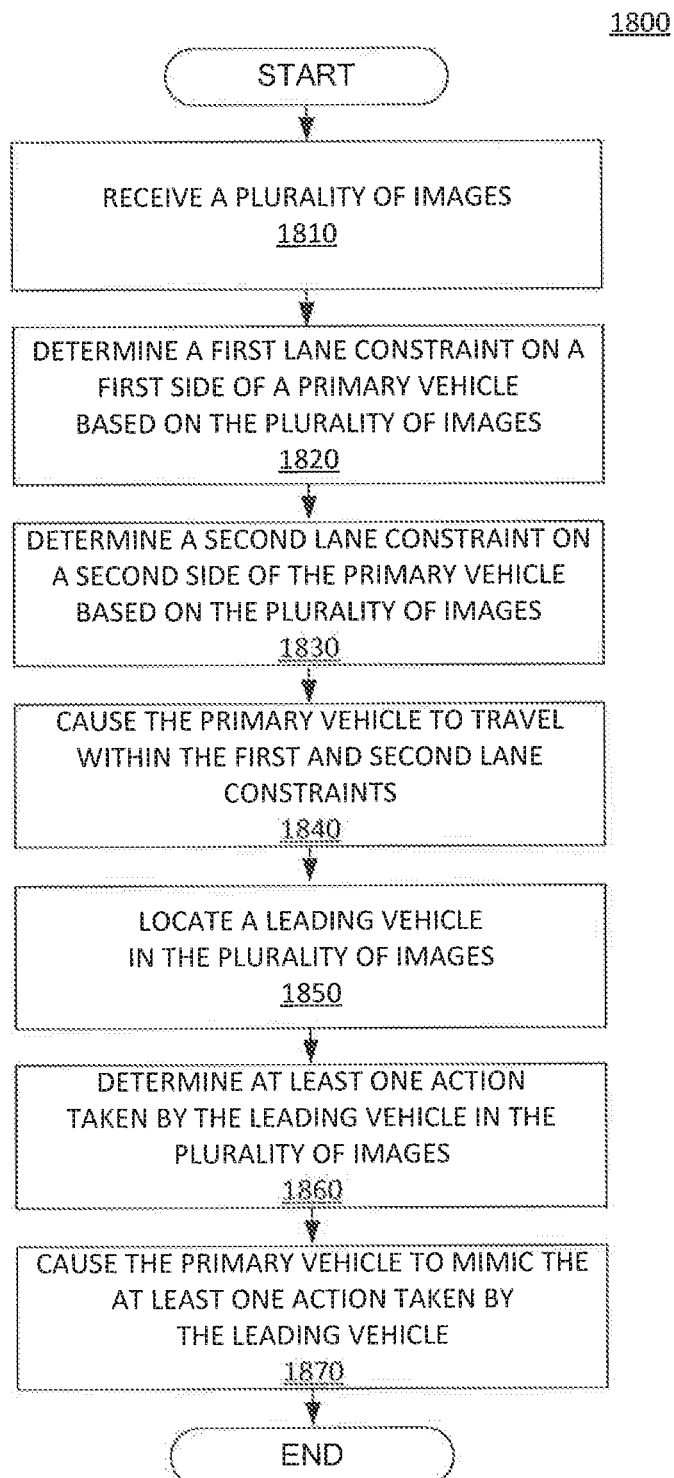
FIG. 18 is a flow chart showing an exemplary process for causing a primary vehicle to mimic one or more actions of a leading vehicle consistent with disclosed embodiments.

FIG. 18 is a flow chart showing an exemplary process for causing primary vehicle 200a to mimic one or more actions of leading vehicle 200b consistent with disclosed embodiments. At step 1810, processing unit 110 may receive a plurality of images via data interface 128 between processing unit 110 and image acquisition unit 120. For instance, a camera included in image acquisition unit 120 (such as image capture device 122) may capture a plurality of images and transmit them over a digital connection (e.g., USB, wireless, Bluetooth, etc.) to processing unit 110. In some embodiments, processing unit 110 may receive more than one plurality of images via a plurality of data interfaces. For example, processing unit 110 may receive a plurality of images from each of image capture devices 122, 124, 126, each of which may have an associated data interface for communicating data to processing unit 110. The disclosed embodiments are not limited to any particular data interface configurations or protocols.

At steps 1820 and 1830, processing unit 110 may execute lane constraint module 1702 to determine constraints for each side of primary vehicle 200a associated with a lane that primary vehicle 200a is traveling in. Processing unit 110 may determine the constraints by analyzing the images received at step 1810. Thus, at step 1820, processing unit 110 may determine a first lane constraint on a first side of primary vehicle 200a (e.g., the distance between the left side of primary vehicle 200a and left edge 1620 of the lane, $c_1$) and, at step 1830, a second lane constraint on a second side opposite the first side (e.g., the distance between the right side of primary vehicle 200a and right edge 1620 of the lane, $c_2$). In some embodiments, processing unit 110 may determine the constraints by using map and/or position data (e.g., data stored in map database 160) indicating the position of primary vehicle 200a relative to midpoint 1610, left edge 1620, and right edge 1630 of the lane. Processing unit 110 may determine the constraints based on both an analysis of the images received at step 1810 and map and/or position data; doing so may increase the confidence level associated with the constraints.

At step 1840, processing unit 110 may execute lane constraint module 1702 to cause primary vehicle 200a to travel within the lane constraints determined at steps 1820 and 1830. For example, the left side of primary vehicle 200a may be positioned to the left of left edge 1620, or the right side of primary vehicle 200a may be positioned to the right of right edge 1630. In such a scenario, processing unit 110 may transmit electronic signals (e.g., via a CAN bus) to throttling system 220, braking system 230, and/or steering system 240 of primary vehicle 200a to cause primary vehicle 200a to adjust its position and travel within the lane constraints.

At step 1850, processing unit 110 may execute action detection module 1704 to locate a leading vehicle 200b within the images received at step 1810 by analyzing the images. Processing unit 110 may detect the presence of vehicles in the images using the techniques described in connection with FIGS. 5A and 5B, above. For each detected vehicle, processing unit 110 may construct a multi-frame model of the detected vehicle's position, velocity (e.g., speed and direction), and acceleration relative to primary vehicle 200a. Processing unit 110 may use the techniques described in connection with FIGS. 5A and 5B, above, to construct such a model. In addition, processing unit 110 may determine a lane of travel associated with each detected vehicle, based on, for example, lane or other road markings and lane constraints determined at steps 1820 and 1830. Processing unit 110 may determine leading vehicle 200b to be the detected vehicle that is closest to, and is traveling in the same lane as, primary vehicle 200a. At step 1860, processing unit 110 may execute action detection module 1704 to determine one or more actions taken by the leading vehicle 200b detected within the images at step 1850. For example, processing unit 110 may determine that leading vehicle 200b has shifted lanes, made a turn, accelerated, decelerated, and/or the like. In addition, processing unit 110 may analyze the images to determine characteristics associated with leading vehicle 200b, such as its speed and position (e.g., relative to primary vehicle 200a). These determinations may be based on the techniques described in connection with FIGS. 5A and 5B, above. In some embodiments, processing unit 110 may analyze the images to determine characteristics associated with an action performed by leading vehicle 200b. For example, where leading vehicle 200b makes a turn, processing unit 110 may determine position information for leading vehicle 200b right before it begins the turn, position information for leading vehicle 200b as it completes the turn, a turning radius, and a speed profile describing changes in speed (e.g., over time) for leading vehicle 200b as it makes the turn.

At step 1870, processing unit 110 may execute action response module 1706 to cause primary vehicle 200a to mimic the one or more actions of leading vehicle 200b determined at step 1850. For example, processing unit 110 may transmit electronic signals (e.g., via a CAN bus) to throttling system 220, braking system 230, and/or steering system 240 of primary vehicle 200a to trigger a turn, lane shift, change in speed, and/or change in direction of primary vehicle 200a. In addition, processing unit 110 may construct a set of path points to guide changes in position and speed for primary vehicle 200a. The path points may be based on lane marks (e.g., midpoint 1610, left edge 1620, right edge 1630, etc.) represented by a polynomial (e.g., of the third-degree) and target coordinates associated with a target vehicle, such as leading vehicle 200b. Processing unit 110 may adjust the coefficients of the polynomial so that the path points pass through the target coordinates. Processing unit 110 may also offset the path points (e.g., relative to left edge 1620 and right edge 1630) based on a predetermined offset amount. As processing unit 110 adjusts the polynomial coefficients and offsets the path points, processing unit 110 may also calculate local curvature information for each of the resulting segments formed between the path points.

In some embodiments, processing unit 110 (e.g., via execution of action response module 1706) may cause primary vehicle 200a to mimic leading vehicle 200b within certain position, speed, and/or acceleration constraints associated with the two vehicles. For example, the constraints may require a predetermined minimum distance (e.g., a safety distance) between primary vehicle 200a and leading vehicle 200b or a predetermined maximum difference in speed and/or acceleration between the vehicles. Thus, if mimicking an action performed by leading vehicle 200b would violate one or more constraints (e.g., mimicking an acceleration would result in primary vehicle 200a being too close to leading vehicle 200b), processing unit 110 may cause primary vehicle 200a to decline to mimic the one or more actions of leading vehicle 200b. In addition, even while mimicking an action performed by leading vehicle 200b (e.g., a lane shift), processing unit 110 may cause primary vehicle 200a to follow leading vehicle 200b's speed profile and maintain a predetermined distance or a safety distance from leading vehicle 200b. Processing unit 110 may accomplish this by causing primary vehicle 200a to: (i) continuously close the distance gap from leading vehicle 200b when the gap is greater than the predetermined minimum distance, (ii) continuously close the gap between the speeds of primary vehicle 200a and leading vehicle 200b, and (iii) match the acceleration of leading vehicle 200b to the extent it is consistent with predetermined constraints. To control the extent to which of these actions should be performed, processing unit 110 may associate each action with weights in real-time based on the current and predicted distance to leading vehicle 200b. Thus, for example, as the distance to leading vehicle 200b decreases more weight may be put on decelerating rather than matching the acceleration of leading vehicle 200b.

As another example, in the case where primary vehicle 200a is approaching leading vehicle 200b at a speed greater than the speed of leading vehicle 200b, processing unit 110 may cause primary vehicle 200a to gradually slow down such that, when the distance between the two vehicles equals a predetermined safety distance such as a minimum following distance, the speed of the two vehicles is the same. In another example, where a leading vehicle 200b abruptly appears in front of primary vehicle 200a, causing the distance between the two vehicles to be less than the minimum following distance, processing unit 110 may cause primary vehicle 200a to gradually slow down to avoid approaching leading vehicle 200b any closer while at the same increasing the distance between the vehicles until it reaches the minimum following distance.

Figure 19:
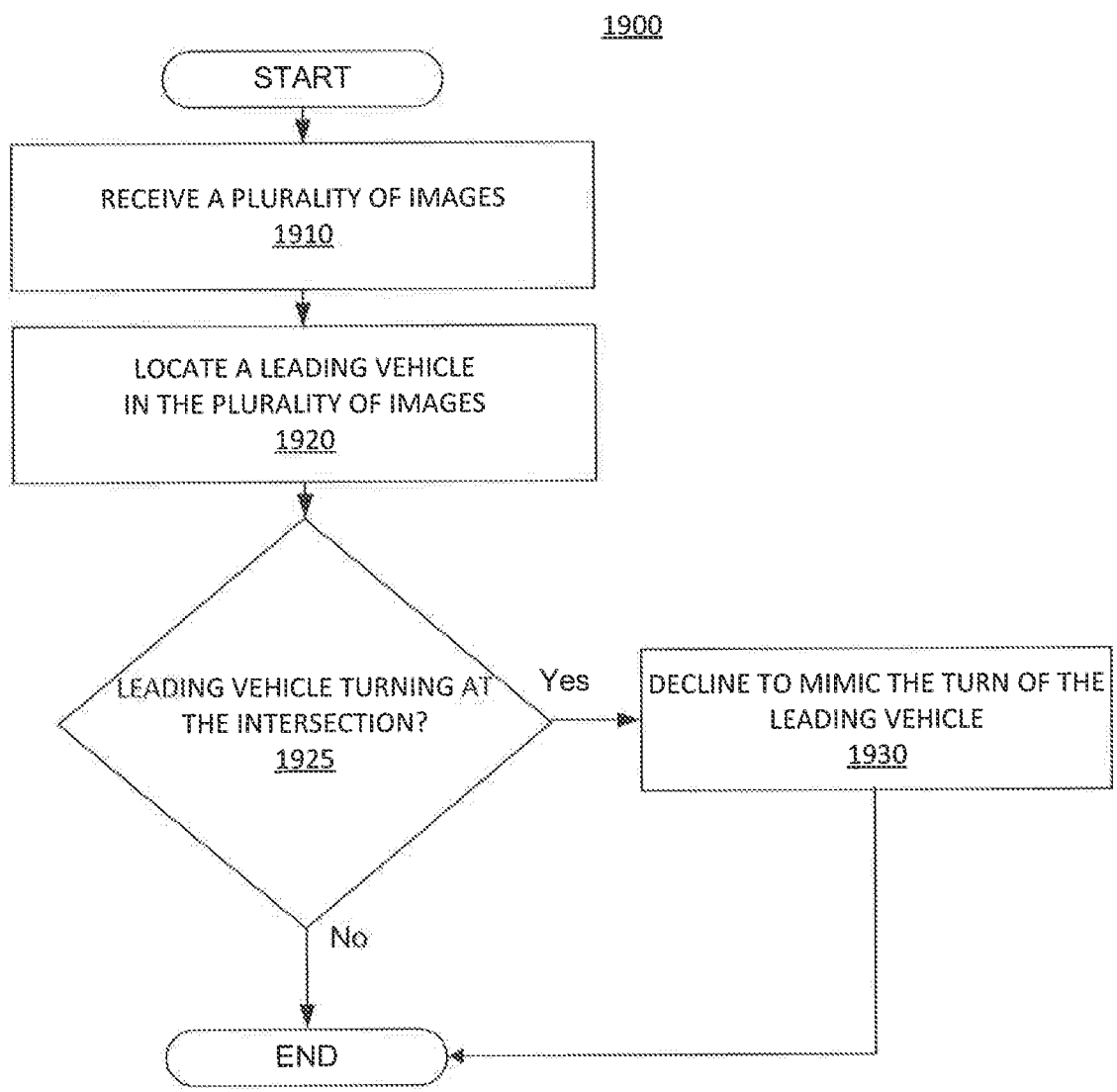
FIG. 19 is a flow chart showing an exemplary process for causing a primary vehicle to decline to mimic a turn of a leading vehicle consistent with disclosed embodiments.

FIG. 19 is a flow chart showing an exemplary process 1900 for causing primary vehicle 200a to decline to mimic a turn of leading vehicle 200b, consistent with disclosed embodiments. At step 1910, processing unit 110 may receive a plurality of images via data interface 128 between processing unit 110 and image acquisition unit 120, as described in connection with step 1810 of FIG. 18, above. At step 1920, processing unit 110 may execute action detection module 1704 to locate a leading vehicle 200b within the images received at step 1910 by analyzing the images, as described in connection with step 1850 of FIG. 18, above. At step 1925, processing unit 110 may execute action detection module 1704 to determine whether leading vehicle 200b is turning at an intersection, using the techniques described in connection with step 1860 of FIG. 18, above. If leading vehicle 200b is determined to be turning at the intersection (step 1925, yes), processing unit 110 may cause primary vehicle 200a to decline to mimic the turn of leading vehicle 200b at step 1930. Otherwise (step 1925, no), process 1900 concludes.

Figure 20:
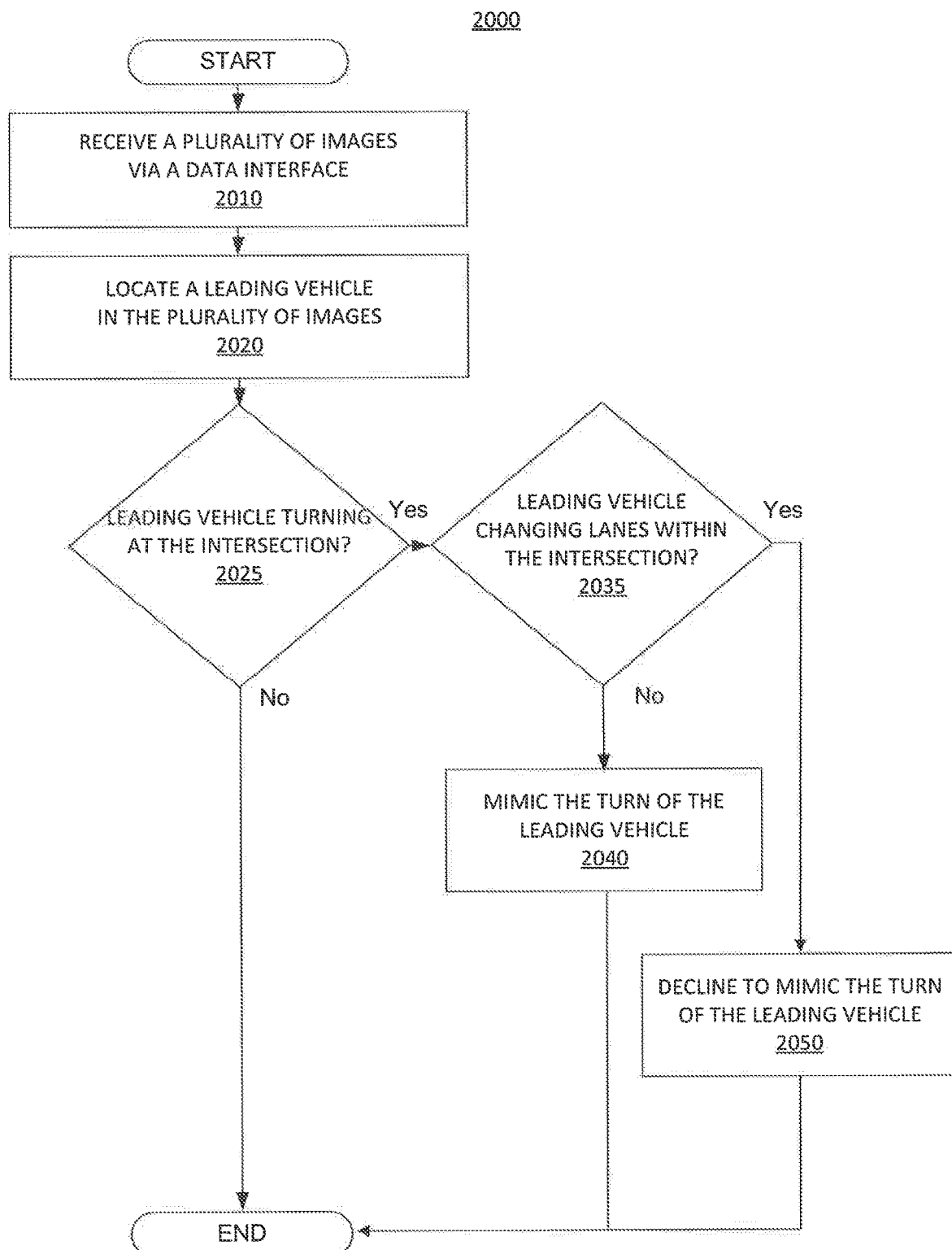
FIG. 20 is a flow chart showing an exemplary process for causing a primary vehicle to mimic or decline a turn of a leading vehicle consistent with disclosed embodiments.

FIG. 20 is a flow chart showing an exemplary process 2000 for causing primary vehicle 200a to mimic or decline a turn of leading vehicle 200b, consistent with disclosed embodiments. At step 2010, processing unit 110 may receive a plurality of images via data interface 128 between processing unit 110 and image acquisition unit 120, as described in connection with step 1810 of FIG. 18, above. At step 2020, processing unit 110 may execute action detection module 1704 to locate a leading vehicle 200b within the images received at step 2010 by analyzing the images, as described in connection with step 1850 of FIG. 18, above. At step 2025, processing unit 110 may execute action detection module 1704 to determine whether leading vehicle 200b is turning at an intersection, using the techniques described in connection with step 1860 of FIG. 18, above. If leading vehicle 200b is determined to be turning at the intersection (step 2025, yes), at step 2035, processing unit 110 may execute action detection module 1704 to determine whether leading vehicle 200b is changing lanes within the intersection, using the techniques described in connection with step 1860 of FIG. 18, above. Otherwise (step 2025, no), process 2000 concludes. If leading vehicle 200b is determined to be changing lanes within the intersection (step 2035, yes), processing unit 110 may cause primary vehicle 200a to decline to mimic the turn of leading vehicle 200b at step 2050. Otherwise (step 2035, no), processing unit 110 may cause primary vehicle 200a to mimic the turn of leading vehicle 200b at step 2040.

Figure 21:
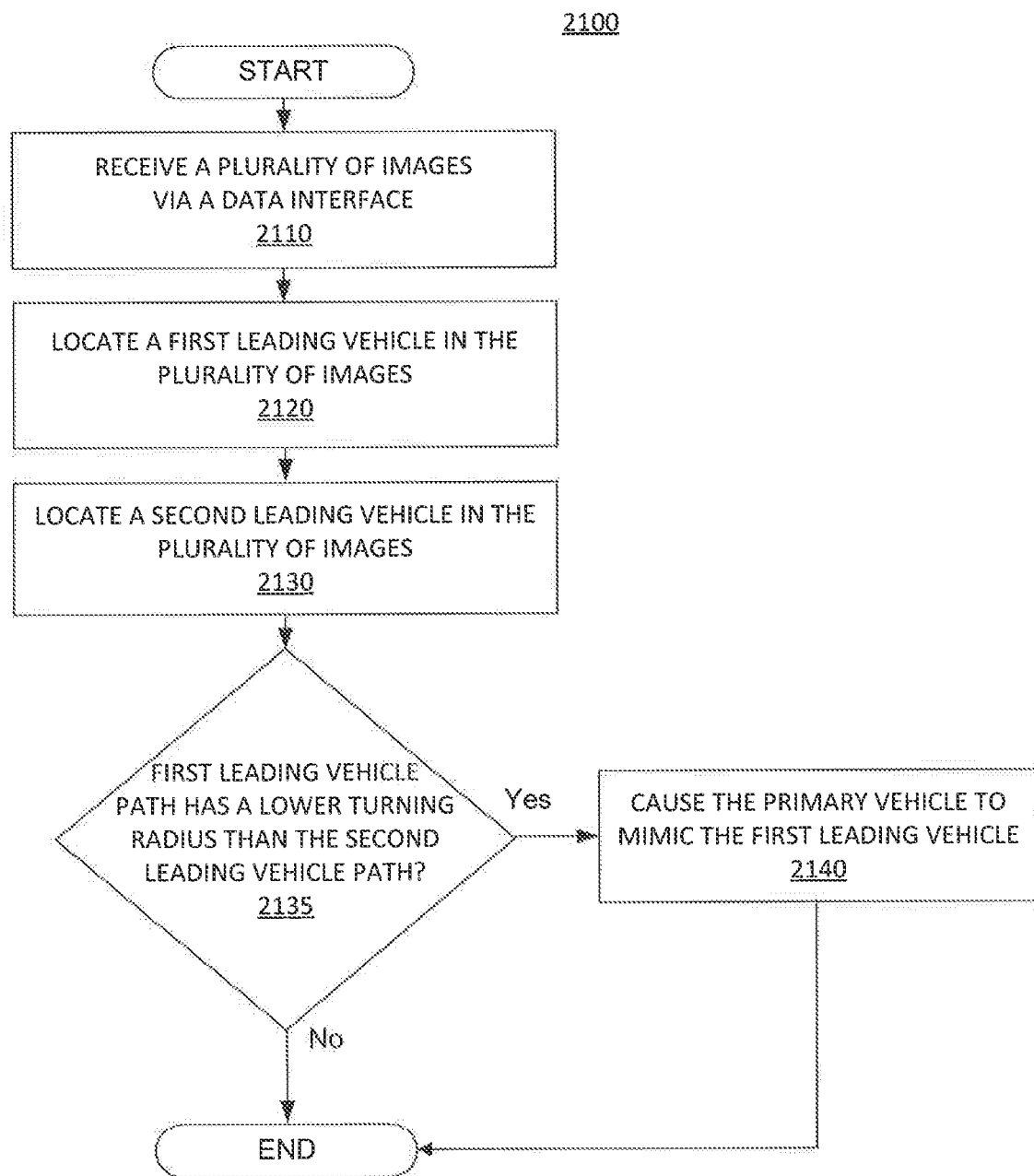
FIG. 21 is a flow chart showing another exemplary process for causing a primary vehicle to mimic one or more actions of a leading vehicle consistent with disclosed embodiments.

FIG. 21 is a flow chart showing another exemplary process 2100 for causing primary vehicle 200a to mimic one or more actions of a first leading vehicle, consistent with disclosed embodiments. At step 2110, processing unit 110 may receive a plurality of images via data interface 128 between processing unit 110 and image acquisition unit 120, as described in connection with step 1810 of FIG. 18, above. At steps 2120 and 2130, processing unit 110 may execute action detection module 1704 to locate a first and second leading vehicle within the images received at step 2110 by analyzing the images, as described in connection with step 1850 of FIG. 18, above. At step 2135, processing unit 110 may execute action detection module 1704 to determine whether the first leading vehicle path has a lower turning radius than the second leading vehicle path, using the techniques described in connection with step 1860 of FIG. 18, above. If the first leading vehicle path is determined to have a lower turning radius than the second leading vehicle path (step 2135, yes), processing unit 110 may cause primary vehicle 200a to mimic the turn of the first leading vehicle at step 2140. Otherwise (step 2135, no), process 2100 concludes.

Figure 22:
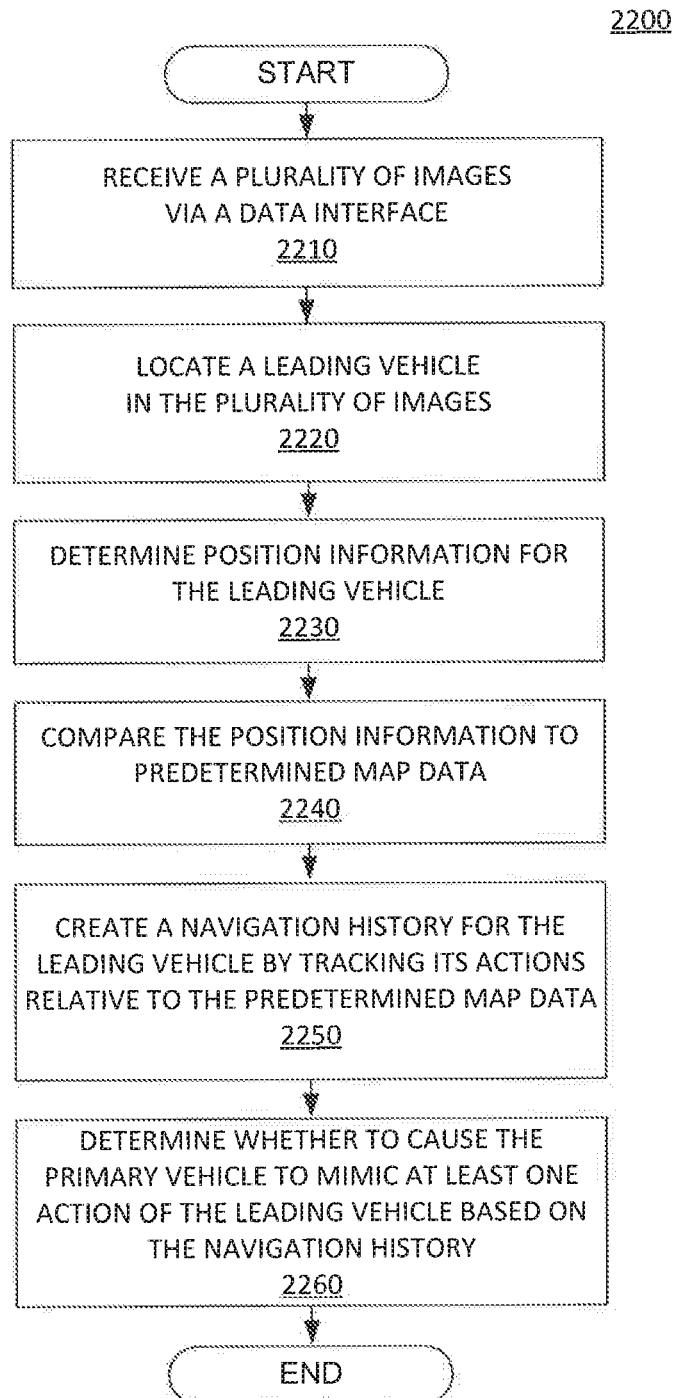
FIG. 22 is a flow chart showing an exemplary process for causing a primary vehicle to mimic one or more actions of a leading vehicle based on a navigation history consistent with disclosed embodiments.

FIG. 22 is a flow chart showing an exemplary process 2200 for causing primary vehicle 200a to mimic one or more actions of leading vehicle 200b based on a navigation history, consistent with disclosed embodiments. At step 2210, processing unit 110 may receive a plurality of images via data interface 128 between processing unit 110 and image acquisition unit 120, as described in connection with step 1810 of FIG. 18, above. At step 2220, processing unit 110 may execute action detection module 1704 to locate a leading vehicle 200b within the images received at step 2210 by analyzing the images, as described in connection with step 1850 of FIG. 18, above.

At step 2230, processing unit 110 may determine position information for leading vehicle 200b by analyzing the images received at step 2210. Position information for leading vehicle 200b may indicate the position of leading vehicle 200b relative to primary vehicle 200a. Processing unit 110 may analyze the images to derive position information for leading vehicle 200b and one or more actions taken by leading vehicle 200b by using the techniques described in connection with FIGS. 5A-5D, above.

At step 2240, processing unit 110 may compare the position information for leading vehicle 200b determined at step 2230 to predetermined map data (e.g., data stored in map database 160). For example, by comparing the position information to predetermined map data, processing unit 110 may derive position coordinates for leading vehicle 200b. In addition, processing unit 110 may use the predetermined map data as an indicator of a confidence level associated with the position information determined at step 2230.

At step 2250, processing unit 110 may create a navigation history associated with leading vehicle 200b by, for example, tracking the actions taken by leading vehicle 200b. Processing unit 110 may associate the actions taken by leading vehicle 200b (e.g., determined from analysis of the images at step 2230) with predetermined map data from step 2240. Thus, the navigation history may indicate that leading vehicle 200b performed certain actions (e.g., a turn, a lane shift, etc.) at certain position coordinates.

At step 2260, processing unit 110 may execute action response module 1706 to determine whether to cause primary vehicle 200a to mimic one or more actions of leading vehicle 200b based on the navigation history created at step 2250 and using the techniques described in connection with step 1870 of FIG. 18, above. For example, processing unit 110 (e.g., via action response module 1706) may cause primary vehicle 200a to mimic a turn of leading vehicle 200b, even where no turn is detected from analysis of the images (e.g., at step 2230), when the navigation history indicates that leading vehicle 200b has successfully navigated at least one prior turn. More generally, processing unit 110 may cause primary vehicle 200a to mimic an action taken by leading vehicle 200b in cases where the navigation history indicates the leading vehicle 200b had successfully performed such an action.

Navigating a Vehicle to Pass Another Vehicle

System 100 may provide driver assist functionality that monitors the vicinity around vehicle 200 and aborts lane changes in the event that the lane change is deemed to be at risk of causing a collision, such as with another vehicle (e.g., a target vehicle). For example, system 100 may enable vehicle 200 to complete a pass of a target vehicle if the target vehicle is determined to be in a different lane than vehicle 200. If, before completion of a pass, system 100 determines that the target vehicle is entering the lane in which vehicle 200 is traveling, system 100 may cause vehicle 200 to abort the pass. For example, aborting the pass may include causing vehicle 200 to brake or causing vehicle 200 to stop accelerating.

Figure 23:
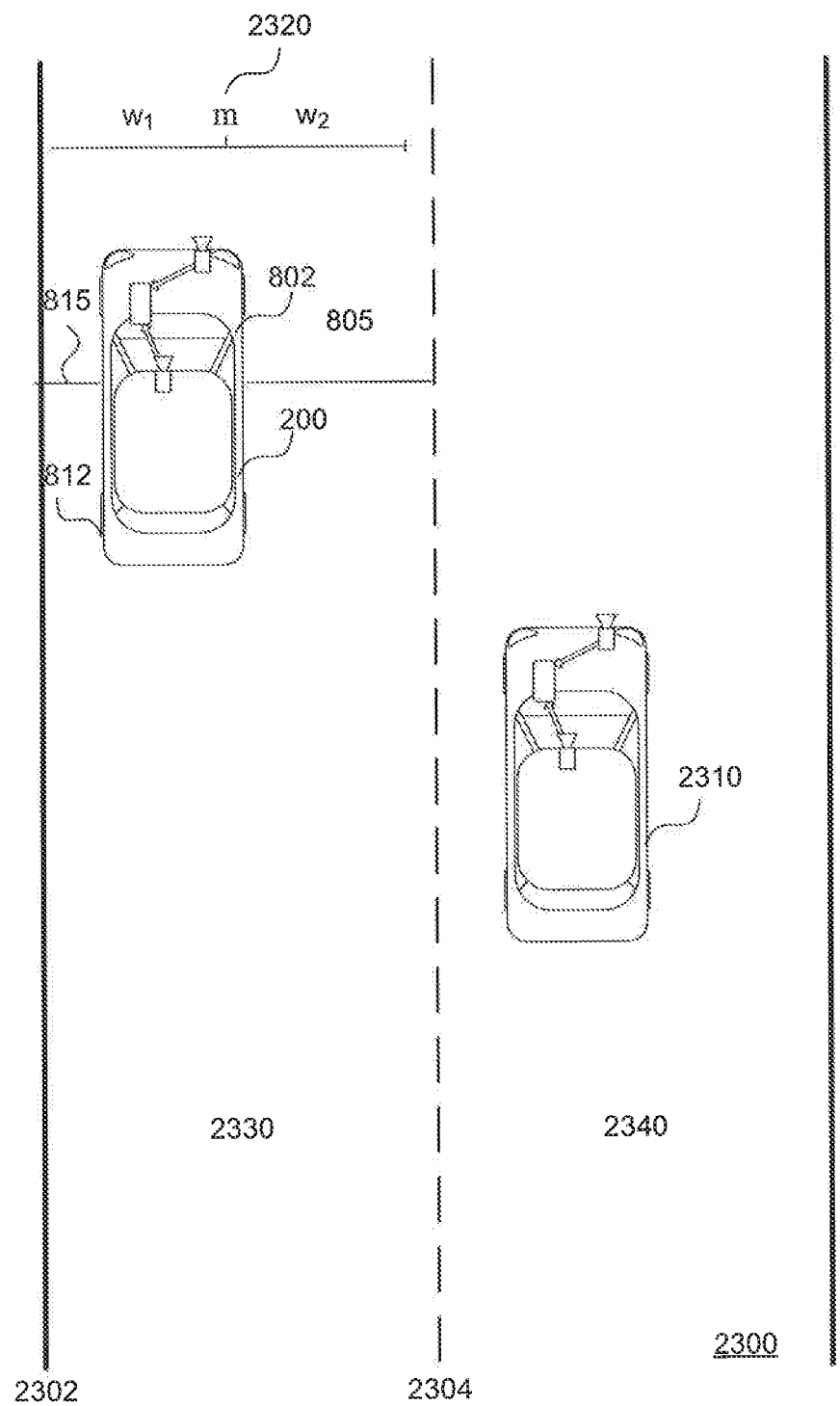
FIG. 23 is a diagrammatic representation of an exemplary vehicle traveling within a first and a second lane constraint on a roadway along on which another vehicle is traveling consistent with the disclosed embodiments.

As illustrated in FIG. 23, vehicle 200 may travel on roadway 2300. Vehicle 200 may be equipped with system 100 and may implement any of the disclosed embodiments for identifying lane constraints and operating vehicle 200 within the lane constraints. System 100 may also facilitate lane changes made by vehicle 200. For example, system 100 may determine whether circumstances allow vehicle 200 to safely change lanes and, if the circumstances change during the lane change, cause vehicle 200 to abort lane change.

As shown in FIG. 23 and as previously discussed with respect to FIG. 8, vehicle 200 may include first vehicle side 802, which may be first distance 805 from a first lane constraint 2302. Similarly, vehicle 200 may include second vehicle side 812 opposite from first vehicle side 802, and second vehicle side 812 may be second distance 815 from a second lane constraint 2304. In this manner, first lane constraint 810 and second lane constraint 2304 may define a lane 2330 within which vehicle 200 may travel.

System 100 may determine first lane constraint 2302 and second lane constraint 2304 based on a plurality of images acquired by one or more of image capture devices 122-126. According to some embodiments, first lane constraint 2302 and/or second lane constraint 2304 may be identified by visible lane boundaries, including lines marked on a road surface. Additionally or alternatively, first lane constraint 2302 and/or second lane constraint 2304 may include an edge of a road surface. According to some embodiments, system 100 may determine first lane constraint 2302 and/or second lane constraint 2304 by identifying a midpoint of a road surface width 2320 (or any other suitable road feature that vehicle 200 may use as a navigation reference). System 100 may identify lane constraints in this manner when, for example, lines designating road lanes are not painted or otherwise labeled.

When passing a target vehicle 2310, the lane change of vehicle 200 may be complicated by a change in the trajectory of target vehicle 2330. Thus, system 100 may identify target vehicle 2310 based on an analysis of a plurality of images acquired by one or more of image capture devices 122-126. System 100 may also identify second lane 2340 in which target vehicle 2310 is traveling. Further, system 100 may determine whether second lane 2340 is different than lane 2330 in which vehicle 200 is traveling. If second lane 2340 is different than lane 2330, system 100 may be configured to enable vehicle 200 to pass target vehicle 2310.

System 100 may also monitor target vehicle 2310 based on the plurality of images. For example, system 100 may monitor a position of target vehicle 2310, such as monitoring its position relative to vehicle 200, relative to first lane constraint 2302 and/or second lane constraint 2304, an absolute position, or relative to another reference point. Additionally or alternatively, monitoring a position of target vehicle 2310 may include estimating a speed of target vehicle 2310.

If system 100 determines that target vehicle 2310 is entering lane 2330 in which vehicle 200 is traveling, system 100 may cause vehicle 200 to abort the pass of target vehicle 2310. For example, system 100 may cause vehicle 200 to stop accelerating or brake. Additionally or alternatively, system 100 may issue an audible announcement, such as to notify driver of vehicle 200 that the lane change is being aborted.

Figure 24A:
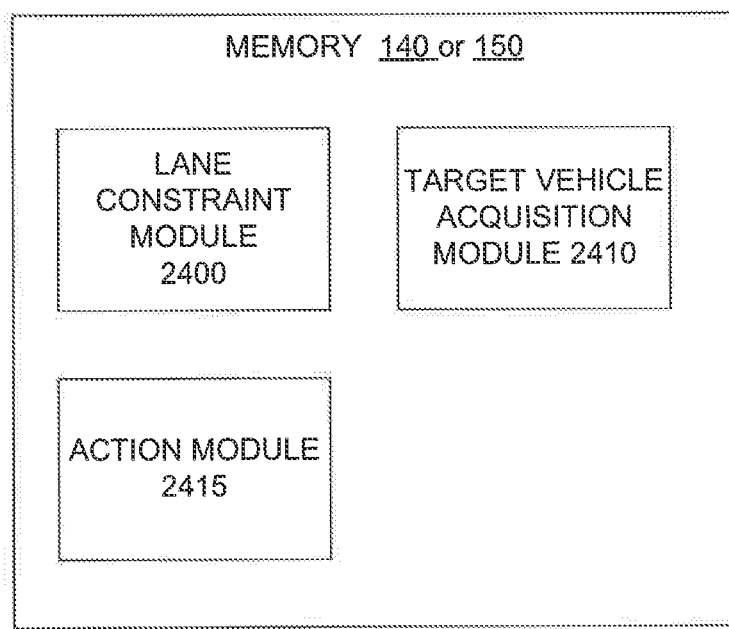
FIG. 24A is a diagrammatic representation of a memory storing instructions for navigating a vehicle among encroaching vehicles consistent with the disclosed embodiments.

FIG. 24A is an exemplary block diagram of memory 140, which may store instructions for performing one or more operations consistent with disclosed embodiments. As illustrated in FIG. 24A, memory 140 may store one or more modules for identification of the target vehicle and responses described herein. For example, memory 140 may store a lane constraint module 2400, a target vehicle acquisition module 2410, and an action module 2415.

In one embodiment, lane constraint module 2400 may store instructions which, when executed by processing unit 110, may detect and define first lane constraint 2302 and second lane constraint 2304. For example, processing unit 110 may execute lane offset module 2400 to process the plurality of images received from at least one image capture device 122-124 and detect first lane constraint 2302 and second lane constraint 2304. As discussed above, this may include identifying painted lane lines or markers and/or measuring a midpoint of a road surface. Processing unit 110 may perform the analysis based on the techniques described in connection with FIGS. 5A-5D, above.

In some embodiments, target acquisition module 2410 may store instructions which, when executed by processing unit 110, may detect the presence of target vehicle 2310 and monitor the position of target vehicle 2310. For example, target acquisition module 2410 may process the plurality of images to detect and monitor target vehicle 2310. Additionally or alternatively, when executing target acquisition module 2410, processing unit 110 may receive information from another module or other system indicative of the presence and/or location of target vehicle 2310. Processing unit 110 may perform the analysis based on the techniques described in connection with FIGS. 5A-5D, above.

Processing unit 110 may be configured to determine the presence of one or more objects such as target vehicle 2310 in the vicinity of vehicle 200. For example target vehicle 2310 may comprise another vehicle, such as a car, truck or motorcycle traveling near vehicle 200. Processing unit 110 may determine, for each target vehicle 2310, an offset profile. The offset profile may include a determination of whether in its current and predicted position, target vehicle 2310 will be within a predefined range of vehicle 200. If processing unit 110 determines that target vehicle 2310 is or will be within a predefined range of vehicle 200, processing unit may determine whether there is enough space within first lane constraint 810 and second lane constraint 820, for vehicle 200 to bypass target vehicle 2310. If there is not enough space, processing unit 110 may execute a lane change. If there is enough space, processing unit 110 may determine whether there is enough time to bypass target vehicle 2310 before the distance between vehicle 200 and target vehicle 2310 closes. If there is enough time, processing unit 110 may initiate and or activate the offset maneuver to bypass target vehicle 2310. The offset maneuver may be executed by processing unit 110 so that the movement of vehicle 200 is smooth and comfortable for the driver. For example, the offset slew rate may be approximately 0.15 to 0.75 m/sec. The offset maneuver may be executed so that the maximum amplitude of the offset maneuver will occur when the gap between vehicle 200 and object 825 closes. If there is not enough time, processing unit 110 may initiate braking and then initiate an offset maneuver.

Further, processing unit 110 may execute action module 2415 to abort the plan of vehicle 200 to pass target vehicle 2310. If target vehicle 2310 is not in lane 2330 of vehicle 200, instructions included in action module 1230 may enable vehicle 200 to pass target vehicle 2330. However, if execution of target vehicle acquisition module 2410 indicates that target vehicle 2310 is changing lanes into lane 2330 of vehicle 200, processing unit 110 may execute instructions included in action module 2415 to abort the lane change of vehicle 200. For example, processing unit 110 may transmit electronic signals to throttling system 220, braking system 230, and/or steering system 240 of vehicle 200 to abort the lane change. Additionally or alternatively, processing unit may cause an audible notification to sound.

Figure 24B:
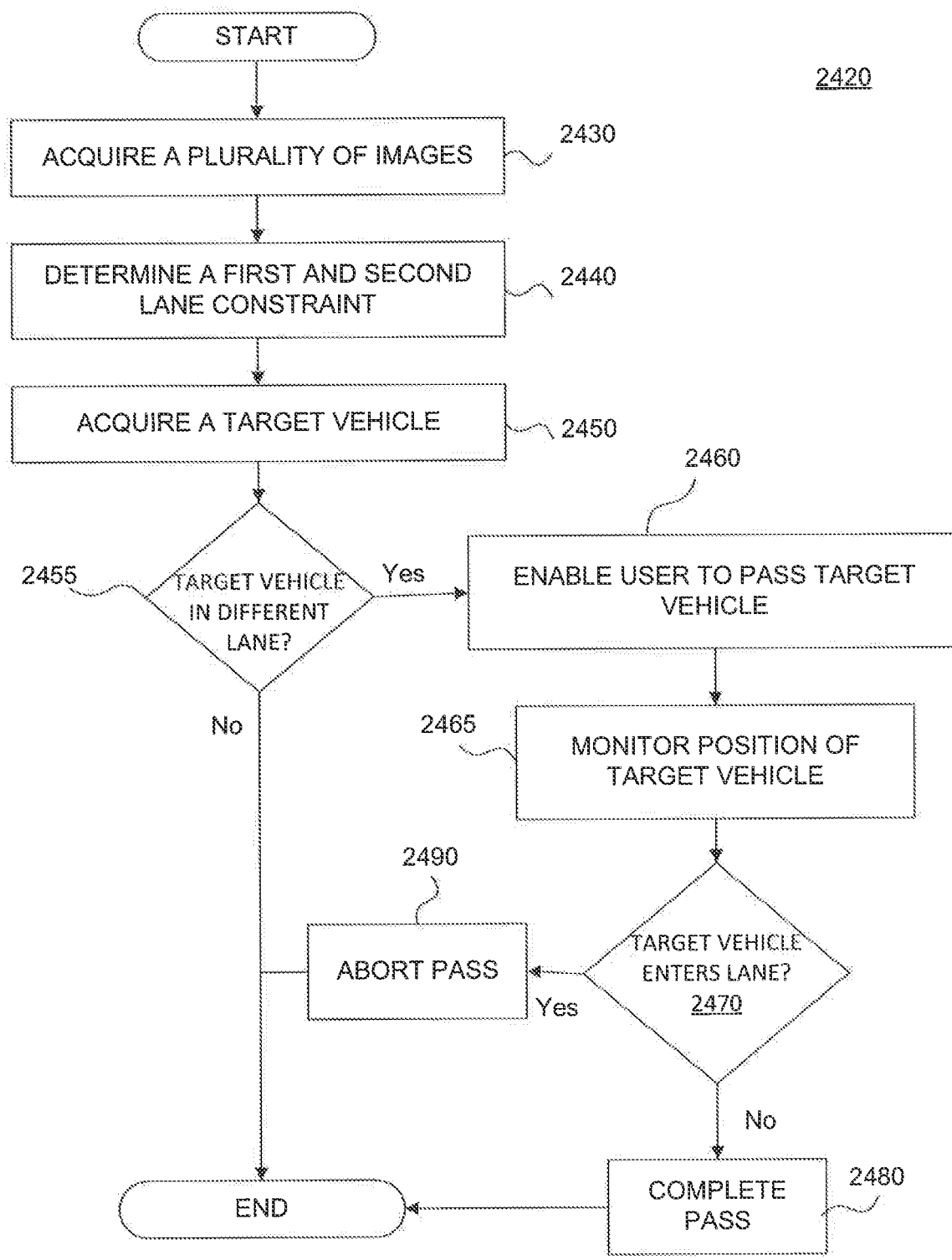
FIG. 24B is a flowchart of an exemplary process for navigating a vehicle among encroaching vehicles consistent with the disclosed embodiments.

FIG. 24B illustrates a flowchart of an exemplary process 2420 for navigating a vehicle among encroaching vehicles, consistent with disclosed embodiments. Process 2420 may identify lane constraints that define a lane of travel for a vehicle (e.g., vehicle 200) to travel, identify and monitor a target vehicle (e.g., vehicle 2310), and enable the vehicle to pass the target vehicle or abort the pass if it is determined that the target vehicle is entering a lane in which the vehicle is traveling.

At step 2430, at least one of image capture device 122, 124, and/or 126 may acquire a plurality of images of an area in the vicinity of vehicle 200. For example, a camera included in image acquisition unit 120 (such as image capture device 122) may capture a plurality of images and transmit them over a digital connection (e.g., USB, wireless, Bluetooth, etc.) to processing unit 110. In some embodiments, processing unit 110 may receive more than one plurality of images via a plurality of data interfaces. For example, processing unit 110 may receive a plurality of images from each of image capture devices 122, 124, 126, each of which may have an associated data interface for communicating data to processing unit 110. The disclosed embodiments are not limited to any particular data interface configurations or protocols.

Next, at step 2440, processing unit 110 may determine a first lane constraint on first vehicle side 802 and a second lane constraint on second vehicle side 812 using the plurality of images received via data interface 128. For example, as part of implementing step 2440, processing unit 110 may execute instructions of lane constraint module 910. Further, as part of determining the first and second lane constraints, processing unit 110 may use one or more of the processes discussed above in connection with FIGS. 5A-5D.

At step 2450, processing unit 110 may acquire target vehicle 2310. To acquire target vehicle 2310, processing unit 110 may execute target vehicle acquisition module 2410. For example, processing unit 110 may execute instructions to analyze acquired images to identify second lane 2340 in which target vehicle 2310 is traveling and determine whether target vehicle 2310 is traveling in lane 2330 in which vehicle 200 is traveling. This determination may be based on the techniques described in connection with FIGS. 5A-5D, above.

At step 2455, processing unit 110 may determine whether second lane 2340 in which target vehicle 2310 is traveling is different than lane 2330 in which vehicle 200 is traveling.

At step 2460, processing unit 110 may enable vehicle 200 to pass target vehicle 2310 if second lane 2340 is different than lane 2330 in which vehicle 200 is traveling. To enable vehicle 200 to pass target vehicle 2310, processing unit may execute action module 2415.

Next, at step 2465, processing unit 110 may execute target acquisition module 2410 to monitor target vehicle 2310. This may include estimating a velocity of target vehicle 2310 and determining the location of target vehicle 2310, such as with respect to vehicle 200.

Step 2470 may include determining whether target vehicle 2310 has entered lane 2330. If processing unit 110 determines that target vehicle 2310 has not entered lane 2330, at step 2480, processing unit 110 may allow vehicle 200 to complete the pass.

At step 2490, if processing unit 110 determines that target vehicle 2310 has entered lane 2330 (or is entering lane 2330 or is otherwise on a trajectory to bring vehicle 2310 into lane 2330), processing unit 110 may execute action module 2415 to abort the pass. This may include, for example, issuing an audible notification to driver of vehicle 200 via speakers 360. Additionally or alternatively, step 2490 may include executing instructions included in action module 2415 to cause processing unit 110 to transmit electronic signals to throttling system 220, braking system 230, and/or steering system 240 of vehicle 200 to abort lane change.

Navigating a Vehicle to Avoid Encroaching Traffic

System 100 may provide driver assist functionality that monitors the vicinity around vehicle 200 and responds to the presence of another vehicle encroaching upon vehicle 200. Monitoring the vicinity around vehicle 200 may include monitoring a collision threshold. For example a collision threshold may include a time to collision or a minimum predetermined distance between vehicle 200 and other traffic. System 100 may further cause vehicle 200 to take evasive action to avoid encroaching traffic. For example, evasive action may include braking, changing lanes, or otherwise altering the course of vehicle 200.

Figure 25:
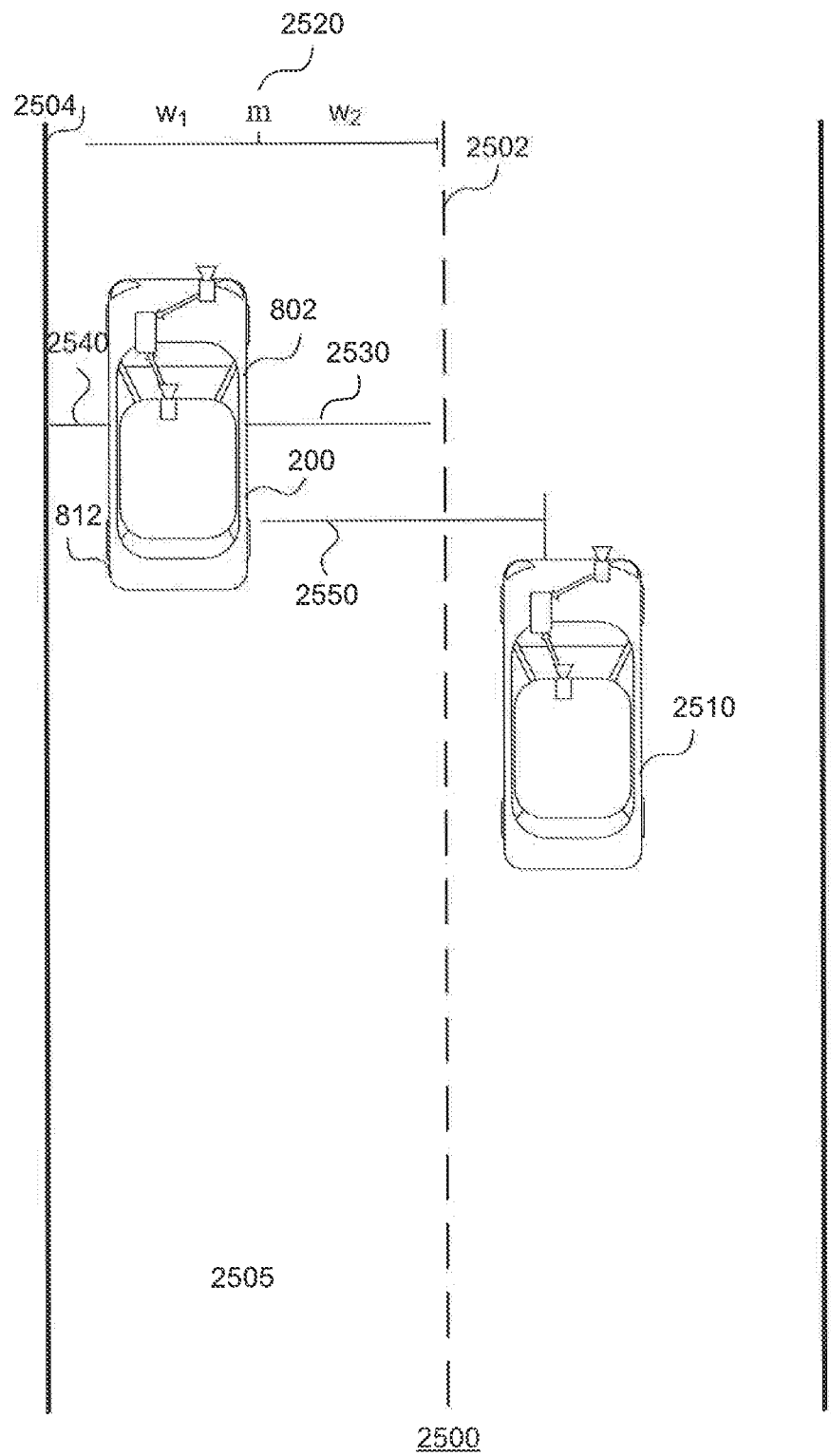
FIG. 25 is a diagrammatic representation of an exemplary vehicle traveling within a first and a second lane constraint on a roadway along on which another vehicle is traveling consistent with the disclosed embodiments.

As illustrated in FIG. 25, vehicle 200 may travel on roadway 2500. Vehicle 200 may include system 100 to detect and respond to encroaching traffic. For example, vehicle 200 may determine that another vehicle is entering into the lane in which vehicle 200 is traveling or otherwise determine that another vehicle is crossing a collision threshold. Vehicle 200 may react to an encroaching vehicle, such as by altering course, braking, or accelerating.

As discussed with respect to FIG. 8 and as shown in FIG. 25, vehicle 200 may include first vehicle side 802, which may be first distance 805 from a first lane constraint 2502. Similarly, vehicle 200 may include second vehicle side 812 opposite from first vehicle side 802, and second vehicle side 812 may be second distance 815 from a second lane constraint 2504. In this manner, first lane constraint 2502 and second lane constraint 2504 may define a lane 2505 within which vehicle 200 may travel.

System 100 may determine first lane constraint 2502 and second lane constraint 2504 based on a plurality of images acquired by one or more of image capture devices 122-126. According to some embodiments, first lane constraint 2502 and/or second lane constraint 2504 may be identified by visible lane boundaries, such a line marked on a road surface. Additionally or alternatively, first lane constraint 2502 and/or second lane constraint 2504 may include an edge of a road surface. According to some embodiments, system 100 may determine first lane constraint 2502 and/or second lane constraint 2502 by identifying a midpoint 2520 of a road surface width (or any other suitable road feature vehicle 200 may use as a navigation reference). System 100 may identify lane constraints in this manner when, for example, lines designating road lanes are not painted or otherwise labeled.

Detection of first lane constraint 2502 and/or second lane constraint 2504 may include processing unit 110 determining their 3D models in a camera coordinate system. For example, the 3D models of first lane constraint 2502 and/or second lane constraint 2504 may be described by a third-degree polynomial. In addition to 3D modeling of first lane constraint 2502 and/or second lane constraint 2504, processing unit 110 may estimate motion parameters, such as the speed, yaw and pitch rates, and acceleration of vehicle 200. Optionally, processing unit may detect static and moving vehicles and their position, heading, speed, and acceleration, all relative to vehicle 200. Processing unit 110 may determine a road elevation model to transform the information acquired from the plurality of images into 3D space.

The driver of vehicle 200 cannot assume that other traffic traveling in adjacent or near-adjacent lanes will only change lanes if it is safe for that traffic to shift into lane 2505 in which vehicle 200 is driving. Thus, it may be desirable to consider and monitor traffic traveling in nearby lanes to detect lateral encroachment into lane 2505 of vehicle 200, so that vehicle 200 may react to lateral encroachment to avoid a collision. System 100 may identify an encroaching vehicle 2510 based on the plurality of images and determine that encroaching vehicle 2510 is approaching vehicle 200. System 100 may then cause an action to account for the encroaching vehicle. For example, system 100 may cause vehicle 200 to maintain a current velocity and travel within first lane constraint 2502 and second lane constraint 2504 such that a first distance 2530, which is on first vehicle side 802 on which encroaching vehicle 2510 is approaching, is greater than a second distance 2540.

Processing unit 110 may be configured to determine the presence of one or more encroaching vehicles 2510 in the vicinity of vehicle 200. Processing unit 110 may determine, for each encroaching vehicle 2510 an offset profile. The offset profile may include a determination of whether in its current and predicted position, encroaching vehicle 2510 will be within a predefined range of vehicle 200. If processing unit 110 determines that encroaching vehicle 2510 is or will be within a predefined range of vehicle 200, processing unit may determine whether there is enough space within first lane constraint 2502 and second lane constraint 2504, for vehicle 200 to bypass encroaching vehicle 2510. If there is not enough space, processing unit 110 may execute a lane change. If there is enough space, processing unit 110 may determine whether there is enough time to bypass encroaching vehicle 2510 before the distance between vehicle 200 and encroaching vehicle 2510 closes.

For example, if there is enough time, processing unit 110 may initiate and or activate the offset maneuver to bypass encroaching vehicle 2510. The offset maneuver may be executed by processing unit 110 so that the movement of vehicle 200 is smooth and comfortable for the driver. For example, the offset slew rate may be approximately 0.15 to 0.75 m/sec. The offset maneuver may be executed so that the maximum amplitude of the offset maneuver will occur when the gap between vehicle 200 and encroaching vehicle 2510 closes. If there is not enough time, processing unit 110 may initiate braking (e.g., via transmitting electronic signals to braking system 230) and then initiate offset maneuver (e.g., by transmitting electronic signals to throttling system 220 and/or steering system 240).

System 100 may determine, based on a plurality of images acquired by one or more of image capture devices 122-126, that encroaching vehicle 2510 has crossed at least one collision threshold. For example, the at least one collision threshold may include a minimum predetermined distance 2550 between vehicle 200 and encroaching vehicle 2510. For example, encroaching vehicle 2510, as illustrated in FIG. 25, is shown exceeding minimum predetermined distance 2550. Additionally or alternatively, the at least one collision threshold may include a time to collision of vehicle 200 and encroaching vehicle 2510. The time-to-collision threshold may be determined based on the distance between vehicle 200 and encroaching vehicle 2510, the velocity of vehicle 200 and/or encroaching vehicle 2510, the lateral velocity of vehicle 200 and/or encroaching vehicle 2510, and/or the acceleration of vehicle 200 and/or encroaching vehicle 2510. A collision threshold based on a time to collision may be set to allow enough time for system 100 to effectively conduct evasive action to avoid collision.

If system 100 determines that at least one collision threshold has been crossed, system 100 may cause vehicle 200 to take evasive action. For example, this may include causing other subsystems of vehicle 200 to operate. Thus, system 100 may operate to cause vehicle 200 to increase speed by communicating with throttling system 220, braking system 230, and/or steering system 240 to change the speed and/or direction of vehicle 200.

The evasive action may include causing vehicle 200 to change lanes. This may be a desirable response if, for example, vehicle 200 is traveling on a multilane highway and system 100 determines that changing lanes to move away from encroaching vehicle 2510 will avoid a collision. Evasive action may include vehicle 200 altering its course. Additionally or alternatively, evasive action may include altering course of vehicle 200. For example, to take evasive action, processing unit 110 may transmit electronic signals to throttling system 220, braking system 230, and/or steering system 240.

System 100 may also be configured to cause vehicle 200 to take an action after the evasive action has been completed. For example, system 100 may cause vehicle 200 to return to midpoint 2520 of lane 2505 in which vehicle 200 is traveling. Additionally or alternatively, system 100 may cause vehicle 200 to resume a preset speed after braking in response to encroaching vehicle 2510.

Figure 26:
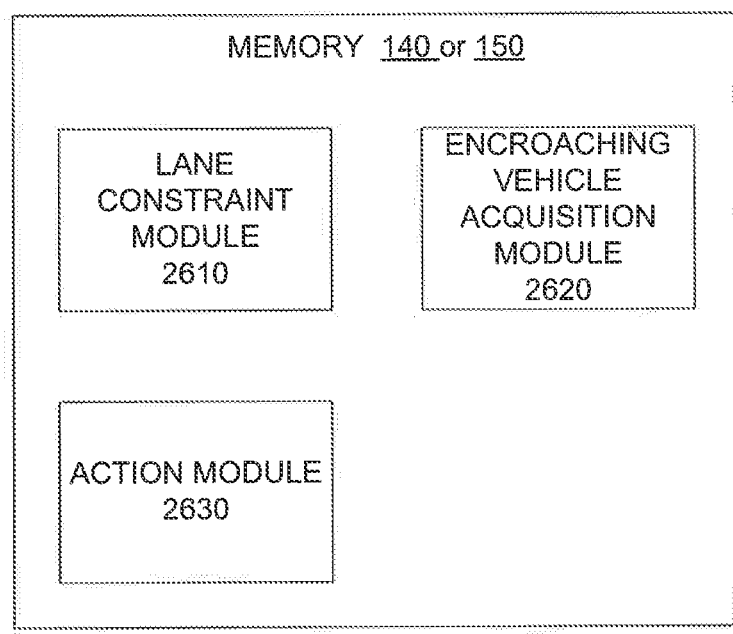
FIG. 26 is a diagrammatic representation of a memory storing instructions for detecting and responding to traffic laterally encroaching on a vehicle consistent with the disclosed embodiments.

FIG. 26 is an exemplary block diagram of memory 140, which may store instructions for detecting and responding to traffic laterally encroaching on a vehicle consistent with disclosed embodiments. As illustrated in FIG. 26, memory 140 may store a lane constraint module 2610, an encroaching vehicle acquisition module 2620, and an action module 2630.

In one embodiment, lane constraint module 2610 may store instructions which, when executed by processing unit 110, may detect and define first lane constraint 2502 and second lane constraint 2504. For example, processing unit 110 may execute lane offset constraint module 2610 to process the plurality of images received from at least one image capture device 122-126 and detect first lane constraint 2502 and second lane constraint 2504. As discussed above, this may include identifying painted lane lines and/or measuring a midpoint of a road surface. Processing unit 110 may perform the analysis based on the techniques described in connection with FIGS. 5A-5D, above.

In one embodiment, encroaching vehicle acquisition module 2620 may store instructions which, when executed by processing unit 110, may detect the presence of encroaching vehicle 2510 and monitor encroaching vehicle 2510. For example, encroaching vehicle acquisition module 2620 may include instructions for determining a relative location of encroaching vehicle 2510 to vehicle 200. In some embodiments, this may include monitoring the velocity of encroaching vehicle 200. According to some embodiments, encroaching vehicle acquisition module 2620 may determine whether encroaching vehicle 2510 has exceeded a collision threshold. A collision threshold may be, for example, a minimum predetermined distance between vehicle 200 and encroaching vehicle 2510. If encroaching vehicle 2510 comes closer to vehicle 200 than the minimum predetermined distance, processing unit 110 may determine that encroaching vehicle 2510 is indeed encroaching and execute instructions to avoid collision with encroaching vehicle 2510.

Additionally or alternatively, a collision threshold may include a time to collision. The time-to-collision threshold may be determined based on the distance between vehicle 200 and encroaching vehicle 2510, the velocity of vehicle 200 and/or encroaching vehicle 2510, the lateral velocity of vehicle 200 and/or encroaching vehicle 2510, and/or the acceleration of vehicle 200 and/or encroaching vehicle 2510. A collision threshold based on a time to collision may be set to allow enough time for processing unit 110 and system 100 to effectively conduct evasive action to avoid collision.

Further, processing unit 110 may execute action module 2630 to respond to the detection of encroaching vehicle 2510 and/or the crossing of a collision threshold. For example, action module 2630 may include instructions to cause vehicle 200 to maintain a current velocity and to travel within first lane constraint 2502 and second lane constraint 2504 such that first distance 2530 is greater than second distance 2540. The first distance 2530 may be on the same side of vehicle 200 as encroaching vehicle 2510, so that vehicle 200 is farther away from encroaching vehicle 2510 while still within first lane constraint 2502 and second lane constraint 2504. If processing unit 110 determines that a collision threshold has been crossed, processing unit 110 may execute action module 2630 to cause vehicle 200 to take evasive action, such as altering course, braking, and/or changing lanes. Action module 2630 may also include instructions that cause vehicle 200 to resume course after completing evasive action. For example, processing unit 110 may cause vehicle 200 to resume a preset speed after braking or return to the center of lane 2505.

Figure 27:
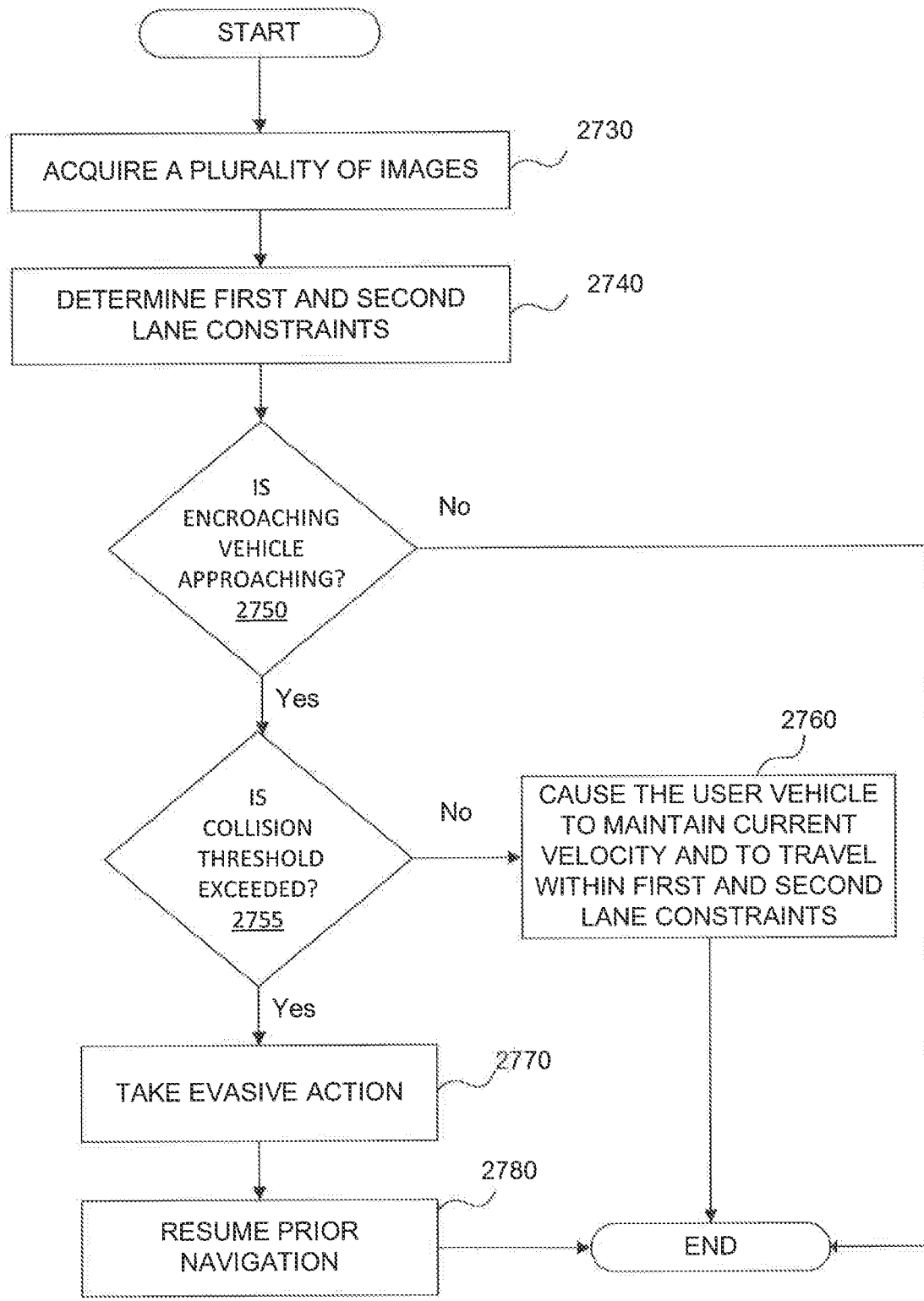
FIG. 27 is a flowchart of an exemplary process for detecting and responding to traffic laterally encroaching on a vehicle consistent with the disclosed embodiments.

FIG. 27 illustrates a flowchart of an exemplary process 2720 detecting and responding to traffic laterally encroaching on a vehicle, consistent with disclosed embodiments. Process 2720 may identify lane constraints that define a lane of travel for vehicle travel, determine whether an encroaching vehicle 2510 is approaching, and cause vehicle 200 to maintain current velocity and to travel within first lane constraint 2501 and second lane constraint 2504 such that first distance 2530, on the side of vehicle 200 that encroaching vehicle 2510 is approaching, is greater than second distance 2540.

At step 2730, at least one image capture device 122, 124, and/or 126 may acquire a plurality of images of an area in the vicinity of vehicle 200. For example, a camera included in image acquisition unit 120 (such as image capture device 122) may capture a plurality of images and transmit them over a digital connection (e.g., USB, wireless, Bluetooth, etc.) to processing unit 110. In some embodiments, processing unit 110 may receive more than one plurality of images via a plurality of data interfaces. For example, processing unit 110 may receive a plurality of images from each of image capture devices 122, 124, 126, each of which may have an associated data interface for communicating data to processing unit 110. The disclosed embodiments are not limited to any particular data interface configurations or protocols.

Next, at step 2740, processing unit 110 may determine a first lane constraint on first vehicle side 802 and a second lane constraint on second vehicle side 812 using the plurality of images received via data interface 128. For example, as part of implementing step 2740, processing unit 110 may execute instructions of lane constraint module 2610. Further, as part of determining the first and second lane constraints, processing unit 110 may use one or more of the processes discussed above in connection with FIGS. 5A-5D.

At step 2750, processing unit 110 may determine whether encroaching vehicle 2510 is approaching. To make this determination, processing unit 110 may execute encroaching vehicle acquisition module 2620. Encroaching vehicle acquisition module 2620 may include instructions to process images to detect other traffic. This may include identifying vehicles within a certain range of vehicle 200, such as those vehicles that are adjacent to vehicle 200. These adjacent vehicles may be encroaching vehicles 2510.

Once encroaching vehicle 2510 is identified, processing unit may determine more information regarding vehicle 2510. For example, at step 2555, processing unit 110 may determine whether target vehicle 2330 has exceeded a collision threshold. A collision threshold may be, for example, a minimum predetermined distance between vehicle 200 and encroaching vehicle 2510. If encroaching vehicle 2510 comes closer to vehicle 200 than the minimum predetermined distance, processing unit 110 may determine that encroaching vehicle 2510 is indeed encroaching and execute instructions to avoid collision with encroaching vehicle 2510.

Additionally or alternatively, a collision threshold may be a time to collision. The time-to-collision threshold may be determined based on the distance between vehicle 200 and encroaching vehicle 2510, the velocity of vehicle 200 and/or encroaching vehicle 2510, the lateral velocity of vehicle 200 and/or encroaching vehicle 2510, and/or the acceleration of vehicle 200 and/or encroaching vehicle 2510. A collision threshold based on a time to collision may be set to allow enough time for processing unit 110 and system 100 to effectively conduct evasive action to avoid collision.

At step 2760, processing unit 110 may cause vehicle 200 to maintain current velocity and to travel within first lane constraint 2502 and second lane constraint 2504. To cause vehicle 200 to operate in this manner, processing unit 110 may execute action module 2630. Additionally or alternatively, step 2760 may include executing instructions on action module 1230 to cause processing unit 110 to transmit electronic signals to the accelerator 2610, brakes 2620, and/or steering system of vehicle 200 to cause vehicle 200 to maintain current velocity and to travel within first and second lane constraints 810 and 820.

If, at step 2755, processing unit 110 determined that a collision threshold has been exceeded, the processing unit 110 may take evasive action. The evasive action may include causing vehicle 200 to change lanes. This may be a desirable response if, for example, vehicle 200 is traveling on a multilane highway and system 100 determines that changing lanes to move away from encroaching vehicle 2510 will avoid a collision. Evasive action may include vehicle 200 altering its course. Additionally or alternatively, evasive action may include altering course of vehicle 200. For example, processing unit 110 may undertake evasive action by transmitting electronic signals to throttling system 220, braking system 230, and/or steering system 240 of vehicle 200. After the evasive action is completed, at step 2780, processing unit 110 may control vehicle 200 to resume its prior navigation (e.g., to resume navigation to a desired location).

Multi-Threshold Reaction Zone for Vehicle Navigation

System 100 may provide driver assist functionality that causes a response in vehicle 200, such as braking, accelerating, switching lanes, turning, and/or other navigational responses. For example, if system 100 detects the presence of another vehicle ahead of vehicle 200 that is traveling at a rate of speed slower than vehicle 200, system 100 may cause vehicle 200 to reduce its speed by braking. System 100 may apply a braking profile that accounts for the immediacy of the risk (e.g., the risk of collision) to provide the driver with a natural driving sensation.

System 100 may cause various different responses depending on the situation and a determined risk of collision with another vehicle, for example. System 100 may take no action in response to changes in speed or direction of a target vehicle ahead if the target vehicle is sufficiently far ahead and the determined risk of collision is low. Where the target vehicle may be closer or when the risk of collision rises above a predetermined level, system 100 may cause a response, such as braking, etc. When the risk of collision is even higher (e.g., where system 100 determines that a collision would be imminent without evasive action), system 100 may cause vehicle 100 to take an evasive action, such as maximum or near maximum braking, change of direction, etc.

Figure 28A:
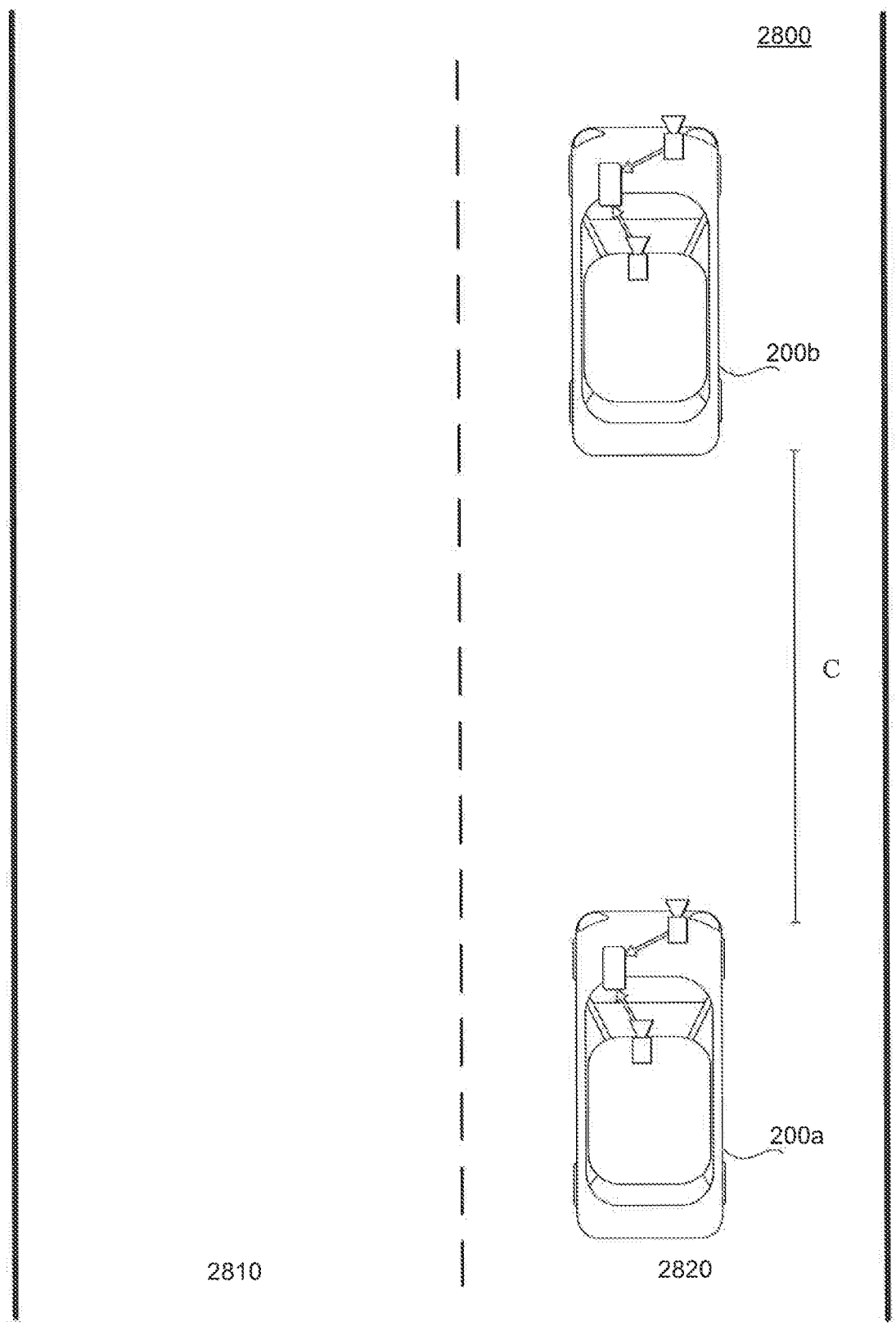
FIGS. 28A and 28B are diagrammatic representations of causing a response in a primary vehicle consistent with the disclosed embodiments.
Figure 28B:
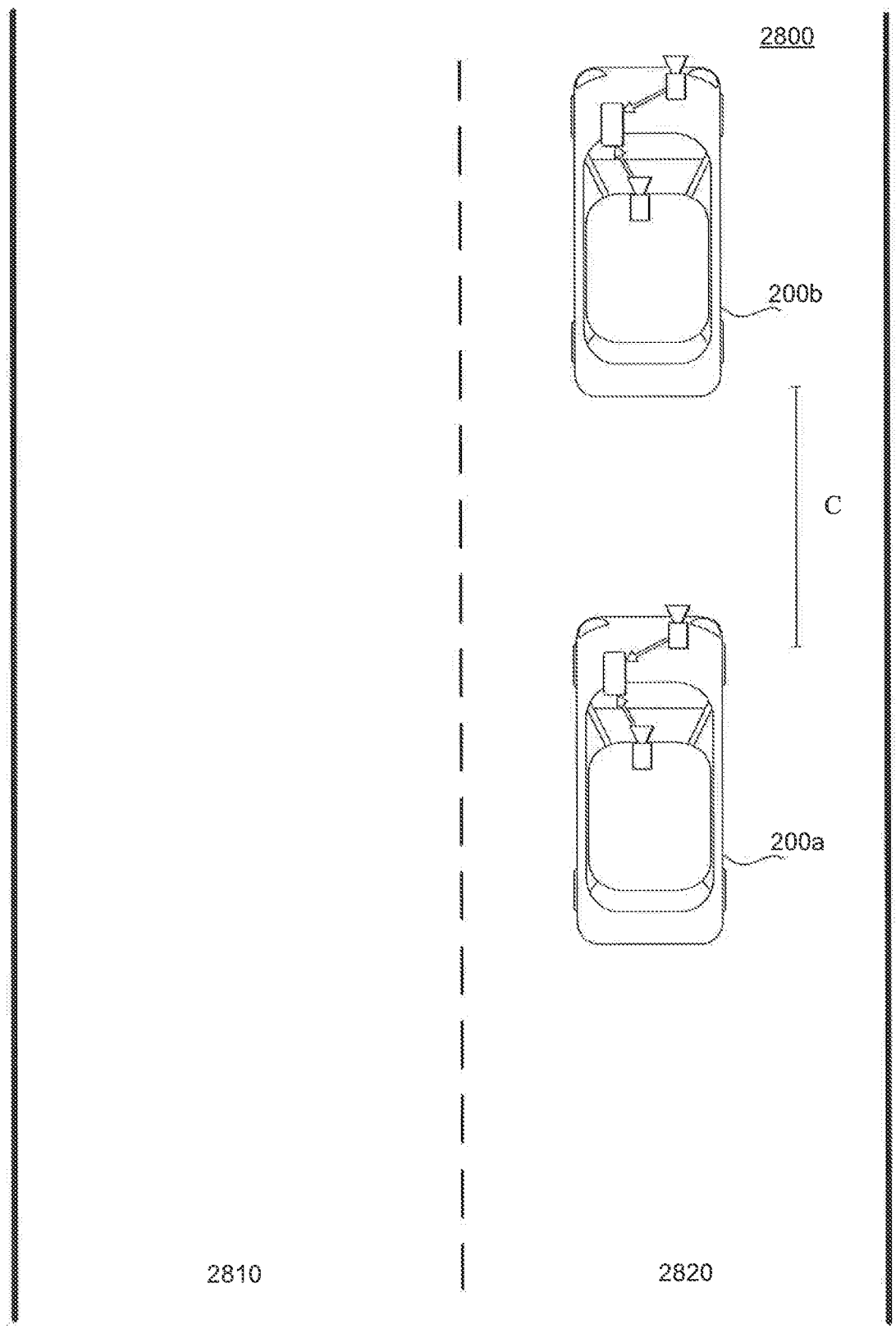

FIGS. 28A and 28B are diagrammatic representations of a primary vehicle 200a on a road 2800, consistent with disclosed embodiments. In some instances, road 2800 may be divided into two lanes, lane 2810 and lane 2820. A target object, such as target vehicle 200b, may be traveling ahead of primary vehicle 200a in the same lane (e.g., lane 2820 as shown in FIGS. 28A and 28B) or in a different lane. As shown in the example depicted in FIG. 28A, primary vehicle 200a and target vehicle 200b may be separated by a distance $d_1$. At a given time after the scene depicted in FIG. 28A, primary vehicle 200a and target vehicle 200b may be separated by a distance $d_2$ as shown in FIG. 28B, where $d_2$ is less than $d_1$. For example, primary vehicle 200a may be traveling at a rate of speed greater than target vehicle 200b, causing the distance between the vehicles to decrease from $d_1$ to $d_2$.

As another example, primary vehicle 200a and target vehicle 200b may be traveling at the same rate of speed until target vehicle 200b reduces its speed by braking, or primary vehicle 200a increases its speed by accelerating, causing the distance between the vehicles to decrease from $d_1$ to $d_2$. As another example, target vehicle 200b may encroach from a side of primary vehicle 200a. In some circumstances, if target vehicle 200b is ahead or a sufficient distance away from primary vehicle 200a (e.g., five meters or more, 10 meters or more, etc.) and moves toward primary vehicle 200a, system 100 may not take any action. However, if target vehicle 200b continues to move closer to primary vehicle 200a, then system 100 may cause primary vehicle 200a to brake, change speed, and/or change lanes. For example, if target vehicle 200b is within a predetermined threshold (e.g., within five meters), primary vehicle 200a may then take action. Different scenarios involving the relative speeds and positions of primary vehicle 200a and target vehicle 200b are possible, and the disclosed embodiments are not limited to any particular scenario.

In some embodiments, the multi-threshold reaction zone may provide a natural feeling driving experience to the user. For example, as discussed above, if the risk of collision is low, then system 100 may disregard movements by target vehicle 200b. As a result, primary vehicle 200a may not respond to movements or actions of target vehicle 200b when there is not a risk of a collision (e.g., primary vehicle 200a would not need to mimic every motion of target vehicle 200b when it's 100 meters ahead). However, if target vehicle 200b is close to primary vehicle 200a and/or if system 100 determines that the risk of collision is high, then a responsive maneuver may be taken such that the user feels safer by increasing space between primary vehicle 200a and target vehicle 200b. If system 100 determines that a crash may be imminent, then system 100 may take a more dramatic action without causing the user to be surprised, because the action may be necessary to avoid a collision.

Accordingly, in some embodiments, system 100 may associate the different reaction zones with different degrees of responsive actions. For example, in some embodiments, system 100 may take no action when target vehicle 200b is within a first threshold (e.g., when target vehicle 200b is far away from primary vehicle 200a), system 100 may take a medium action with target vehicle 200b is within a second threshold (e.g., when target vehicle 200b is becoming closer to primary vehicle 200a), and system 100 may take a more dramatic action when target vehicle 200 is within a third threshold (e.g., when target vehicle 200b is sufficiently close to primary vehicle 200a that there is a risk of a collision). In a first reaction zone associated with the first threshold, system 100 may take no action when the estimated distance-to-target associated with target vehicle 200b is greater than twice a predetermined safety distance. In some embodiments, the first reaction zone may apply where the estimated distance-to-target associated with target vehicle 200b falls in the range of 1.5 to 2.5 times the predetermined safety distance.

The estimated distance-to-target may be the current distance between primary vehicle 200a and target vehicle 200b plus the expected change of this distance over a prediction time (e.g., in the range of 0.1 to 1.0 seconds, depending on factors associated with system 100 such as velocity tracking control loops, actuators, and vehicle dynamics). The expected change of distance may be calculated as: $(v_{target} - v_{primary})*t_{prediction} + ((a_{target} - a_{primary})*t_{prediction}^{1/2})$, where $v_{target}$ and $v_{primary}$ correspond to the speed of target vehicle 200b and primary vehicle 200a, respectively, $a_{target}$ and $a_{primary}$ correspond to the acceleration of target vehicle 200b and primary vehicle 200a, respectively, and $t_{prediction}$ corresponds to the prediction time. Choosing a prediction time approximating the overall reaction time of system 100 may account for the fact that desired navigational responses for primary vehicle 200a may not be implemented immediately, and thereby may provide the driver and/or passengers of primary vehicle 200a with a smooth, natural driving experience.

The predetermined safety distance may be defined as: $\max\{d_{static}, d_{dynamic}\}$. $d_{static}$, which may fall in the range of 2 to 10 meters, may represent a desired safety distance between primary vehicle 200a and another vehicle (such as target vehicle 200b) while the vehicles are stopping and/or moving at a low rate of speed. $d_{dynamic}$ may represent a desired safety distance when the vehicles are moving at a speed greater than a low rate of speed, and may be calculated as: $t_{safety}*\min(v_{target}, v_{primary})$, where $v_{target}$ and $v_{primary}$ correspond to the speed of target vehicle 200b and primary vehicle 200a, respectively. $t_{safety}$ may fall in the range of 0.5 to 2.5 seconds and may be adjusted by the driver of primary vehicle 200a via user interface 170 according to the driver's preferences. Thus, the driver may be able to control the distance that system 100 maintains between primary vehicle 200a and other vehicles.

In a second reaction zone associated with the second threshold, system 100 may place target vehicle 200b in a safety zone and apply different weights to different maneuvers performed by target vehicle 200b. For example, as target vehicle 200b may approach a lower boundary of the safety zone, e.g., the estimated distance-to-target associated with target vehicle 200b may approach the predetermined safety distance (discussed above in connection with the first reaction zone), system 100 may assign more weight to deceleration maneuvers (e.g., mimicked more) and less weight to acceleration maneuvers (e.g., mimicked less). In some embodiments, the lower boundary may fall in the range of 0.5 to 1.5 times the predetermined safety distance, depending on driver preferences. Conversely, as target vehicle 200b approaches an upper boundary of the safety zone, e.g., the estimated distance-to-target associated with target vehicle 200b may approach twice the predetermined safety distance, system 100 may assign less weight to deceleration maneuvers (e.g., mimicked less) and more weight to acceleration maneuvers (e.g., mimicked more). In some embodiments, the lower boundary may fall in the range of 1.5 to 2.5 times the predetermined safety distance, depending on driver preferences.

In a third reaction zone associated with the third threshold, system 100 may place target vehicle 200b in a danger zone when the estimated distance-to-target associated with target vehicle 200b is less than the predetermined safety distance. In this scenario, system 100 may cause primary vehicle 200a to mimic (e.g., immediately) any deceleration maneuvers (while disregarding any acceleration maneuvers) performed by target vehicle 200b. In some embodiments, the first reaction zone may apply where the estimated distance-to-target associated with target vehicle 200b falls in the range of 0.5 to 1.5 times the predetermined safety distance, depending on driver preferences.

In some embodiments, system 100 may cause a response in primary vehicle 200a, such as braking. As indicated in FIG. 28B, for example, the distance between the primary vehicle 200a and target vehicle 200b may decrease from $d_1$ to $d_2$. Depending on the distance $d_2$ and, by extension, the time before collision, system 100 may cause primary vehicle 200a to reduce its speed so as to avoid a collision with target vehicle 200b. In addition, system 100 may apply one or more braking profiles when causing primary vehicle 200a to reduce its speed, also based on, for example, the time before collision. Thus, if the time before collision (and/or the distance $d_2$) exceeds a first predetermined threshold, system 100 may cause primary vehicle 200a to brake in a gradual manner, change lanes, and/or change speed, whereas if the time before collision (and/or the distance $d_2$) is below a second predetermined threshold, system 100 may cause primary vehicle 200a to brake, change lanes, and/or change speed in a more rapid manner.

Figure 29:
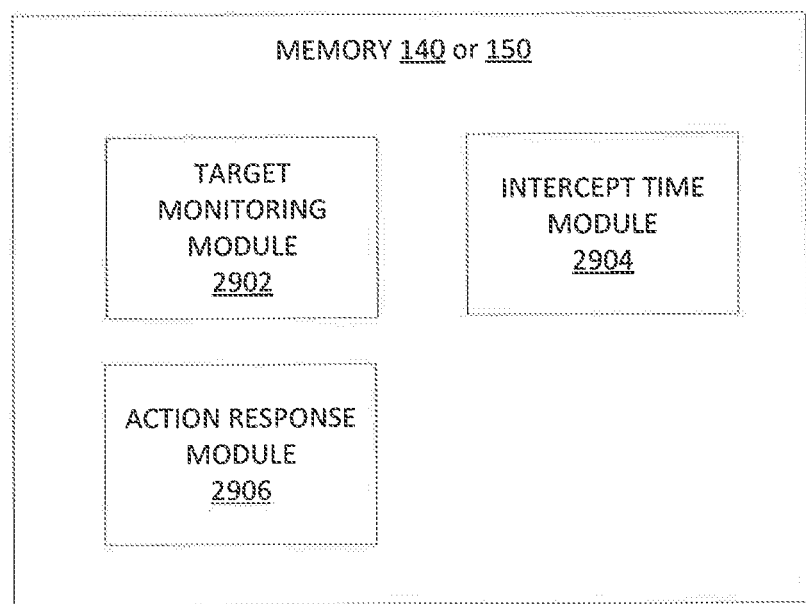
FIG. 29 is an exemplary block diagram of a memory configured to store instructions for performing one or more operations consistent with the disclosed embodiments.

FIG. 29 is an exemplary block diagram of a memory configured to store instructions for performing one or more operations, consistent with the disclosed embodiments. As shown in FIG. 29, memory 140 may store a target monitoring module 2902, an intercept time module 2904, and an action response module 2906. The disclosed embodiments are not limited to any particular configuration of memory 140. Further, processing unit 110 may execute the instructions stored in any of modules 2902-2906 included in memory 140.

In one embodiment, target monitoring module 2902 may store software instructions (such as computer vision software) which, when executed by processing unit 110, identifies and monitors a target object (such as target vehicle 200b) appearing in a plurality of images representing an environment in the vicinity of primary vehicle 200. For purposes of this disclosure, the target object may also be referred to as target vehicle 200b, although the target object may be a pedestrian, road hazard (e.g., large debris), and the like. The plurality of images may be acquired by one or more of image capture devices 122, 124, and 126. Processing unit 110 may execute target monitoring module 2902 to identify and monitor target vehicle 200b by, for example, analyzing the plurality of images using the techniques described in connection with FIGS. 5A-5D, above. Thus, target monitoring module 2902 may track different variables, such as the motion (e.g., direction of travel and trajectory), speed, and acceleration associated with target vehicle 200b, as well as the distance between primary vehicle 200a and the target vehicle 200b. Such information may be tracked continuously or at predetermined intervals.

In one embodiment, intercept time module 2904 may store software instructions which, when executed by processing unit 110, determines an indicator of an intercept time between primary vehicle 200a and target vehicle 200b. The intercept time may refer to an amount of time before primary vehicle 200a makes contact (e.g., collides) with target vehicle 200b. Processing unit 110 may execute intercept time module 2904 to determine an indicator of the intercept time based on an analysis of images acquired by one or more of image capture devices 122, 124, and 126. For example, intercept time module 2904 may make the determination using a series of time-based observations, e.g., of the position, speed, and/or acceleration of target vehicle 200b (relative to primary vehicle 200a), such as Kalman filters or linear quadratic estimation (LQE). The Kalman filters may be based on a measurement of the scale of target vehicle 200b, where the scale measurement is proportional to the intercept time.

In one embodiment, action response module 2906 may store software instructions (such as computer vision software) which, when executed by processing unit 110, causes one or more responses in primary vehicle 200a. The responses may be based on the identification and monitoring of target vehicle 200b (e.g., performed via execution of target monitoring module 2902) and/or the indicator of an intercept time between primary vehicle 200a and target vehicle 200b (e.g., determined via execution of intercept time module 2904). Processing unit 110 may cause one or more responses in primary vehicle 200a by, for example, transmitting electronic signals (e.g., via a CAN bus) to throttling system 220, braking system 230, and/or steering system 240 of primary vehicle 200a to brake, accelerate, or trigger a turn, lane shift, and/or change in direction of primary vehicle 200a. Processing unit 110 may use extended Kalman Filters to estimate data associated with target vehicle 200b and primary vehicle 200a, such as: speed, acceleration, turn rate, pitch angle, pitch rate, position and heading of target vehicle 200b relative to primary vehicle 200a, the size of target vehicle 200b, road geometry, and the like. For example, processing unit 110 may receive measurements from components on primary vehicle 200a, such as an odometer, an inertial measurement unit (IMU), image processor 190, and the like. Thus, processing unit 110 may calculate data associated with target vehicle 200b and/or primary vehicle 200a using state equations derived from kinematic equations of motion, rigidity constraints, and motion assumptions, where inputs to the equations may include measurements from components on primary vehicle 200a. Processing unit 110 may also use the techniques described in connection with FIGS. 4-7, above, to cause one or more responses in primary vehicle 200a.

Figure 30:
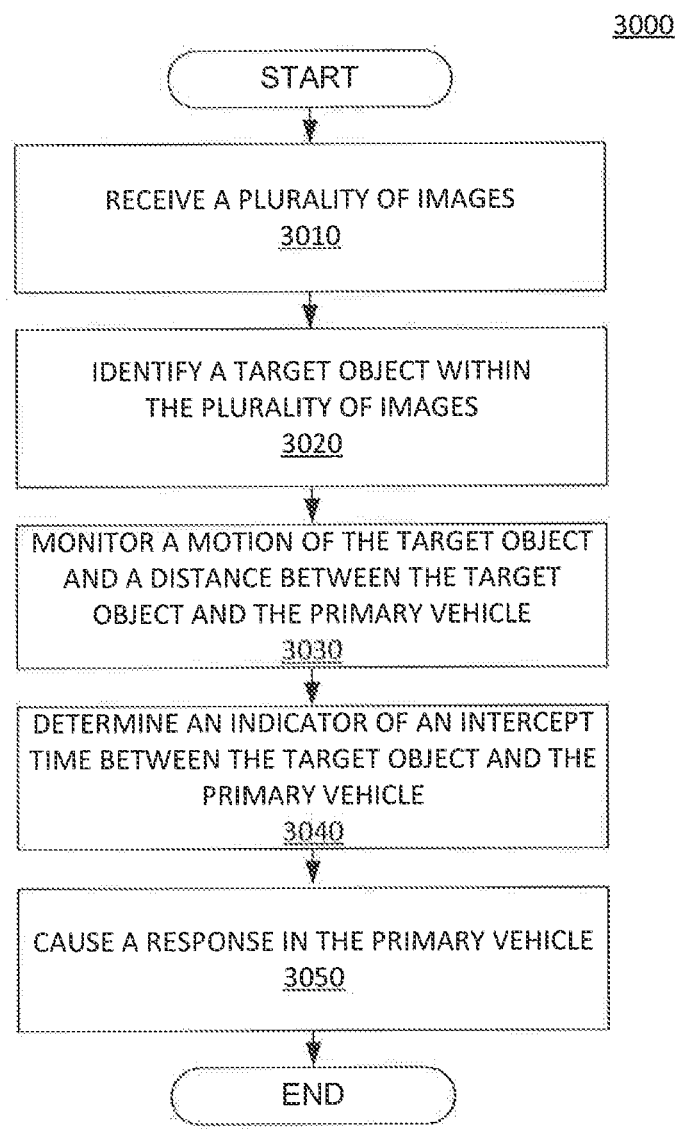
FIG. 30 is a flow chart showing an exemplary process for causing a response in a primary vehicle consistent with disclosed embodiments.

FIG. 30 is a flow chart showing an exemplary process 3000 for causing a response in a primary vehicle, consistent with disclosed embodiments. At step 3010, processing unit 110 may receive a plurality of images via data interface 128 between processing unit 110 and image acquisition unit 120. For instance, one or more cameras included in image acquisition unit 120 may capture a plurality of images of an area forward of primary vehicle 200a (or to the sides or rear of a vehicle, for example) and transmit them over a data connection (e.g., digital, wired, USB, wireless, Bluetooth, etc.) to processing unit 110.

At step 3020, processing unit 110 may execute target monitoring module 2902 to identify a target object (such as target vehicle 200b) within the plurality of images. For example, target monitoring module 2902 may detect the presence of vehicles in the images using the techniques described in connection with FIGS. 5A and 5B, above. Multiple vehicles (and/or objects) may be detected in the same lane or in a different lane as primary vehicle 200a, and at varying distances from primary vehicle 200a, based on image data, position data (e.g., GPS location information), map data, the yaw rate of primary vehicle 200a, lane or other road markings, speed data, and/or data from sensors included in primary vehicle 200a. In a scenario where multiple vehicles are detected, target monitoring module 2902 may determine target vehicle 200b to be the vehicle traveling in the same lane as primary vehicle 200a and/or located closest to primary vehicle 200a.

At step 3030, processing unit 110 may execute target monitoring module 2902 to monitor target vehicle 200b identified at step 3020. For example, target monitoring module 2902 may track information associated with target vehicle 200b, such as the motion (e.g., direction of travel and trajectory), speed, and acceleration, as well as the distance between primary vehicle 200a and the target vehicle 200b. Target monitoring module 2902 may track such information continuously, or at predetermined intervals, by analyzing the plurality of images using the techniques described in connection with FIGS. 5A-5D, above. At step 3040, processing unit 110 may execute intercept time module 2904 to determine an indicator of an intercept time between primary vehicle 200a and target vehicle 200b. Intercept time module 2904 may make the determination by tracking the position, speed, and/or acceleration of target vehicle 200b (relative to primary vehicle 200a) over one or more periods of time. Intercept time module 2904 may use the techniques described in connection with FIGS. 5A and 5B, above to track such information.

At step 3050, processing unit 110 may execute action response module 2906 to cause one or more responses in primary vehicle 200a. For example, processing unit 110 may transmit electronic signals (e.g., via a CAN bus) to throttling system 220, braking system 230, and/or steering system 240 of primary vehicle 200a to brake, accelerate, or trigger a turn, lane shift, and/or change in direction of primary vehicle 200a. Further, one or more actuators may control throttling system 220, braking system 230, and/or steering system 240. For example, processing unit 110 may transmit electronic signals that cause system 100 to physically depress the brake by a predetermined amount or ease partially off the accelerator of vehicle 200. Further, processing unit 110 may transmit electronic signals that cause system 100 to steer vehicle 200 in a particular direction. Such responses may be based on the monitoring of target vehicle 200b (performed at step 3030) and/or the indicator of an intercept time between primary vehicle 200a and target vehicle 200b (determined at step 3040). In some embodiments, the intercept time may be compared with one or more predetermined thresholds, e.g., a first and second intercept threshold. For example, the response may include an emergency avoidance action if the indicator of intercept time indicates that a target object is within a particular intercept threshold (e.g., within the second intercept threshold). The emergency avoidance action may include changing lanes and/or emergency braking.

The thresholds may be expressed as units of time. Thus, for example, if the indicator of intercept time indicates that target vehicle 200b is outside of the first threshold (e.g., the time before collision between primary vehicle 200a and target vehicle 200b exceeds the first threshold), then action response module 2906 may cause a response in primary vehicle 200a based on an averaged motion profile associated with target vehicle 200b. The averaged motion profile associated with target vehicle 200b may represent an averaged position and/or averaged speed of target vehicle 200b for a particular threshold. In some embodiments, if target vehicle 200b is a certain distance and/or traveling a certain speed, system 100 may elect to take no action. For example, if target vehicle 200*b* is ahead or a sufficient distance away from primary vehicle 200*a* (e.g., five meters, 10 meters, etc.), system 100 may not take any action unless target vehicle 200*b* becomes closer to primary vehicle 200.

If the indicator of intercept time indicates that target vehicle 200*b* is between the first and second thresholds (e.g., the time before collision between primary vehicle 200*a* and target vehicle 200*b* falls in between the first and second thresholds), then action response module 2906 may cause a response in primary vehicle 200*a* based on the actual motion associated with target vehicle 200*b*. The actual motion may represent a position and/or speed of target vehicle 200*b* (e.g., not averaged or delayed) If the indicator of intercept time indicates that target vehicle 200*b* is within the second threshold (e.g., the time before collision between primary vehicle 200*a* and target vehicle 200*b* is below the second threshold), then action response module 2906 may cause an emergency action in primary vehicle 200*a* (such as a lane change or emergency braking).

Figure 31:
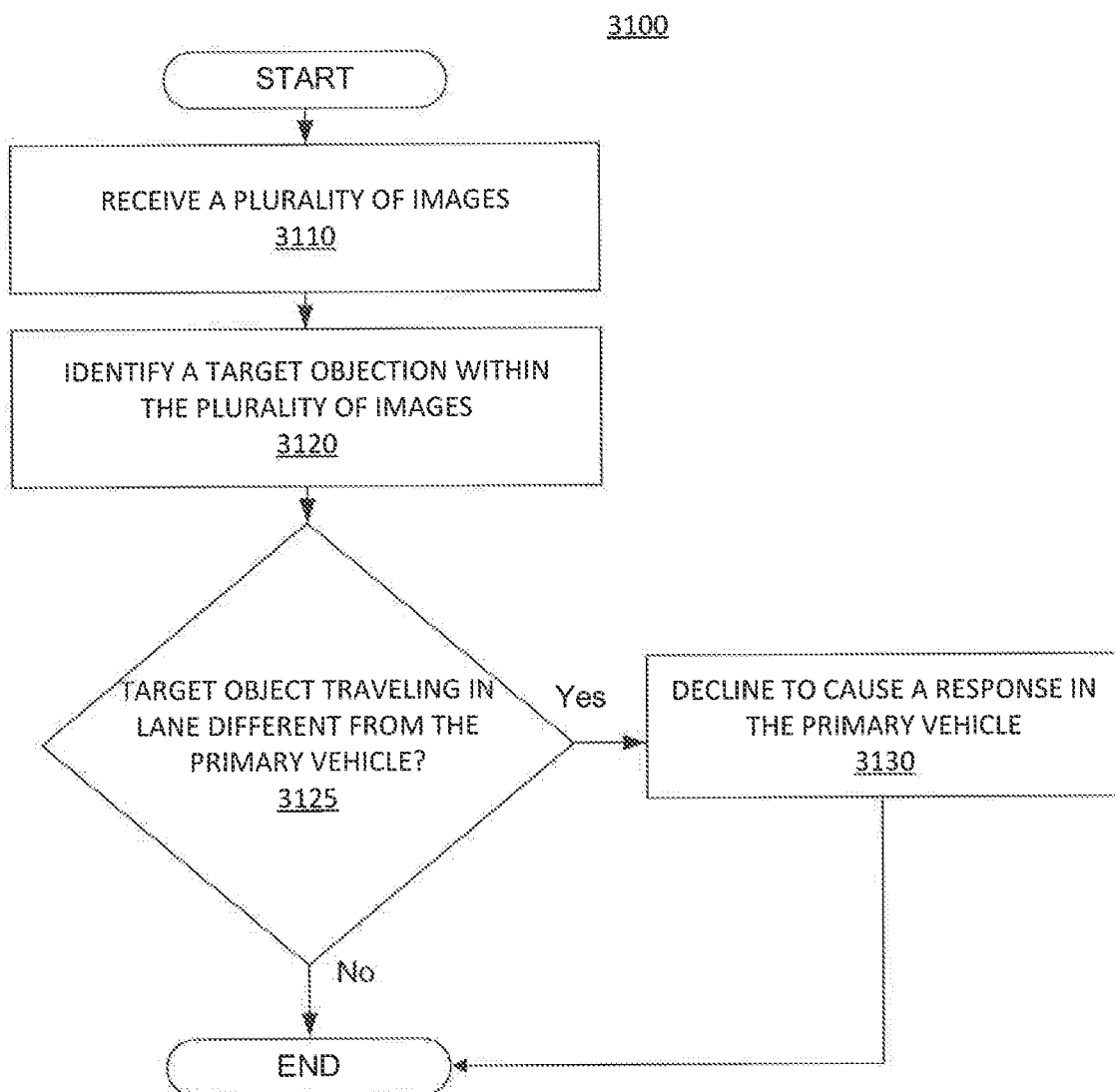
FIG. 31 is a flow chart showing an exemplary process for declining to cause a response in a primary vehicle consistent with disclosed embodiments.

FIG. 31 is a flow chart showing an exemplary process 3100 for declining to cause a response in a primary vehicle, consistent with disclosed embodiments. At step 3110, processing unit 110 may receive a plurality of images via data interface 128 between processing unit 110 and image acquisition unit 120, as described in connection with step 3010 of FIG. 30, above.

At step 3120, processing unit 110 may execute target monitoring module 2902 to locate a target object (e.g., target vehicle 200*b*) within the images received at step 3010 by analyzing the images, as described in connection with step 3020 of FIG. 30, above. At step 3125, processing unit 110 may execute target monitoring module 2902 to determine whether the target object (e.g., target vehicle 200*b*) is traveling in a lane different from primary vehicle 200*a*, using the techniques described in connection with step 3030 of FIG. 30, above. If target vehicle 200*b* is determined to be traveling in a lane different from primary vehicle 200*a* (step 3125, yes), processing unit 110 may decline to cause a response in primary vehicle 200*a* at step 3130. Alternatively, if system 100 determines that target vehicle 200*b* does not constitute an imminent risk of collision (e.g., target vehicle 200*b* a nonintersecting trajectory with primary vehicle 200*a* or a potential time to collision beyond a threshold such that the target object does not pose an imminent risk at the present time), processing unit 110 may decline to cause a response in primary vehicle 200*a* at step 3130. Otherwise (step 3125, no), process 3100 may conclude and no response occurs.

Stopping an Autonomously Driven Vehicle Using a Multi-Segment Braking Profile

System 100 may provide driver assist functionality that monitors and responds to environmental conditions to control the braking of vehicle 200. For instance, system 100 may detect, based on a plurality of images, an object that triggers the stopping of vehicle 200. For example, this object may include another vehicle in the vicinity of vehicle 200, a traffic light, and/or a traffic sign. System 100 may use a braking profile to slow and/or stop vehicle 200. According to some embodiments, the braking profile may include multiple segments, where deceleration is executed at different stages. For example, the braking profile may cause system 100 to stop vehicle 200 at a decreasing rate of deceleration.

By providing a braking profile that includes multiple segments, system 100 may cause vehicle 200 to operate in a manner that feels natural to a driver and/or passengers. For example, when a driver stops a vehicle at a traffic light, the brakes are typically not applied at a constant rate from the moment they are applied until the moment when the vehicle stops. Operating brakes in such a manner result in an abrupt stop at the end. Instead, the driver may apply the brakes gently at first, then with increasing pressure, and then as the vehicle reaches its target stopping location, the driver may decrease the level of braking until it reaches zero (or near zero) at the moment the car stops. Operating the vehicle in this manner may provide a natural stopping progression, i.e., the driver may cause-a progressive deceleration at first so the vehicle does not experience an abrupt initial deceleration and then at the end, so that vehicle does not come to an abrupt stop.

System 100 may provide autonomous vehicle navigation that may implement braking according to an approach that feels natural to the driver and/or passengers of vehicle 200. For example, in some embodiments, system 100 may cause one or more of image capture devices 122-126 to acquire a plurality of images of an area in a vicinity of vehicle 200. Processing device 110 may receive the receive the plurality of images via data interface 128 and identify, based on analysis of the plurality of images, a trigger (e.g., an object, a traffic light, and/or a traffic sign) for stopping vehicle 200. Based on the identified trigger, system 100 may cause vehicle 200 to stop according to a braking profile. In some embodiments, the braking profile may include a plurality of segments (e.g., including a first segment associated with a first deceleration rate, a second segment which includes a second deceleration rate less than the first deceleration rate, and a third segment in which a level of braking is decreased as a target stopping location is approached, as determined based on the analysis of the plurality of images.

Figure 32A:
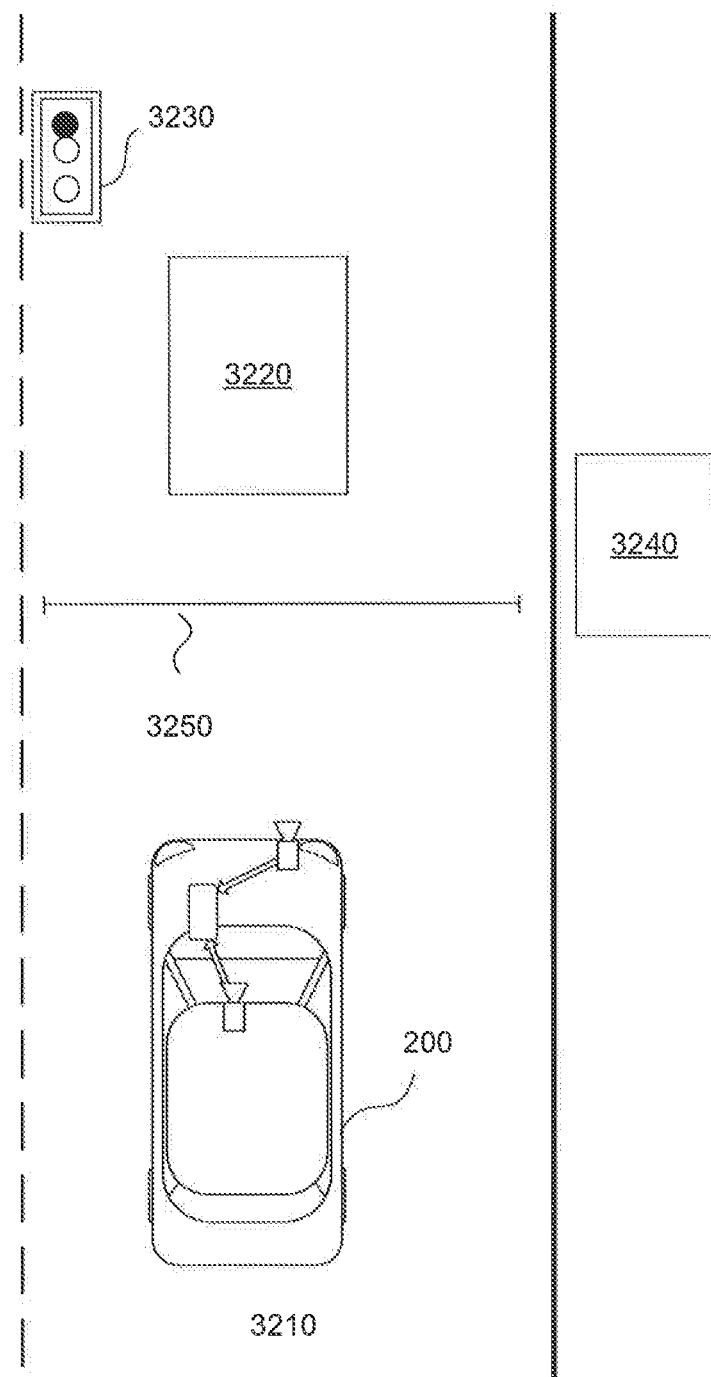
FIG. 32A is a diagrammatic representation of an exemplary vehicle in which an object is present in the vicinity of vehicle consistent with the disclosed embodiments.

FIG. 32A illustrates vehicle 200 traveling on a roadway 3210 that includes an object 3220. System 100 may identify a trigger (e.g., object 3220) for stopping vehicle 200 in respect to detection of the trigger. For example, system 100 may first slow vehicle 200 after the trigger is detected and bring vehicle 200 to a stop before reaching object 3220.

Processing unit 110 may be configured to determine a trigger for stopping vehicle 200 based on a plurality of images acquired by one or more of image capture devices 122-126. Processing unit 110 may receive the images from image capture devices 122-126 via data interface 128. According to some embodiments, the trigger may include object 3220. For example, object 3220 may be another vehicle on roadway 2810. According to some embodiments, processing unit 110 may identify a trigger if object 3220 is within a certain vicinity of vehicle 200. For example, identification of the trigger may depend on a relative distance between object 3220 and vehicle 200. Further, this identification may optionally consider the relative velocity and/or relative acceleration between object 3220 and vehicle 200.

Additionally or alternatively, the trigger may include a traffic sign, such as traffic sign 3240 shown in FIG. 32A. For example, traffic sign 3240 may be a stop sign and/or a speed limit sign. According to some embodiments, processing unit 110 may process the plurality of images to determine the content of traffic sign 3240 as part of determining whether a trigger exists. For example, processing unit 110 may determine that a trigger is present based on a speed limit specified by traffic sign 3240 if vehicle 200 is exceeding the speed limit. As another example, processing unit 110 may determine a trigger exists based on a traffic light 2830 if the yellow and/or red light is on.

Based on the plurality of images, processing unit 110 may determine a target stopping location 3250 at which vehicle 200 will stop once a braking profile is executed. Reaching target stopping location 3250 may be accompanied by a release in braking pressure of vehicle 200. Target stopping location 3250 may be based on the location of traffic light 3230 and/or traffic sign 3240 such that vehicle 200 complies with traffic light 3230 and/or traffic sign 3240. Alternatively, target stopping location 3250 may be based on object 3220 such that vehicle 200 stops before reaching object 3220. Accordingly, target stopping location 3250 may be based on the location of object 3220 to avoid a collision between vehicle 200 and object 3220. In some embodiments, target stopping location 3250 may be updated based on new information obtained from the plurality of images, such as newly identified targets, newly visible obstacles, newly visible signs, etc.

Figure 32B:
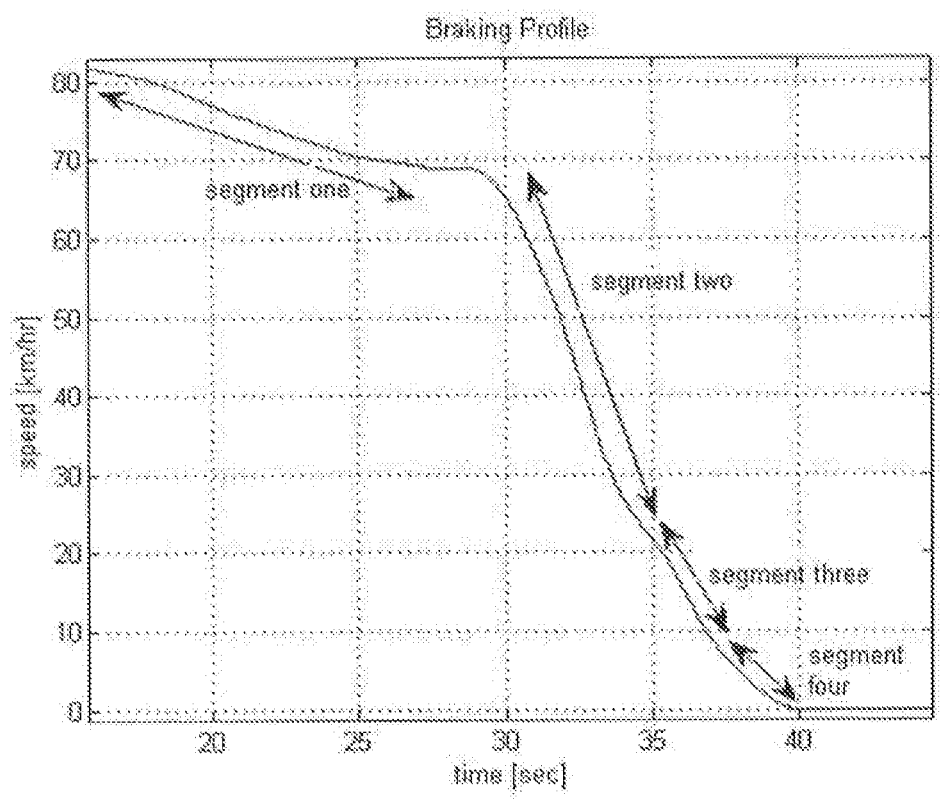
FIG. 32B illustrates an exemplary braking profile, consistent with the disclosed embodiments.

FIG. 32B illustrates an exemplary braking profile, consistent with disclosed embodiments. In the example shown in FIG. 32B, the braking profile includes four segments. However, the number of segments is exemplary and a braking profile consistent with the disclosed embodiments may include any appropriate number of segments (e.g., 2, 3, 4, 5, 6, etc., segments).

In segment 1, system 100 may prepare for a possible braking scenario. For example, in this zone, system 100 may receive information (e.g., map data and/or image data) about an upcoming intersection (e.g., an intersection with traffic lights). System 100 may gradually reduce the speed of vehicle 200 (e.g., the speed of vehicle 200 may be gradually reduced to about 70-50 km/hr, depending on the characteristics of the intersection). System 100 may cause the speed adjustment, for example, approximately 100-200 meters before the junction at average deceleration around 0.2-0.4 m/sec$^2$ (with a maximum of about 0.5 m/sec$^2$). By decreasing the speed of vehicle 200 in segment 1, system 100 may provide the driver and/or passengers of vehicle 200 with confidence that system 100 is aware of the approaching intersection.

In segment 2, system 100 may apply strong braking. In this segment, system 100 may receive information based on the analysis of image data that, for example, a traffic light is red and/or there is a stopped vehicle at the intersection in the line in which vehicle 200 is traveling. System 100 may cause vehicle 200 to experience significant speed reduction in this zone, while the distance to the stop line or stopped vehicle is still large. Doing so may provide the driver and/or passengers of vehicle 200 with a comfortable feeling that system 100 will have more than enough space to complete the braking maneuver. This zone may be approximately 30-100 meters away from the stop line, and the average deceleration may be about 1.5-2.5 m/sec$^2$ (with a maximum of about 3.5 m/sec$^2$).

In segment 3, system 100 may make a moderate braking adjustment. For example, in this segment, system 100 may adjust the speed of vehicle 200 according to the remaining distance to the stop line or stopped vehicle and based on the current speed and deceleration of vehicle 200. By making this adjustment, system 100 may provide the driver and/or passengers of vehicle 200 with an indication that system 100 is releasing most of the braking power while the speed is still being reduced but slower than before. This zone may be approximately 5-30 meters away from the stop line or stopped vehicle, and the average deceleration may be about 0.5-1.5 m/sec$^2$ (with a maximum of about 2 m/sec$^2$).

In segment 4, system 100 may make a small braking adjustment. In this segment, system 100 may close the remaining distance to the stop line or stopped vehicle at a very low speed gradually bringing it to zero. In this zone, the driver and/or passengers may feel that vehicle 200 is slowly sliding into its position (e.g., at the stop line or behind another vehicle). This zone may constitute approximately the last 5-7 meters to the stop line or stopped vehicle, and the average deceleration may be about 0.3-0.5 m/sec$^2$ (with a maximum of about 1 m/sec$^2$).

Figure 33:
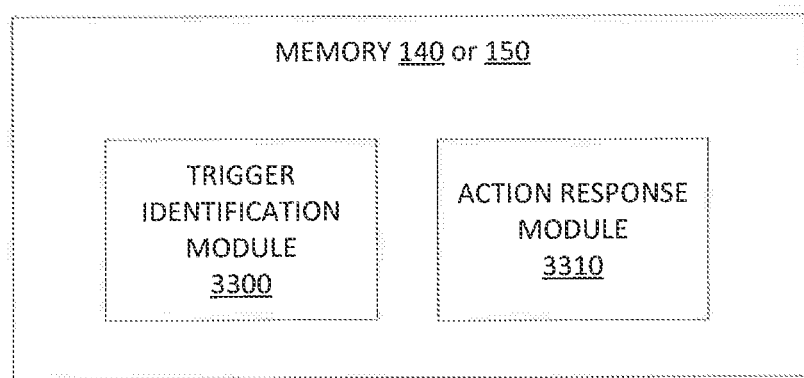
FIG. 33 is a diagrammatic representation of the memory of an exemplary navigation system consistent with the disclosed embodiments.

FIG. 33 is an exemplary block diagram of memory 140 and/or 150, which may store instructions for performing one or more operations consistent with disclosed embodiments. As illustrated in FIG. 33, memory 140 may store one or more modules for performing the trigger detection and responses described herein. For example, memory 140 may store a trigger identification module 3300 and an action response module 3310.

Trigger identification module 3300 may store instructions which, when executed by processing unit 110, may detect the presence and/or existence of a trigger for stopping vehicle 200. For example, trigger identification module 3300 may process the plurality of images received from at least one image capture device 122-124 to detect the presence of a trigger. As discussed above, this may include identifying object 3220, traffic light 3230, and/or traffic sign 3240.

Action response module 3310 may store instructions which, when executed by processing unit 110, may respond to the presence of a trigger. For example, action response module 3310 may execute control to decelerate and/or stop vehicle 200. For example, action response module 3310 may execute a braking profile to decelerate and/or stop vehicle 200. The action response module 3310 may determining to execute one of a plurality of braking profiles based on a number of braking profiles based on, for example, environmental factors, the type of trigger detected, and the velocity of vehicle 200. To navigate vehicle 200 to a stop based on the detected trigger, processing unit 110 may transmit electronic signals to one or more of throttling system 220, braking system 230, and/or steering system 240 of vehicle 200. Further, one or more actuators may control throttling system 220, braking system 230, and/or steering system 240. For example, processing unit 110 may transmit electronic signals that cause system 100 to physically depress the brake by a predetermined amount.

Figure 34:
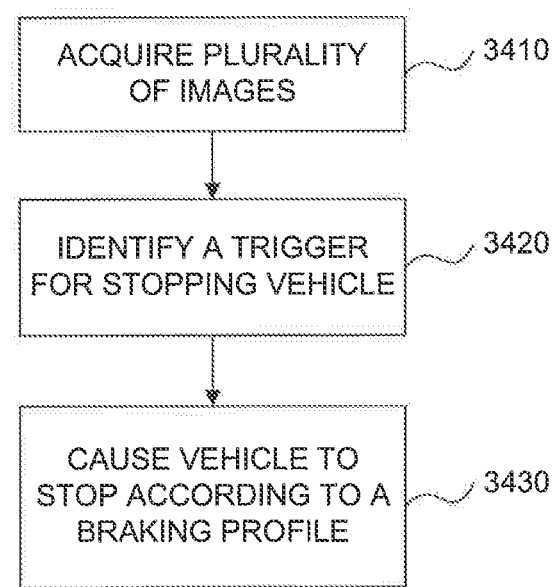
FIG. 34 is a flowchart of an exemplary method for implementing a braking profile while navigating a vehicle consistent with the disclosed embodiments.

FIG. 34 illustrates a process 3400 for navigating vehicle 200, consistent with disclosed embodiments. Process 3000 may identify a trigger (e.g., an object, vehicle, traffic light, traffic sign, etc.) for stopping vehicle 200 and execute a braking profile in response to the detection of the trigger. Process 3400 may detect various types of triggers determine which of a plurality of braking profiles to execute.

The braking profile may be based on the type of a detected trigger and/or other environmental conditions related to the detected trigger (e.g., a distance to an object). For example, in some embodiments, the braking profile may include a plurality of segments (e.g., three segments). In a three segment braking profile, a first segment of the braking profile may be associated with a first deceleration rate, a second segment of the braking profile may include a second deceleration rate less than the first deceleration rate, and a third segment of the braking profile may include causing a level of braking to be decreased as a target stopping location is approached, as determined based on an analysis of a plurality of images acquired by one or more of image capture devices 122-126. For example, in some embodiments, the first segment may cause vehicle 200 to progressively increase deceleration, the second segment may cause vehicle 200 to decelerate at a constant rate, and the third segment may cause vehicle 200 to progressively decrease its deceleration rate to zero (or near zero).

At step 3410, process 3400 may acquire, using at least one of image capture devices 122-126, a plurality of images of an area in the vicinity of vehicle 200. For example, processing unit 110 may receive the plurality of images may through data interface 128. Processing unit 110 may be configured to determine the presence of one or more objects and/or signs located on or near roadway 3210 based on the acquired images. For example, processing unit 110 may be configured to determine the presence of object 3220, traffic light 3230, and/or traffic sign 3240. Processing unit 110 may be further configured to read the content of traffic sign 3240. For example, processing unit 110 may be configured to differentiate between a speed limit sign and a stop sign. Further, processing unit 110 may be configured to process images to determine the speed limit based on traffic sign 3240.

At step 3420, process 300 may include a trigger for stopping vehicle 200. For example, processing unit 110 may identify a trigger based on the presence of object 3220 within the vicinity of vehicle 200. Additionally or alternatively, processing unit 110 may identify a trigger based on a current signal status of traffic light 3230. According to some embodiments, processing unit 110 may determine that traffic light 3230 constitutes a trigger if it is not green. According to some embodiments, processing unit 110 may determine that traffic sign 3240 constitutes a trigger if it is a stop sign, for example. In some embodiments, traffic sign 3240 may constitute a trigger if it is a speed limit sign and vehicle 200 is exceeding the posted speed limit. Further in some embodiments, processing unit 110 may cause system 100 to provide an audible announcement identifying the trigger and/or indicating that vehicle 200 is braking or about to begin braking.

After processing unit 110 identifies the trigger, at step 3430, processing unit 110 may cause vehicle 200 to slow down and/or stop according to a braking profile. In some embodiments, the braking profile may comprise a number of profile segments. The different profile segments of a braking profile may be defined by a time period and/or a vehicle speed. For example, processing unit 110 may execute controls of vehicle 200 in accordance with a first profile segment for a predetermined period of time or until the speed of vehicle 200 reaches a target value. The target value may be a predetermined speed or it may be a percentage of the speed that vehicle 200 was traveling prior to execution of the braking profile. To implement the braking profile, processing unit 110 may transmit electronic signals to one or more of throttling system 220, braking system 230, and/or steering system 240 of vehicle 200. Further, one or more actuators may control throttling system 220, braking system 230, and/or steering system 240.

As discussed above, according to some embodiments, a profile segment of the braking profile may correspond to a deceleration rate. For example, a braking profile may include multiple segments, and the first segment may be associated with a first deceleration rate. The braking profile may further include a second segment associated with a second deceleration rate. The second deceleration rate may be less than first deceleration rate.

Further, as discussed above, according to some embodiments, braking profile may include a third profile segment in which a level of braking is decreased as a function of the distance between vehicle 200 and underlying factors that give rise to the trigger (e.g., object 3220, traffic light 3230, traffic sign 3240). For example, the braking profile may include decreasing the level of braking as vehicle 200 approaches target stopping location 3250. Further, reaching target stopping location 3250 may be accompanied by a release in braking pressure of vehicle 200.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An automated driving system for a vehicle, the system comprising:
   an interface to obtain sensing data of an environment in a vicinity of the vehicle, the sensing data captured from at least one sensor device of the vehicle; and
   at least one processing device configured to:
      determine, from the sensing data, a first lane boundary and a second lane boundary of a first lane of a road during navigation of the vehicle in a longitudinal direction of the first lane, the first lane boundary on a first lateral side of the vehicle and the second lane boundary on a second lateral side of the vehicle opposite to the first lateral side of the vehicle;
      identify, based on the sensing data, a target vehicle in a second lane of the road;
      initiate a pass operation to enable the vehicle to pass the target vehicle while traveling within the first and second lane boundaries, wherein the pass operation is initiated when the target vehicle is determined to be in the second lane of the road;
      predict a position of the target vehicle based on the sensing data;

determine, based on the predicted position, whether there is enough time for the vehicle to bypass the target vehicle while staying in the first lane before a lateral distance between the vehicle and the target vehicle closes to less than a minimum safe lateral distance; and activate, based on a determination that there is not enough time for the vehicle to bypass the target vehicle while staying in the first lane before the lateral distance between the vehicle and the target vehicle closes to less than a minimum safe lateral distance, an abort operation to cause the vehicle to: (i) abort the pass operation, (ii) decelerate the vehicle, and (iii) move into a position in the first lane that is longitudinally behind the target vehicle before completion of the pass operation.

2. The system of claim 1, wherein predicting the position of the target vehicle includes estimating a speed of the target vehicle.

3. The system of claim 1, wherein the abort operation causes the vehicle to initiate braking.

4. The system of claim 1, wherein at least one of the first and second lane boundaries includes a line marked on a road surface.

5. The system of claim 1, wherein at least one of the first and second lane boundaries is based on detected road features.

6. The system of claim 1, wherein to initiate the pass operation, the at least one processing device is further configured to:
determine, based on an acquisition of sensor data, a lateral distance between the vehicle and the target vehicle in the predicted position.

7. The system of claim 6, wherein the at least one processing device is further configured to:
initiate a lateral maneuver in the first lane based on the lateral distance between the vehicle and the target vehicle in the predicted position.

8. The system of claim 1, wherein the at least one sensor device includes a camera, and wherein the sensing data includes at least one image captured from the camera.

9. At least one non-transitory machine-readable storage medium comprising instructions stored thereupon, which when executed by a processor of a navigation system of a vehicle, cause the processor to perform operations comprising:
obtaining sensing data of an environment in a vicinity of the vehicle, the sensing data captured from at least one sensor device of the vehicle;
determining, from the sensing data, a first lane boundary and a second lane boundary of a first lane of a road during navigation of the vehicle in a longitudinal direction of the first lane, the first lane boundary on a first lateral side of the vehicle and the second lane boundary on a second lateral side of the vehicle opposite to the first lateral side of the vehicle;
identifying, based on the sensing data, a target vehicle in a second lane of the road;
initiating a pass operation to enable the vehicle to pass the target vehicle while traveling within the first and second lane boundaries, wherein the pass operation is initiated when the target vehicle is determined to be in the second lane of the road:
predicting a position of the target vehicle based on the sensing data;
determining, based on the predicted position, whether there is enough time for the vehicle to bypass the target vehicle while staying in the first lane before a lateral distance between the vehicle and the target vehicle closes to less than a minimum safe lateral distance; and
activating, based on a determination that there is not enough time for the vehicle to bypass the target vehicle while staying in the first lane before the lateral distance between the vehicle and the target vehicle closes to less than a minimum safe lateral distance, an abort operation to cause the vehicle to: (i) abort the pass operation, (ii) decelerate the vehicle, and (iii) move into a position in the first lane that is longitudinally behind the target vehicle before completion of the pass operation.

10. The machine-readable storage medium of claim 9, wherein predicting the position of the target vehicle includes estimating a speed of the target vehicle.

11. The machine-readable storage medium of claim 9, wherein the abort operation causes the vehicle to initiate braking.

12. The machine-readable storage medium of claim 9, wherein at least one of the first and second lane boundaries includes a line marked on a road surface.

13. The machine-readable storage medium of claim 9, wherein at least one of the first and second lane boundaries is based on detected road features.

14. The machine-readable storage medium of claim 9, wherein to initiate the pass operation, the at least one processor is further configured to:
determine, based on an acquisition of sensor data, a lateral distance between the vehicle and the target vehicle in the predicted position.

15. The machine-readable storage medium of claim 14, the instructions further to cause the processor to perform operations comprising:
initiate a lateral maneuver in the first lane based on the lateral distance between the vehicle and the target vehicle in the predicted position.

16. The machine-readable storage medium of claim 9, wherein the at least one sensor device includes a camera, and wherein the sensing data includes at least one image captured from the camera.

17. An apparatus, comprising:
means for obtaining sensing data of an environment in a vicinity of a vehicle, the sensing data captured from at least one sensor device of the vehicle;
at least one processing means for:
determining, from the sensing data, a first lane boundary and a second lane boundary of a first lane of a road during navigation of the vehicle in a longitudinal direction of the first lane, the first lane boundary on a first lateral side of the vehicle and the second lane boundary on a second lateral side of the vehicle opposite to the first lateral side of the vehicle;
identifying, based on the sensing data, a target vehicle in a second lane of the road;
initiating a pass operation to enable the vehicle to pass the target vehicle while traveling within the first and second lane boundaries, wherein the pass operation is initiated when the target vehicle is determined to be in the second lane of the road;
predicting a position of the target vehicle based on the sensing data;
determining, based on the predicted position, whether there is enough time for the vehicle to bypass the target vehicle while staying in the first lane before a lateral distance between the vehicle and the target vehicle closes to less than a minimum safe lateral distance; and activating, based on a determination that there is not enough time for the vehicle to bypass the target vehicle while staying in the first lane before the lateral distance between the vehicle and the target vehicle closes to less than a minimum safe lateral distance, an abort operation to cause the vehicle to: (i) abort the pass operation, decelerate the vehicle, and (iii) move into a position in the first lane that is longitudinally behind the target vehicle before completion of the pass operation.

18. The apparatus of claim 17, further comprising:
sensing means for capturing the sensing data.
19. The apparatus of claim 17, further comprising:
means for estimating a speed of the target vehicle, to predict the position of the target vehicle.
20. The apparatus of claim 17, further comprising:
means for determining a lateral distance between the vehicle and the target vehicle in the predicted position.

\* \* \* \* \*